(12) United States Patent
Carter et al.

(10) Patent No.: US 9,371,894 B2
(45) Date of Patent: Jun. 21, 2016

(54) CONTINUOUSLY VARIABLE TRANSMISSIONS AND METHODS THEREFOR

(71) Applicant: Fallbrook Intellectual Property Company LLC, Cedar Park, TX (US)

(72) Inventors: Jeremy Carter, Austin, TX (US); Charles B. Lohr, Austin, TX (US); Brad P. Pohl, Leander, TX (US); David Kieke, Austin, TX (US)

(73) Assignee: Fallbrook Intellectual Property Company LLC, Cedar Park, TX (US)

( * ) Notice: Subject to any disclaimer, the term of this patent is extended or adjusted under 35 U.S.C. 154(b) by 332 days.

(21) Appl. No.: 13/928,779

(22) Filed: Jun. 27, 2013

(65) Prior Publication Data

US 2013/0288848 A1 Oct. 31, 2013

Related U.S. Application Data

(63) Continuation of application No. 12/526,770, filed as application No. PCT/US2008/053347 on Feb. 7, 2008, now abandoned.

(60) Provisional application No. 60/889,512, filed on Feb. 12, 2007.

(51) Int. Cl.
*F16H 15/50* (2006.01)
*F16H 15/28* (2006.01)
*F16H 37/08* (2006.01)

(52) U.S. Cl.
CPC ............. *F16H 15/503* (2013.01); *F16H 15/28* (2013.01); *F16H 37/084* (2013.01); *F16H 2037/0886* (2013.01)

(58) Field of Classification Search
CPC combination set(s) only.
See application file for complete search history.

(56) References Cited

U.S. PATENT DOCUMENTS

| 719,595 | A | 2/1903 | Huss |
| 1,121,210 | A | 12/1914 | Techel |

(Continued)

FOREIGN PATENT DOCUMENTS

| CH | 118064 | 12/1926 |
| CN | 1054340 | 9/1991 |

(Continued)

OTHER PUBLICATIONS

Notification of Second Office Action dated May 16, 2013 in Chinese Patent Application No. 200880010199.9.

(Continued)

*Primary Examiner* — Terence Boes
(74) *Attorney, Agent, or Firm* — Knobbe Martens Olson & Bear LLP

(57) ABSTRACT

Components, subassemblies, systems, and/or methods for continuously variable transmissions (CVT) having a variator provided with a plurality of tilting, traction planets and traction rings are described. In one embodiment, a variator is coupled to a rangebox to provide multiple operating modes. In another embodiment, a hydraulic system is configured to control the transmission ratio of the variator and the rangebox. Shift-cam-and-sun subassemblies can be used to facilitate shifting of the transmission ratio of a CVT. A transmission housing and bell housing can be adapted to house components of a CVT and, in some embodiments, to cooperate with other components of the CVT to support operation and/or functionality of the CVT. Related devices include, for example, a pivot arm, a control feedback mechanism, axial force generation and management mechanisms, a control valve integral with an input shaft, a pivot pin hub, and a rotatable carrier configured to support planet-pivot arm assemblies.

24 Claims, 50 Drawing Sheets

(56) References Cited

U.S. PATENT DOCUMENTS

| | | |
|---|---|---|
| 1,175,677 A | 3/1916 | Barnes |
| 1,207,985 A | 12/1916 | Null et al. |
| 1,380,006 A | 5/1921 | Nielson |
| 1,390,971 A | 9/1921 | Samain |
| 1,558,222 A | 10/1925 | Beetow |
| 1,629,902 A | 5/1927 | Arter et al. |
| 1,686,446 A | 10/1928 | Gilman |
| 1,774,254 A | 8/1930 | Daukus |
| 1,793,571 A | 2/1931 | Vaughn |
| 1,847,027 A | 2/1932 | Thomsen et al. |
| 1,850,189 A | 3/1932 | Weiss |
| 1,858,696 A | 5/1932 | Weiss |
| 1,865,102 A | 6/1932 | Hayes |
| 1,903,228 A | 3/1933 | Thomson |
| 1,978,439 A | 10/1934 | Sharpe |
| 2,030,203 A | 2/1936 | Gove et al. |
| 2,060,884 A | 11/1936 | Alain |
| 2,086,491 A | 7/1937 | Dodge |
| 2,100,629 A | 11/1937 | Chilton |
| 2,109,845 A | 3/1938 | Madle |
| 2,112,763 A | 3/1938 | Cloudsley |
| 2,134,225 A | 10/1938 | Christiansen |
| 2,152,796 A | 4/1939 | Erban |
| 2,196,064 A | 4/1940 | Erban |
| 2,209,254 A | 7/1940 | Ahnger |
| 2,259,933 A | 10/1941 | Holloway |
| 2,269,434 A | 1/1942 | Brooks |
| 2,325,502 A | 7/1943 | Auguste |
| RE22,761 E | 5/1946 | Wemp |
| 2,461,258 A | 2/1949 | Brooks |
| 2,469,653 A | 5/1949 | Kopp |
| 2,480,968 A | 9/1949 | Ronai |
| 2,586,725 A | 2/1952 | Henry |
| 2,596,538 A | 5/1952 | Dicke |
| 2,597,849 A | 5/1952 | Alfredeen |
| 2,675,713 A | 4/1954 | Acker |
| 2,696,888 A | 12/1954 | Chillson et al. |
| 2,716,357 A | 8/1955 | Rennerfelt |
| 2,730,904 A | 1/1956 | Rennerfelt |
| 2,748,614 A | 6/1956 | Weisel |
| 2,868,038 A | 1/1959 | Billeter |
| 2,959,070 A | 1/1959 | Flinn |
| 2,873,911 A | 2/1959 | Perrine |
| 2,874,592 A | 2/1959 | Oehrli |
| 2,883,883 A | 4/1959 | Chillson |
| 2,891,213 A | 6/1959 | Kern |
| 2,901,924 A | 9/1959 | Banker |
| 2,913,932 A | 11/1959 | Oehru |
| 2,931,234 A | 4/1960 | Hayward |
| 2,931,235 A | 4/1960 | Hayward |
| 2,949,800 A | 8/1960 | Neuschotz |
| 2,959,063 A | 11/1960 | Perry |
| 2,959,972 A | 11/1960 | Madson |
| 2,964,959 A | 12/1960 | Beck |
| 3,008,061 A | 11/1961 | Mims et al. |
| 3,048,056 A | 8/1962 | Wolfram |
| 3,051,020 A | 8/1962 | Hartupee |
| 3,086,704 A | 4/1963 | Hurtt |
| 3,087,348 A | 4/1963 | Kraus |
| 3,154,957 A | 11/1964 | Kashihara |
| 3,163,050 A | 12/1964 | Kraus |
| 3,176,542 A | 4/1965 | Monch |
| 3,184,983 A | 5/1965 | Kraus |
| 3,204,476 A | 9/1965 | Rouverol |
| 3,209,606 A | 10/1965 | Yamamoto |
| 3,211,364 A | 10/1965 | Wentling et al. |
| 3,216,283 A | 11/1965 | General |
| 3,246,531 A | 4/1966 | Kashihara |
| 3,248,960 A | 5/1966 | Schottler |
| 3,273,468 A | 9/1966 | Allen |
| 3,280,646 A | 10/1966 | Lemieux |
| 3,283,614 A | 11/1966 | Hewko |
| 3,292,443 A | 12/1966 | Felix |
| 3,340,895 A | 9/1967 | Osgood, Jr. et al. |
| 3,407,687 A | 10/1968 | Hayashi |
| 3,439,563 A | 4/1969 | Petty |
| 3,440,895 A | 4/1969 | Fellows |
| 3,464,281 A | 9/1969 | Hiroshi et al. |
| 3,477,315 A | 11/1969 | Macks |
| 3,487,726 A | 1/1970 | Burnett |
| 3,487,727 A | 1/1970 | Gustafsson |
| 3,574,289 A | 4/1971 | Scheiter et al. |
| 3,661,404 A | 5/1972 | Bossaer |
| 3,695,120 A | 10/1972 | Titt |
| 3,707,888 A | 1/1973 | Schottler |
| 3,727,473 A | 4/1973 | Bayer |
| 3,727,474 A | 4/1973 | Fullerton |
| 3,736,803 A | 6/1973 | Horowitz et al. |
| 3,768,715 A | 10/1973 | Tout |
| 3,800,607 A | 4/1974 | Zurcher |
| 3,802,284 A | 4/1974 | Sharpe et al. |
| 3,810,398 A | 5/1974 | Kraus |
| 3,820,416 A | 6/1974 | Kraus |
| 3,866,985 A | 2/1975 | Whitehurst |
| 3,891,235 A | 6/1975 | Shelly |
| 3,934,493 A | 1/1976 | Hillyer |
| 3,954,282 A | 5/1976 | Hege |
| 3,987,681 A | 10/1976 | Keithley et al. |
| 3,996,807 A | 12/1976 | Adams |
| 4,098,146 A | 7/1978 | McLarty |
| 4,103,514 A | 8/1978 | Grosse-Entrup |
| 4,159,653 A | 7/1979 | Koivunen |
| 4,169,609 A | 10/1979 | Zampedro |
| 4,177,683 A | 12/1979 | Moses |
| 4,227,712 A | 10/1980 | Dick |
| 4,314,485 A | 2/1982 | Adams |
| 4,345,486 A | 8/1982 | Olesen |
| 4,369,667 A | 1/1983 | Kemper |
| 4,382,188 A | 5/1983 | Cronin |
| 4,391,156 A | 7/1983 | Tibbals |
| 4,459,873 A | 7/1984 | Black |
| 4,464,952 A | 8/1984 | Stubbs |
| 4,468,984 A | 9/1984 | Castelli et al. |
| 4,494,524 A | 1/1985 | Wagner |
| 4,496,051 A | 1/1985 | Ortner |
| 4,501,172 A | 2/1985 | Kraus |
| 4,526,255 A | 7/1985 | Hennessey et al. |
| 4,546,673 A | 10/1985 | Shigematsu et al. |
| 4,560,369 A | 12/1985 | Hattori |
| 4,567,781 A | 2/1986 | Russ |
| 4,574,649 A | 3/1986 | Seol |
| 4,585,429 A | 4/1986 | Marier |
| 4,617,838 A | 10/1986 | Anderson |
| 4,630,839 A | 12/1986 | Seol |
| 4,631,469 A | 12/1986 | Tsuboi et al. |
| 4,651,082 A | 3/1987 | Kaneyuki |
| 4,663,990 A | 5/1987 | Itoh et al. |
| 4,700,581 A | 10/1987 | Tibbals, Jr. |
| 4,713,976 A | 12/1987 | Wilkes |
| 4,717,368 A | 1/1988 | Yamaguchi et al. |
| 4,735,430 A | 4/1988 | Tomkinson |
| 4,738,164 A | 4/1988 | Kaneyuki |
| 4,744,261 A | 5/1988 | Jacobson |
| 4,756,211 A | 7/1988 | Fellows |
| 4,781,663 A | 11/1988 | Reswick |
| 4,838,122 A | 6/1989 | Takamiya et al. |
| 4,856,374 A | 8/1989 | Kreuzer |
| 4,869,130 A | 9/1989 | Wiecko |
| 4,881,925 A | 11/1989 | Hattori |
| 4,900,046 A | 2/1990 | Aranceta-Angoitia |
| 4,909,101 A | 3/1990 | Terry |
| 4,918,344 A | 4/1990 | Chikamori et al. |
| 4,964,312 A | 10/1990 | Kraus |
| 5,006,093 A | 4/1991 | Itoh et al. |
| 5,020,384 A | 6/1991 | Kraus |
| 5,025,685 A | 6/1991 | Kobayashi et al. |
| 5,033,322 A | 7/1991 | Nakano |
| 5,033,571 A | 7/1991 | Morimoto |
| 5,037,361 A | 8/1991 | Takahashi |
| 5,044,214 A | 9/1991 | Barber |
| 5,059,158 A | 10/1991 | Bellio et al. |
| 5,069,655 A | 12/1991 | Schievelbusch |
| 5,099,710 A | 3/1992 | Nakano |
| 5,121,654 A | 6/1992 | Fasce |

(56) References Cited

U.S. PATENT DOCUMENTS

| | | |
|---|---|---|
| 5,125,677 A | 6/1992 | Ogilvie et al. |
| 5,138,894 A | 8/1992 | Kraus |
| 5,156,412 A | 10/1992 | Meguerditchian |
| 5,230,258 A | 7/1993 | Nakano |
| 5,236,211 A | 8/1993 | Meguerditchian |
| 5,236,403 A | 8/1993 | Schievelbusch |
| 5,267,920 A | 12/1993 | Hibi |
| 5,273,501 A | 12/1993 | Schievelbusch |
| 5,318,486 A | 6/1994 | Lutz |
| 5,319,486 A | 6/1994 | Vogel et al. |
| 5,330,396 A | 7/1994 | Lohr et al. |
| 5,355,749 A | 10/1994 | Obara et al. |
| 5,375,865 A | 12/1994 | Terry, Sr. |
| 5,379,661 A | 1/1995 | Nakano |
| 5,383,677 A | 1/1995 | Thomas |
| 5,387,000 A | 2/1995 | Sato |
| 5,401,221 A | 3/1995 | Fellows et al. |
| 5,451,070 A | 9/1995 | Lindsay et al. |
| 5,489,003 A | 2/1996 | Ohyama et al. |
| 5,508,574 A | 4/1996 | Vlock |
| 5,562,564 A | 10/1996 | Folino |
| 5,564,998 A | 10/1996 | Fellows |
| 5,601,301 A | 2/1997 | Liu |
| 5,607,373 A | 3/1997 | Ochiai et al. |
| 5,645,507 A | 7/1997 | Hathaway |
| 5,651,750 A | 7/1997 | Imanishi et al. |
| 5,664,636 A | 9/1997 | Ikuma et al. |
| 5,669,845 A | 9/1997 | Muramoto et al. |
| 5,690,346 A | 11/1997 | Keskitalo |
| 5,722,502 A | 3/1998 | Kubo |
| 5,746,676 A | 5/1998 | Kawase et al. |
| 5,755,303 A | 5/1998 | Yamamoto et al. |
| 5,799,541 A | 9/1998 | Arbeiter |
| 5,823,052 A | 10/1998 | Nobumoto |
| 5,846,155 A | 12/1998 | Taniguchi et al. |
| 5,888,160 A | 3/1999 | Miyata et al. |
| 5,899,827 A | 5/1999 | Nakano et al. |
| 5,902,207 A | 5/1999 | Sugihara |
| 5,967,933 A | 10/1999 | Valdenaire |
| 5,984,826 A | 11/1999 | Nakano |
| 5,995,895 A | 11/1999 | Watt et al. |
| 6,000,707 A | 12/1999 | Miller |
| 6,004,239 A | 12/1999 | Makino |
| 6,006,151 A | 12/1999 | Graf |
| 6,015,359 A | 1/2000 | Kunii |
| 6,019,701 A | 2/2000 | Mori et al. |
| 6,029,990 A | 2/2000 | Busby |
| 6,042,132 A | 3/2000 | Suenaga et al. |
| 6,045,477 A | 4/2000 | Schmidt |
| 6,045,481 A | 4/2000 | Kumagai |
| 6,053,833 A | 4/2000 | Masaki |
| 6,053,841 A | 4/2000 | Kolde et al. |
| 6,054,844 A | 4/2000 | Frank |
| 6,066,067 A | 5/2000 | Greenwood |
| 6,071,210 A | 6/2000 | Kato |
| 6,076,846 A | 6/2000 | Clardy |
| 6,079,726 A | 6/2000 | Busby |
| 6,086,506 A | 7/2000 | Petersmann et al. |
| 6,095,940 A | 8/2000 | Ai et al. |
| 6,099,431 A | 8/2000 | Hoge et al. |
| 6,113,513 A | 9/2000 | Itoh et al. |
| 6,119,539 A | 9/2000 | Papanicolaou |
| 6,119,800 A | 9/2000 | McComber |
| 6,159,126 A | 12/2000 | Oshidan |
| 6,171,210 B1 | 1/2001 | Miyata et al. |
| 6,174,260 B1 | 1/2001 | Tsukada et al. |
| 6,186,922 B1 | 2/2001 | Bursal et al. |
| 6,217,473 B1 | 4/2001 | Ueda et al. |
| 6,241,636 B1 | 6/2001 | Miller |
| 6,243,638 B1 | 6/2001 | Abo et al. |
| 6,251,038 B1 | 6/2001 | Ishikawa et al. |
| 6,258,003 B1 | 7/2001 | Hirano et al. |
| 6,258,174 B1 | 7/2001 | Matsumoto et al. |
| 6,261,200 B1 | 7/2001 | Miyata et al. |
| 6,311,113 B1 | 10/2001 | Danz et al. |
| 6,312,358 B1 | 11/2001 | Goi et al. |
| 6,322,475 B2 | 11/2001 | Miller |
| 6,325,386 B1 | 12/2001 | Shoge |
| 6,358,179 B1 | 3/2002 | Sakai et al. |
| 6,375,412 B1 | 4/2002 | Dial |
| 6,390,945 B1 | 5/2002 | Young |
| 6,390,946 B1 | 5/2002 | Hibi et al. |
| 6,406,399 B1 | 6/2002 | Ai |
| 6,414,401 B1 | 7/2002 | Kuroda et al. |
| 6,419,608 B1 | 7/2002 | Miller |
| 6,425,838 B1 | 7/2002 | Matsubara et al. |
| 6,434,960 B1 | 8/2002 | Rousseau |
| 6,440,037 B2 | 8/2002 | Takagi et al. |
| 6,461,268 B1 | 10/2002 | Milner |
| 6,482,094 B2 | 11/2002 | Kefes |
| 6,492,785 B1 | 12/2002 | Kasten et al. |
| 6,494,805 B2 | 12/2002 | Ooyama et al. |
| 6,499,373 B2 | 12/2002 | Van Cor |
| 6,514,175 B2 | 2/2003 | Taniguchi et al. |
| 6,532,890 B2 | 3/2003 | Chen |
| 6,551,210 B2 | 4/2003 | Miller |
| 6,575,047 B2 | 6/2003 | Reik et al. |
| 6,659,901 B2 | 12/2003 | Sakai et al. |
| 6,672,418 B1 | 1/2004 | Makino |
| 6,676,559 B2 | 1/2004 | Miller |
| 6,679,109 B2 | 1/2004 | Gierling et al. |
| 6,682,432 B1 | 1/2004 | Shinozuka |
| 6,689,012 B2 | 2/2004 | Miller |
| 6,721,637 B2 | 4/2004 | Abe et al. |
| 6,723,016 B2 | 4/2004 | Sumi |
| 6,805,654 B2 | 10/2004 | Nishii |
| 6,808,053 B2 | 10/2004 | Kirkwood et al. |
| 6,839,617 B2 | 1/2005 | Mensler et al. |
| 6,849,020 B2 | 2/2005 | Sumi |
| 6,859,709 B2 | 2/2005 | Joe et al. |
| 6,931,316 B2 | 8/2005 | Joe et al. |
| 6,932,739 B2 | 8/2005 | Miyata et al. |
| 6,942,593 B2 | 9/2005 | Nishii et al. |
| 6,945,903 B2 | 9/2005 | Miller |
| 6,949,049 B2 | 9/2005 | Miller |
| 6,958,029 B2 | 10/2005 | Inoue |
| 6,991,575 B2 | 1/2006 | Inoue |
| 6,991,579 B2 | 1/2006 | Kobayashi et al. |
| 7,011,600 B2 | 3/2006 | Miller et al. |
| 7,011,601 B2 | 3/2006 | Miller |
| 7,014,591 B2 | 3/2006 | Miller |
| 7,029,418 B2 | 4/2006 | Taketsuna et al. |
| 7,032,914 B2 | 4/2006 | Miller |
| 7,036,620 B2 | 5/2006 | Miller et al. |
| 7,044,884 B2 | 5/2006 | Miller |
| 7,063,640 B2 | 6/2006 | Miller |
| 7,074,007 B2 | 7/2006 | Miller |
| 7,074,154 B2 | 7/2006 | Miller |
| 7,074,155 B2 | 7/2006 | Miller |
| 7,077,777 B2 | 7/2006 | Miyata et al. |
| 7,086,979 B2 | 8/2006 | Frenken |
| 7,086,981 B2 | 8/2006 | Ali et al. |
| 7,094,171 B2 | 8/2006 | Inoue |
| 7,111,860 B1 | 9/2006 | Grimaldos |
| 7,112,158 B2 | 9/2006 | Miller |
| 7,112,159 B2 | 9/2006 | Miller et al. |
| 7,125,297 B2 | 10/2006 | Miller et al. |
| 7,131,930 B2 | 11/2006 | Miller et al. |
| 7,140,999 B2 | 11/2006 | Miller |
| 7,147,586 B2 | 12/2006 | Miller et al. |
| 7,153,233 B2 | 12/2006 | Miller et al. |
| 7,156,770 B2 | 1/2007 | Miller |
| 7,160,222 B2 | 1/2007 | Miller |
| 7,163,485 B2 | 1/2007 | Miller |
| 7,163,486 B2 | 1/2007 | Miller et al. |
| 7,166,052 B2 | 1/2007 | Miller et al. |
| 7,166,056 B2 | 1/2007 | Miller et al. |
| 7,166,057 B2 | 1/2007 | Miller et al. |
| 7,166,058 B2 | 1/2007 | Miller et al. |
| 7,169,076 B2 | 1/2007 | Miller et al. |
| 7,172,529 B2 | 2/2007 | Miller et al. |
| 7,175,564 B2 | 2/2007 | Miller |
| 7,175,565 B2 | 2/2007 | Miller et al. |
| 7,175,566 B2 | 2/2007 | Miller et al. |

(56) References Cited

U.S. PATENT DOCUMENTS

| | | |
|---|---|---|
| 7,192,381 B2 | 3/2007 | Miller et al. |
| 7,197,915 B2 | 4/2007 | Luh et al. |
| 7,198,582 B2 | 4/2007 | Miller et al. |
| 7,198,583 B2 | 4/2007 | Miller et al. |
| 7,198,584 B2 | 4/2007 | Miller et al. |
| 7,198,585 B2 | 4/2007 | Miller et al. |
| 7,201,693 B2 | 4/2007 | Miller et al. |
| 7,201,694 B2 | 4/2007 | Miller et al. |
| 7,201,695 B2 | 4/2007 | Miller et al. |
| 7,204,777 B2 | 4/2007 | Miller et al. |
| 7,214,159 B2 | 5/2007 | Miller et al. |
| 7,217,215 B2 | 5/2007 | Miller et al. |
| 7,217,216 B2 | 5/2007 | Inoue |
| 7,217,219 B2 | 5/2007 | Miller |
| 7,217,220 B2 | 5/2007 | Careau et al. |
| 7,232,395 B2 | 6/2007 | Miller et al. |
| 7,234,873 B2 | 6/2007 | Kato et al. |
| 7,235,031 B2 | 6/2007 | Miller et al. |
| 7,238,136 B2 | 7/2007 | Miller et al. |
| 7,238,137 B2 | 7/2007 | Miller et al. |
| 7,238,138 B2 | 7/2007 | Miller et al. |
| 7,238,139 B2 | 7/2007 | Roethler et al. |
| 7,246,672 B2 | 7/2007 | Shirai et al. |
| 7,250,018 B2 | 7/2007 | Miller et al. |
| 7,261,663 B2 | 8/2007 | Miller et al. |
| 7,275,610 B2 | 10/2007 | Kuang et al. |
| 7,285,068 B2 | 10/2007 | Hosoi |
| 7,288,042 B2 | 10/2007 | Miller et al. |
| 7,288,043 B2 | 10/2007 | Shioiri et al. |
| 7,320,660 B2 | 1/2008 | Miller |
| 7,322,901 B2 | 1/2008 | Miller et al. |
| 7,343,236 B2 | 3/2008 | Wilson |
| 7,347,801 B2 | 3/2008 | Guenter et al. |
| 7,384,370 B2 | 6/2008 | Miller |
| 7,393,300 B2 | 7/2008 | Miller et al. |
| 7,393,302 B2 | 7/2008 | Miller |
| 7,393,303 B2 | 7/2008 | Miller |
| 7,395,731 B2 | 7/2008 | Miller et al. |
| 7,396,209 B2 | 7/2008 | Miller et al. |
| 7,402,122 B2 | 7/2008 | Miller |
| 7,410,443 B2 | 8/2008 | Miller |
| 7,419,451 B2 | 9/2008 | Miller |
| 7,422,541 B2 | 9/2008 | Miller |
| 7,422,546 B2 | 9/2008 | Miller et al. |
| 7,427,253 B2 | 9/2008 | Miller |
| 7,431,677 B2 | 10/2008 | Miller et al. |
| 7,452,297 B2 | 11/2008 | Miller et al. |
| 7,455,611 B2 | 11/2008 | Miller et al. |
| 7,455,617 B2 | 11/2008 | Miller et al. |
| 7,462,123 B2 | 12/2008 | Miller et al. |
| 7,462,127 B2 | 12/2008 | Miller et al. |
| 7,470,210 B2 | 12/2008 | Miller et al. |
| 7,478,885 B2 | 1/2009 | Urabe |
| 7,481,736 B2 | 1/2009 | Miller et al. |
| 7,510,499 B2 | 3/2009 | Miller et al. |
| 7,540,818 B2 | 6/2009 | Miller et al. |
| 7,547,264 B2 | 6/2009 | Usoro |
| 7,574,935 B2 | 8/2009 | Rohl et al. |
| 7,591,755 B2 | 9/2009 | Petrzik et al. |
| 7,632,203 B2 | 12/2009 | Miller |
| 7,651,437 B2 | 1/2010 | Miller et al. |
| 7,654,928 B2 | 2/2010 | Miller et al. |
| 7,670,243 B2 | 3/2010 | Miller |
| 7,686,729 B2 | 3/2010 | Miller et al. |
| 7,727,101 B2 | 6/2010 | Miller |
| 7,727,106 B2 | 6/2010 | Maheu et al. |
| 7,727,107 B2 | 6/2010 | Miller |
| 7,727,108 B2 | 6/2010 | Miller et al. |
| 7,727,110 B2 | 6/2010 | Miller et al. |
| 7,727,115 B2 | 6/2010 | Serkh |
| 7,731,615 B2 | 6/2010 | Miller et al. |
| 7,762,919 B2 | 7/2010 | Smithson et al. |
| 7,762,920 B2 | 7/2010 | Smithson et al. |
| 7,785,228 B2 | 8/2010 | Smithson et al. |
| 7,828,685 B2 | 11/2010 | Miller |
| 7,837,592 B2 | 11/2010 | Miller |
| 7,871,353 B2 | 1/2011 | Nichols et al. |
| 7,882,762 B2 | 2/2011 | Armstrong et al. |
| 7,883,442 B2 | 2/2011 | Miller et al. |
| 7,885,747 B2 | 2/2011 | Miller et al. |
| 7,887,032 B2 | 2/2011 | Malone |
| 7,909,723 B2 | 3/2011 | Triller et al. |
| 7,909,727 B2 | 3/2011 | Smithson et al. |
| 7,914,029 B2 | 3/2011 | Miller et al. |
| 7,959,533 B2 | 6/2011 | Nichols et al. |
| 7,963,880 B2 | 6/2011 | Smithson et al. |
| 7,967,719 B2 | 6/2011 | Smithson et al. |
| 7,976,426 B2 | 7/2011 | Smithson et al. |
| 8,066,613 B2 | 11/2011 | Smithson et al. |
| 8,066,614 B2 | 11/2011 | Miller et al. |
| 8,070,635 B2 | 12/2011 | Miller |
| 8,087,482 B2 | 1/2012 | Miles et al. |
| 8,123,653 B2 | 2/2012 | Smithson et al. |
| 8,133,149 B2 | 3/2012 | Smithson et al. |
| 8,142,323 B2 | 3/2012 | Tsuchiya et al. |
| 8,167,759 B2 | 5/2012 | Pohl et al. |
| 8,171,636 B2 | 5/2012 | Smithson et al. |
| 8,230,961 B2 | 7/2012 | Schneidewind |
| 8,262,536 B2 | 9/2012 | Nichols et al. |
| 8,267,829 B2 | 9/2012 | Miller et al. |
| 8,313,404 B2 | 11/2012 | Carter et al. |
| 8,313,405 B2 | 11/2012 | Bazyn et al. |
| 8,317,650 B2 | 11/2012 | Nichols et al. |
| 8,317,651 B2 | 11/2012 | Lohr |
| 8,321,097 B2 | 11/2012 | Vasiliotis et al. |
| 8,342,999 B2 | 1/2013 | Miller |
| 8,360,917 B2 | 1/2013 | Nichols et al. |
| 8,376,889 B2 | 2/2013 | Hoffman et al. |
| 8,376,903 B2 | 2/2013 | Pohl et al. |
| 8,382,631 B2 | 2/2013 | Hoffman et al. |
| 8,382,637 B2 | 2/2013 | Tange |
| 8,393,989 B2 | 3/2013 | Pohl |
| 8,398,518 B2 | 3/2013 | Nichols et al. |
| 8,469,853 B2 | 6/2013 | Miller et al. |
| 8,480,529 B2 | 7/2013 | Pohl et al. |
| 8,496,554 B2 | 7/2013 | Pohl et al. |
| 8,506,452 B2 | 8/2013 | Pohl et al. |
| 8,535,199 B2 | 9/2013 | Lohr et al. |
| 8,550,949 B2 | 10/2013 | Miller |
| 8,585,528 B2 | 11/2013 | Carter et al. |
| 8,628,443 B2 | 1/2014 | Miller et al. |
| 8,641,572 B2 | 2/2014 | Nichols et al. |
| 8,641,577 B2 | 2/2014 | Nichols et al. |
| 8,721,485 B2 | 5/2014 | Lohr et al. |
| 8,738,255 B2 | 5/2014 | Carter et al. |
| 8,784,248 B2 | 7/2014 | Murakami et al. |
| 8,790,214 B2 | 7/2014 | Lohr et al. |
| 8,818,661 B2 | 8/2014 | Keilers et al. |
| 8,845,485 B2 | 9/2014 | Smithson et al. |
| 8,852,050 B2 | 10/2014 | Thomassy |
| 8,888,643 B2 | 11/2014 | Lohr et al. |
| 8,996,263 B2 | 3/2015 | Quinn et al. |
| 2001/0008192 A1 | 7/2001 | Morisawa |
| 2001/041644 A1 | 11/2001 | Yasuoka et al. |
| 2001/0044361 A1 | 11/2001 | Taniguchi et al. |
| 2002/0019285 A1 | 2/2002 | Henzler |
| 2002/0028722 A1 | 3/2002 | Sakai et al. |
| 2002/0037786 A1 | 3/2002 | Hirano et al. |
| 2002/0045511 A1 | 4/2002 | Geiberger et al. |
| 2002/0125097 A1 | 9/2002 | Ochab et al. |
| 2002/0128107 A1 | 9/2002 | Wakayama |
| 2002/0169051 A1 | 11/2002 | Oshidari |
| 2003/0015358 A1 | 1/2003 | Abe et al. |
| 2003/0015874 A1 | 1/2003 | Abe et al. |
| 2003/0022753 A1 | 1/2003 | Mizuno et al. |
| 2003/0036456 A1 | 2/2003 | Skrabs |
| 2003/0132051 A1 | 7/2003 | Nishii et al. |
| 2003/0135316 A1 | 7/2003 | Kawamura et al. |
| 2003/0160420 A1 | 8/2003 | Fukuda |
| 2003/0216216 A1 | 11/2003 | Inoue et al. |
| 2003/0221892 A1 | 12/2003 | Matsumoto et al. |
| 2004/0038772 A1 | 2/2004 | McIndoe et al. |
| 2004/0058772 A1 | 3/2004 | Inoue et al. |
| 2004/0067816 A1 | 4/2004 | Taketsuna et al. |

(56) References Cited

U.S. PATENT DOCUMENTS

| | | |
|---|---|---|
| 2004/0082421 A1 | 4/2004 | Wafzig |
| 2004/0092359 A1 | 5/2004 | Imanishi et al. |
| 2004/0119345 A1 | 6/2004 | Takano |
| 2004/0171452 A1 | 9/2004 | Miller et al. |
| 2004/0171457 A1 | 9/2004 | Fuller |
| 2004/0204283 A1 | 10/2004 | Inoue |
| 2004/0231331 A1 | 11/2004 | Iwanami et al. |
| 2004/0254047 A1 | 12/2004 | Frank et al. |
| 2005/0037876 A1 | 2/2005 | Unno et al. |
| 2005/0085979 A1 | 4/2005 | Carlson et al. |
| 2005/0184580 A1 | 8/2005 | Kuan et al. |
| 2005/0227809 A1 | 10/2005 | Bitzer et al. |
| 2006/0006008 A1 | 1/2006 | Brunemann et al. |
| 2006/0052204 A1 | 3/2006 | Eckert et al. |
| 2006/0084549 A1 | 4/2006 | Smithson et al. |
| 2006/0084594 A1 | 4/2006 | Santin et al. |
| 2006/0108956 A1 | 5/2006 | Clark |
| 2006/0111212 A9 | 5/2006 | Ai et al. |
| 2006/0154775 A1 | 7/2006 | Ali et al. |
| 2006/0172829 A1 | 8/2006 | Ishio |
| 2006/0180363 A1 | 8/2006 | Uchisasai |
| 2006/0223667 A1 | 10/2006 | Nakazeki |
| 2006/0234822 A1 | 10/2006 | Morscheck et al. |
| 2006/0276299 A1 | 12/2006 | Imanishi |
| 2007/0004552 A1 | 1/2007 | Matsudaira et al. |
| 2007/0004556 A1 | 1/2007 | Rohs et al. |
| 2007/0049450 A1 | 3/2007 | Miller |
| 2007/0099753 A1 | 5/2007 | Matsui et al. |
| 2007/0142161 A1 | 6/2007 | Miller |
| 2007/0149342 A1 | 6/2007 | Guenter et al. |
| 2007/0155567 A1 | 7/2007 | Miller et al. |
| 2007/0155580 A1 | 7/2007 | Nichols et al. |
| 2007/0228687 A1 | 10/2007 | Parker |
| 2008/0032852 A1 | 2/2008 | Smithson et al. |
| 2008/0032853 A1 | 2/2008 | Smithson et al. |
| 2008/0032854 A1 | 2/2008 | Smithson et al. |
| 2008/0034585 A1 | 2/2008 | Smithson et al. |
| 2008/0034586 A1 | 2/2008 | Smithson et al. |
| 2008/0039269 A1 | 2/2008 | Smithson et al. |
| 2008/0039270 A1 | 2/2008 | Smithson et al. |
| 2008/0039271 A1 | 2/2008 | Smithson et al. |
| 2008/0039272 A1 | 2/2008 | Smithson et al. |
| 2008/0039273 A1 | 2/2008 | Smithson et al. |
| 2008/0039274 A1 | 2/2008 | Smithson et al. |
| 2008/0039275 A1 | 2/2008 | Smithson et al. |
| 2008/0039276 A1 | 2/2008 | Smithson et al. |
| 2008/0039277 A1 | 2/2008 | Smithson et al. |
| 2008/0040008 A1 | 2/2008 | Smithson et al. |
| 2008/0081728 A1 | 4/2008 | Faulring et al. |
| 2008/0121487 A1 | 5/2008 | Miller et al. |
| 2008/0125281 A1 | 5/2008 | Miller et al. |
| 2008/0125282 A1 | 5/2008 | Miller et al. |
| 2008/0132373 A1 | 6/2008 | Miller et al. |
| 2008/0132377 A1 | 6/2008 | Miller et al. |
| 2008/0139363 A1 | 6/2008 | Williams |
| 2008/0141809 A1 | 6/2008 | Miller et al. |
| 2008/0141810 A1 | 6/2008 | Miller et al. |
| 2008/0146403 A1 | 6/2008 | Miller |
| 2008/0146404 A1 | 6/2008 | Miller |
| 2008/0149407 A1 | 6/2008 | Shibata et al. |
| 2008/0161151 A1 | 7/2008 | Miller |
| 2008/0188345 A1 | 8/2008 | Miller |
| 2008/0200300 A1 | 8/2008 | Smithson et al. |
| 2008/0228362 A1 | 9/2008 | Muller et al. |
| 2008/0236319 A1 | 10/2008 | Nichols et al. |
| 2008/0248917 A1 | 10/2008 | Nichols et al. |
| 2008/0261771 A1 | 10/2008 | Nichols et al. |
| 2008/0284170 A1 | 11/2008 | Cory |
| 2008/0305920 A1 | 12/2008 | Nishii et al. |
| 2009/0023545 A1 | 1/2009 | Beaudoin |
| 2009/0082169 A1 | 3/2009 | Kolstrup |
| 2009/0107454 A1 | 4/2009 | Hiyoshi et al. |
| 2009/0132135 A1 | 5/2009 | Quinn et al. |
| 2009/0164076 A1 | 6/2009 | Vasiliotis et al. |
| 2009/0189397 A1 | 7/2009 | Miller et al. |
| 2009/0251013 A1 | 10/2009 | Vollmer et al. |
| 2010/0056322 A1 | 3/2010 | Thomassy |
| 2011/0088503 A1 | 4/2011 | Armstrong et al. |
| 2011/0127096 A1 | 6/2011 | Schneidewind |
| 2011/0218072 A1 | 9/2011 | Lohr et al. |
| 2011/0230297 A1 | 9/2011 | Shiina et al. |
| 2011/0291507 A1 | 12/2011 | Post |
| 2011/0319222 A1 | 12/2011 | Ogawa et al. |
| 2012/0035015 A1 | 2/2012 | Ogawa et al. |
| 2012/0258839 A1 | 10/2012 | Smithson et al. |
| 2013/0035200 A1 | 2/2013 | Noji et al. |
| 2013/0053211 A1 | 2/2013 | Fukuda et al. |
| 2013/0072340 A1 | 3/2013 | Bazyn et al. |
| 2013/0079191 A1 | 3/2013 | Lohr |
| 2013/0080006 A1 | 3/2013 | Vasiliotis et al. |
| 2013/0095977 A1 | 4/2013 | Smithson et al. |
| 2013/0102434 A1 | 4/2013 | Nichols et al. |
| 2013/0106258 A1 | 5/2013 | Miller |
| 2013/0146406 A1 | 6/2013 | Nichols et al. |
| 2013/0152715 A1 | 6/2013 | Pohl et al. |
| 2013/0190123 A1 | 7/2013 | Pohl et al. |
| 2013/0310214 A1 | 11/2013 | Pohl et al. |
| 2013/0324344 A1 | 12/2013 | Pohl et al. |
| 2013/0337971 A1 | 12/2013 | Kolstrup |
| 2014/0011619 A1 | 1/2014 | Pohl et al. |
| 2014/0038771 A1 | 2/2014 | Miller |
| 2014/0073470 A1 | 3/2014 | Carter et al. |
| 2014/0121922 A1 | 5/2014 | Vasiliotis et al. |
| 2014/0128195 A1 | 5/2014 | Miller et al. |
| 2014/0141919 A1 | 5/2014 | Bazyn et al. |
| 2014/0144260 A1 | 5/2014 | Nichols et al. |
| 2014/0148303 A1 | 5/2014 | Nichols et al. |
| 2014/0179479 A1 | 6/2014 | Nichols et al. |
| 2014/0206499 A1 | 7/2014 | Lohr |
| 2014/0248988 A1 | 9/2014 | Lohr et al. |
| 2014/0257650 A1 | 9/2014 | Carter et al. |
| 2014/0323260 A1 | 10/2014 | Miller et al. |
| 2014/0329637 A1 | 11/2014 | Thomassy et al. |
| 2014/0335991 A1 | 11/2014 | Lohr et al. |
| 2014/0365059 A1 | 12/2014 | Keilers et al. |
| 2015/0018154 A1 | 1/2015 | Thomassy |
| 2015/0039195 A1 | 2/2015 | Pohl et al. |
| 2015/0051801 A1 | 2/2015 | Quinn et al. |
| 2015/0072827 A1 | 3/2015 | Lohr et al. |
| 2015/0080165 A1 | 3/2015 | Pohl et al. |
| 2015/0226323 A1 | 8/2015 | Pohl et al. |
| 2015/0233473 A1 | 8/2015 | Miller et al. |
| 2015/0260284 A1 | 9/2015 | Miller et al. |
| 2015/0337928 A1 | 11/2015 | Smithson |

FOREIGN PATENT DOCUMENTS

| | | |
|---|---|---|
| CN | 2245830 | 1/1997 |
| CN | 1157379 A | 8/1997 |
| CN | 1167221 | 12/1997 |
| CN | 1204991 | 1/1999 |
| CN | 1283258 | 2/2001 |
| CN | 1300355 | 6/2001 |
| CN | 1474917 | 2/2004 |
| CN | 1654858 | 8/2005 |
| CN | 2714896 | 8/2005 |
| CN | 1860315 | 11/2006 |
| CN | 1940348 | 4/2007 |
| DE | 498 701 | 5/1930 |
| DE | 1171692 | 6/1964 |
| DE | 2 310880 | 9/1974 |
| DE | 2 136 243 | 1/1975 |
| DE | 2436496 | 2/1975 |
| DE | 39 40 919 A1 | 6/1991 |
| DE | 19851738 | 5/2000 |
| DE | 10155372 A1 | 5/2003 |
| EP | 0 432 742 | 12/1990 |
| EP | 0528381 | 2/1993 |
| EP | 0528382 | 2/1993 |
| EP | 635639 A1 | 1/1995 |
| EP | 0638741 | 2/1995 |
| EP | 0 831 249 | 3/1998 |
| EP | 0 832 816 | 4/1998 |
| EP | 0976956 | 2/2000 |

(56) References Cited

FOREIGN PATENT DOCUMENTS

| | | |
|---|---|---|
| EP | 1136724 | 9/2001 |
| EP | 1366978 | 3/2003 |
| EP | 1 433 641 | 6/2004 |
| EP | 1 624 230 | 2/2006 |
| FR | 620375 | 4/1927 |
| FR | 2460427 A | 1/1981 |
| FR | 2590638 | 5/1987 |
| GB | 391448 | 4/1933 |
| GB | 592320 | 9/1947 |
| GB | 906 002 A | 9/1962 |
| GB | 919430 A | 2/1963 |
| GB | 1132473 | 11/1968 |
| GB | 1165545 | 10/1969 |
| GB | 1 376 057 | 12/1974 |
| GB | 2031822 | 4/1980 |
| GB | 2 035 482 | 6/1980 |
| GB | 2 080 452 | 8/1982 |
| JP | 44-1098 | 1/1944 |
| JP | 38-025315 | 11/1963 |
| JP | 41-3126 | 2/1966 |
| JP | 42-2843 | 2/1967 |
| JP | 42-2844 | 2/1967 |
| JP | 47-000448 | 1/1972 |
| JP | 47-207 | 6/1972 |
| JP | 47-29762 | 11/1972 |
| JP | 48-54371 | 7/1973 |
| JP | 49-12742 | 3/1974 |
| JP | 49-013823 | 4/1974 |
| JP | 49-041536 | 11/1974 |
| JP | 50-114581 | 9/1975 |
| JP | 51-25903 | 8/1976 |
| JP | 51-150380 | 12/1976 |
| JP | 47-20535 | 8/1977 |
| JP | 53-048166 | 1/1978 |
| JP | 55-135259 | 4/1979 |
| JP | 56-047231 | 4/1981 |
| JP | A S56-127852 | 10/1981 |
| JP | 58-065361 | 4/1983 |
| JP | 59-069565 | 4/1984 |
| JP | 59-144826 | 8/1984 |
| JP | 59-190557 | 10/1984 |
| JP | 60-247011 | 12/1985 |
| JP | 61-031754 | 2/1986 |
| JP | 61-053423 | 3/1986 |
| JP | 61-144466 | 7/1986 |
| JP | 61-173722 | 10/1986 |
| JP | 61-270552 | 11/1986 |
| JP | 62-075170 | 4/1987 |
| JP | 63-219953 | 9/1988 |
| JP | 63-160465 | 10/1988 |
| JP | 01-286750 | 11/1989 |
| JP | 01-308142 | 12/1989 |
| JP | 02-130224 | 5/1990 |
| JP | 02-157483 | 6/1990 |
| JP | 02-271142 | 6/1990 |
| JP | 02-182593 | 7/1990 |
| JP | 03-223555 | 10/1991 |
| JP | 04-166619 | 6/1992 |
| JP | 04-272553 | 9/1992 |
| JP | 04-327055 | 11/1992 |
| JP | 04-351361 | 12/1992 |
| JP | 05-087154 | 4/1993 |
| JP | 52-35481 | 9/1993 |
| JP | 06-050169 | 2/1994 |
| JP | 06-050358 | 2/1994 |
| JP | 7-42799 | 2/1995 |
| JP | 07-133857 | 5/1995 |
| JP | 7-139600 | 5/1995 |
| JP | 07-259950 | 10/1995 |
| JP | 08-170706 A | 7/1996 |
| JP | 08-270772 | 10/1996 |
| JP | 09-024743 A | 1/1997 |
| JP | 09-089064 | 3/1997 |
| JP | 10-061739 | 3/1998 |
| JP | 10-089435 | 4/1998 |
| JP | 10-115355 | 5/1998 |
| JP | 10-115356 | 5/1998 |
| JP | 10-194186 | 7/1998 |
| JP | 10-511621 | 11/1998 |
| JP | 41-1063130 | 3/1999 |
| JP | 11-091411 | 4/1999 |
| JP | 11-257479 | 9/1999 |
| JP | 2000-46135 | 2/2000 |
| JP | 2000-177673 | 6/2000 |
| JP | 2001-27298 | 1/2001 |
| JP | 2001-071986 | 3/2001 |
| JP | 2001-107827 | 4/2001 |
| JP | 2001-165296 | 6/2001 |
| JP | 2001-521109 A | 11/2001 |
| JP | 2002-147558 | 5/2002 |
| JP | 2002-250421 | 6/2002 |
| JP | 2002-307956 | 10/2002 |
| JP | 2002-533626 | 10/2002 |
| JP | 2002-372114 | 12/2002 |
| JP | 2003-028257 | 1/2003 |
| JP | 2003-56662 | 2/2003 |
| JP | 2003-161357 | 6/2003 |
| JP | 2003 194206 | 7/2003 |
| JP | 2003-194207 | 7/2003 |
| JP | 2003-524119 | 8/2003 |
| JP | 2003-336732 | 11/2003 |
| JP | 2004-011834 | 1/2004 |
| JP | 2004-162652 A | 6/2004 |
| JP | 2004-189222 | 7/2004 |
| JP | 8-247245 | 9/2004 |
| JP | 2004-526917 | 9/2004 |
| JP | 2005-003063 | 1/2005 |
| JP | 2005-240928 A | 9/2005 |
| JP | 2005-312121 | 11/2005 |
| JP | 2006-015025 | 1/2006 |
| JP | 2006-283900 | 10/2006 |
| JP | 2006-300241 | 11/2006 |
| JP | 2008-002687 | 1/2008 |
| JP | 03-149442 | 1/2009 |
| JP | 2010-069005 | 4/2010 |
| JP | 2007-535715 | 7/2012 |
| NE | 98467 | 7/1961 |
| TW | 74007 | 1/1984 |
| TW | 175100 | 12/1991 |
| TW | 218909 | 1/1994 |
| TW | 227206 | 7/1994 |
| TW | 275872 | 5/1996 |
| TW | 360184 | 6/1999 |
| TW | 366396 | 8/1999 |
| TW | 512211 | 12/2002 |
| TW | 582363 | 4/2004 |
| TW | 590955 | 6/2004 |
| TW | I225129 | 12/2004 |
| TW | I225912 | 1/2005 |
| TW | I235214 | 1/2005 |
| TW | M294598 | 7/2006 |
| TW | 200637745 A | 11/2006 |
| WO | WO 99/20918 | 4/1999 |
| WO | WO 01/73319 | 10/2001 |
| WO | WO 03/100294 | 12/2003 |
| WO | WO 2005/083305 | 9/2005 |
| WO | WO 2005/108825 | 11/2005 |
| WO | WO 2005/111472 | 11/2005 |
| WO | WO 2006/091503 | 8/2006 |
| WO | WO 2008/057507 | 5/2008 |
| WO | WO 2008/078047 | 7/2008 |
| WO | WO 2008/095116 | 8/2008 |
| WO | WO 2008/100792 | 8/2008 |
| WO | WO 2008/101070 | 8/2008 |
| WO | WO 2008/131353 | 10/2008 |
| WO | WO 2008/154437 | 12/2008 |
| WO | WO 2009/006481 | 1/2009 |
| WO | WO 2009/148461 | 12/2009 |
| WO | WO 2009/157920 | 12/2009 |
| WO | WO 2010/017242 | 2/2010 |
| WO | WO 2010/024809 | 3/2010 |
| WO | WO 2010/044778 | 4/2010 |

(56) References Cited

FOREIGN PATENT DOCUMENTS

| WO | WO 2010/135407 | 11/2010 |
| WO | WO 2011/101991 | 8/2011 |
| WO | WO 2012/030213 | 3/2012 |

OTHER PUBLICATIONS

Notification of Third Office Action dated Dec. 3, 2013 in Chinese Patent Application No. 200880010199.9.
Preliminary Notice of First Office Action dated Apr. 29, 2014 in Taiwan Patent Application No. 97104836.
Preliminary Notice of First Office Action dated Sep. 30, 2014 in Taiwan Patent Application No. 97104836.
Rejection Decision dated Jun. 11, 2015 in Taiwan Patent Application No. 97104836.
International Search Report for International Application No. PCT/US2008/053347 dated Jul. 18, 2008.
Thomassy: An Engineering Approach to Simulating Traction EHL. CVT-Hybrid International Conference Mecc/Maastricht/The Netherlands, Nov. 17-19, 2010, p. 97.

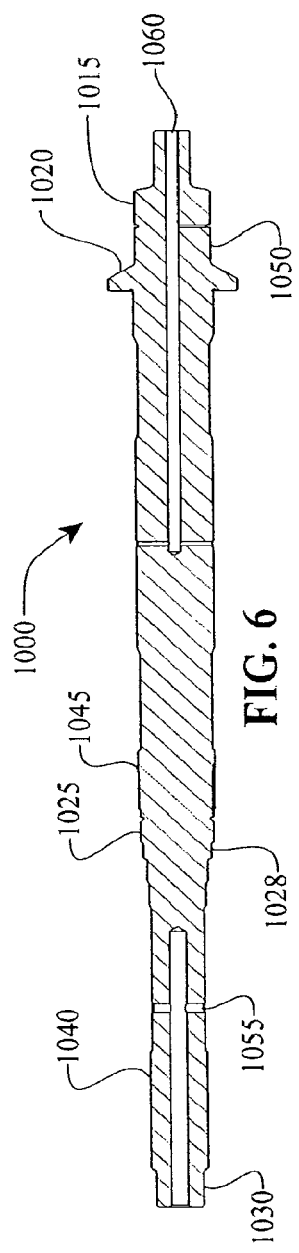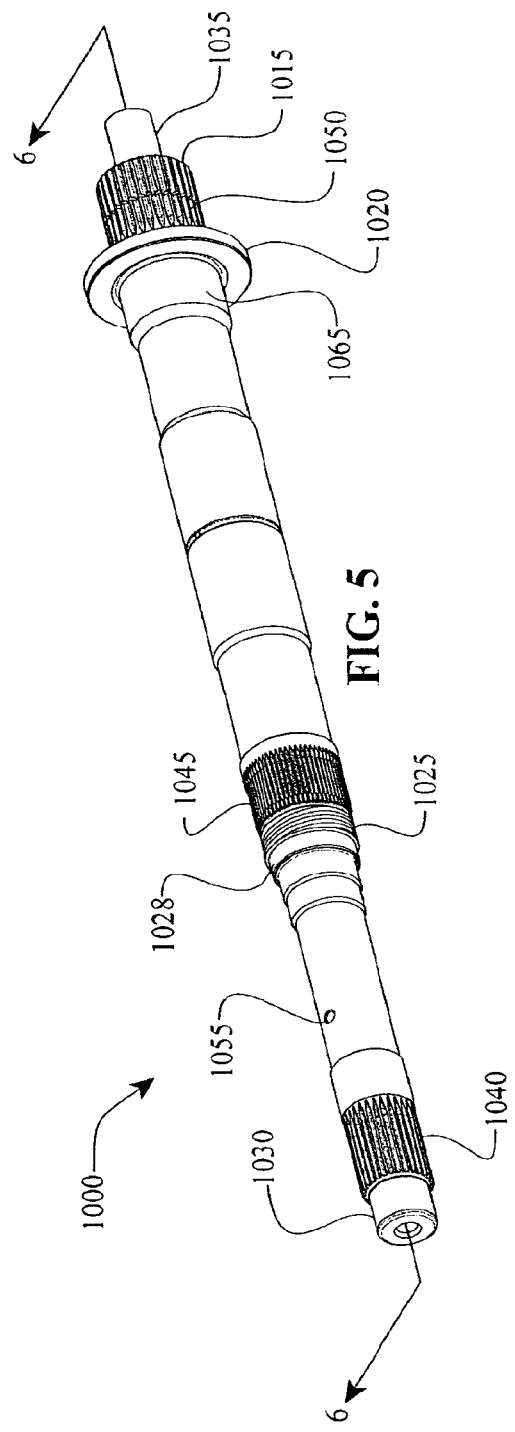

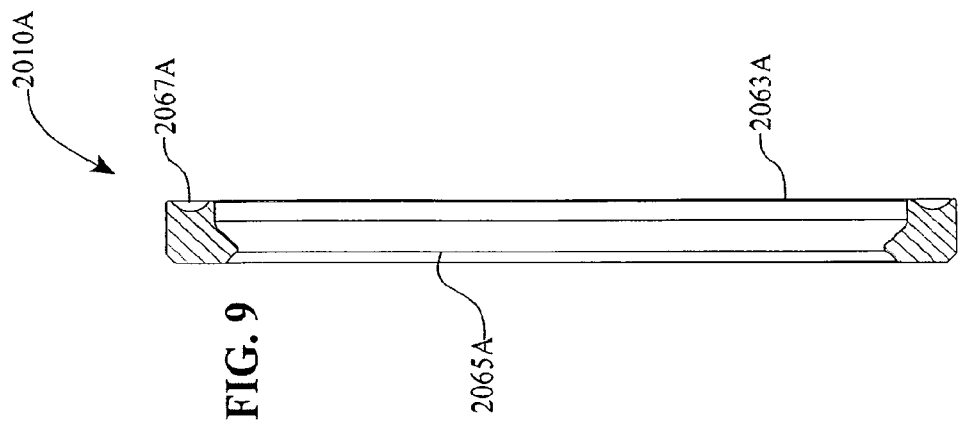
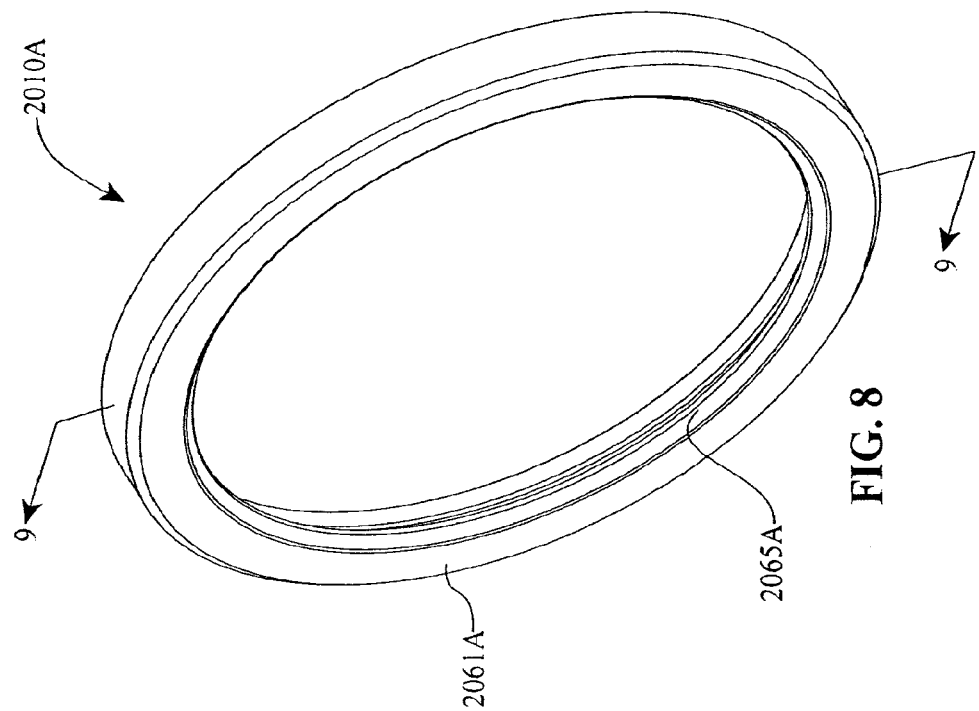

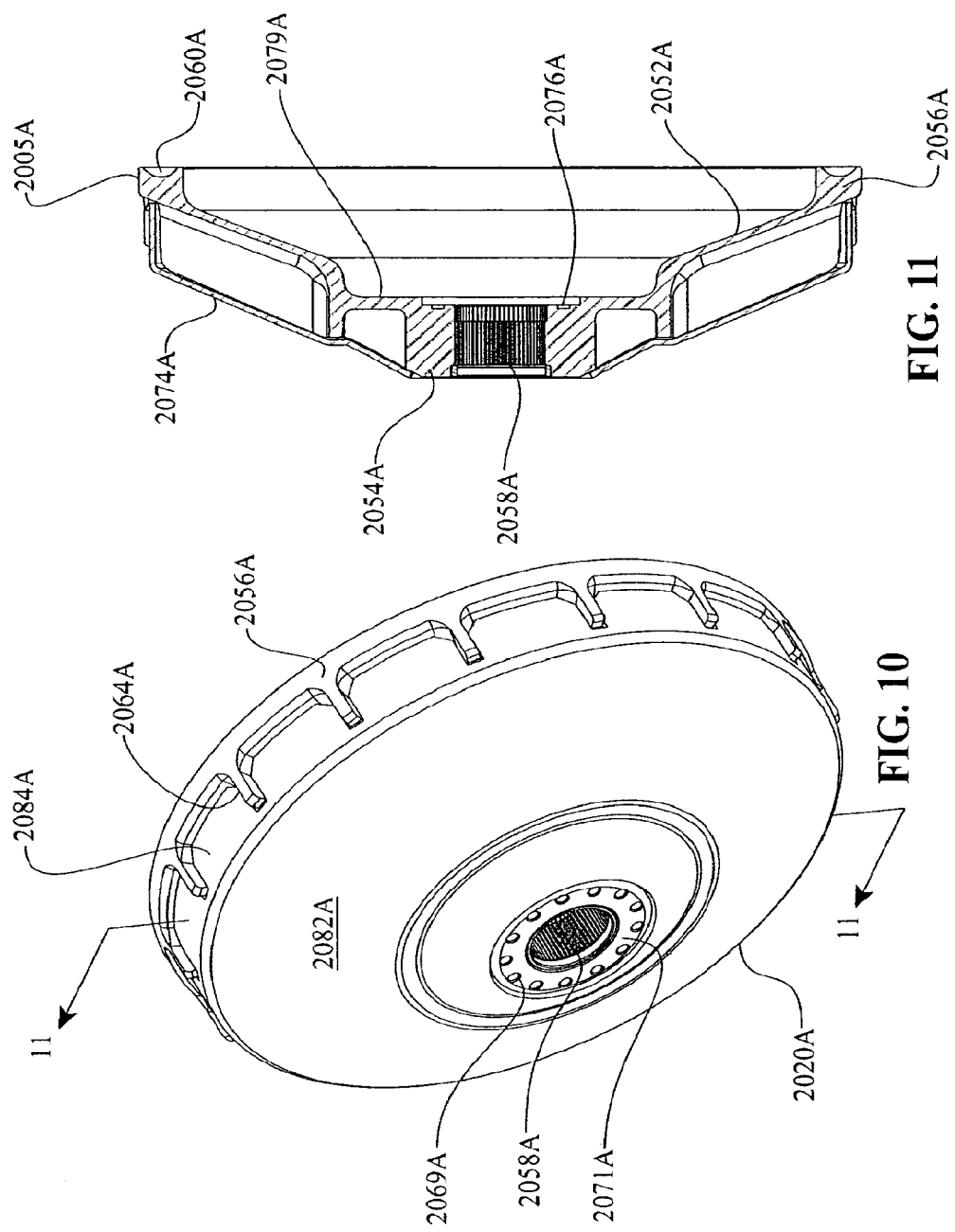

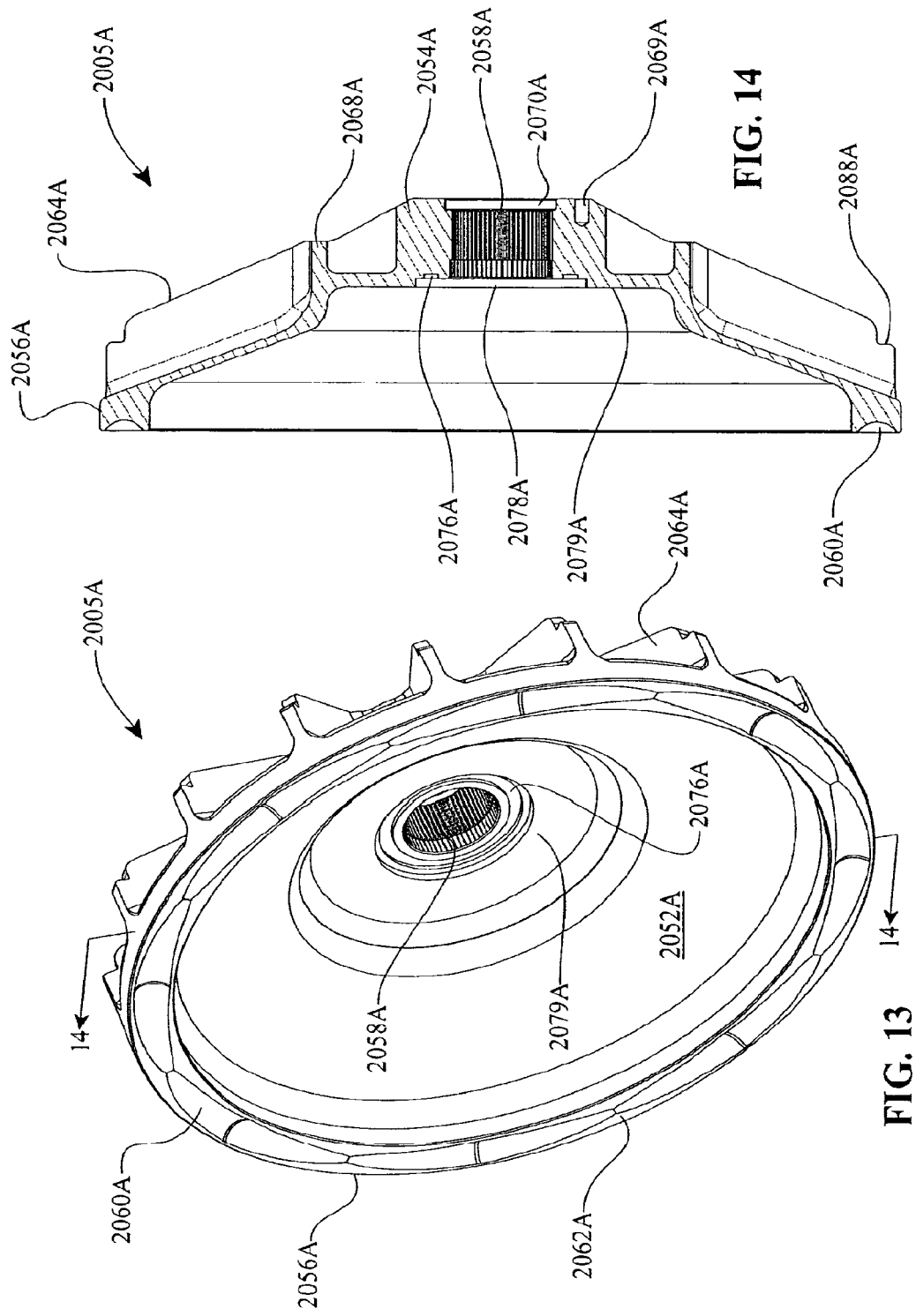

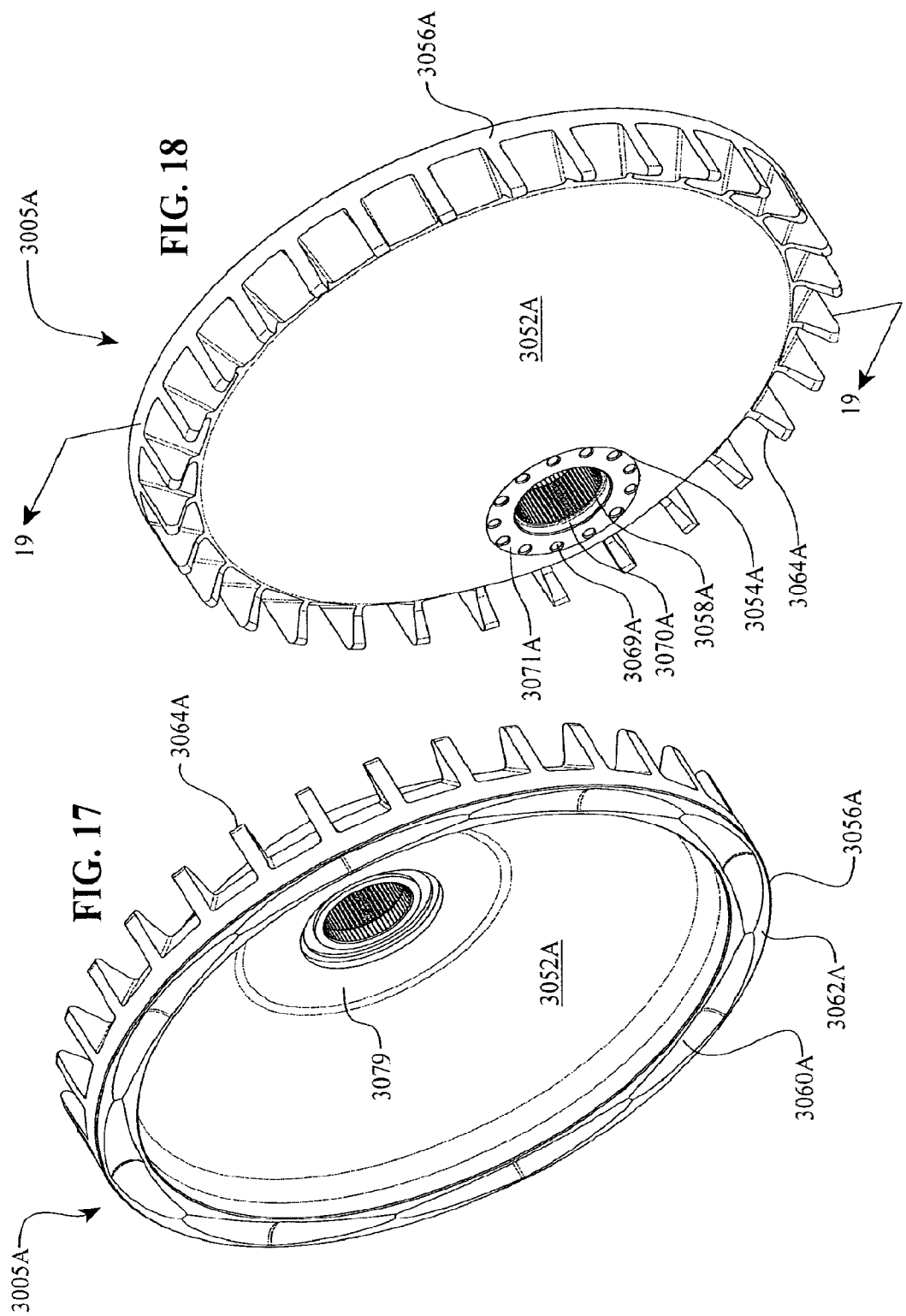

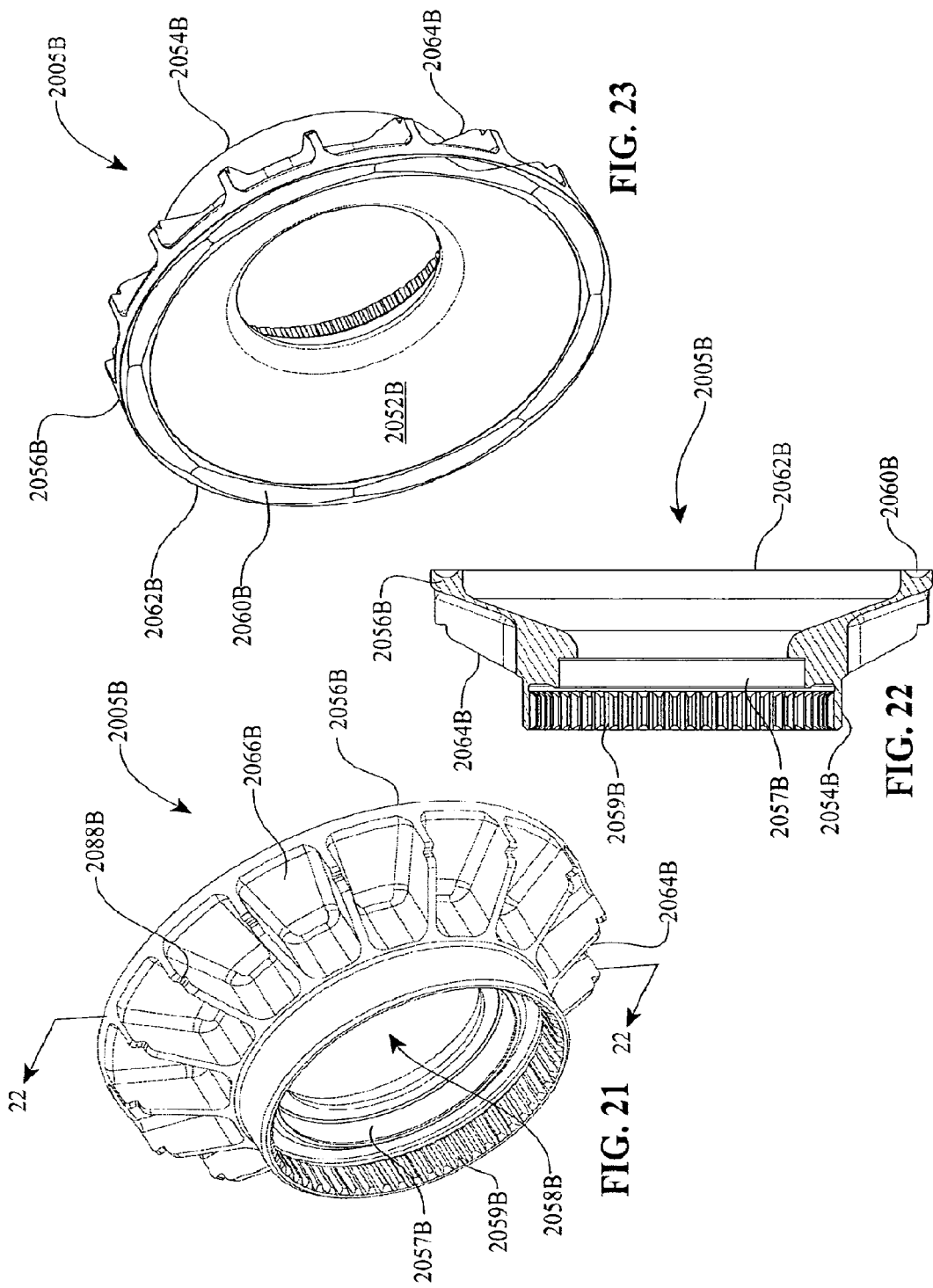

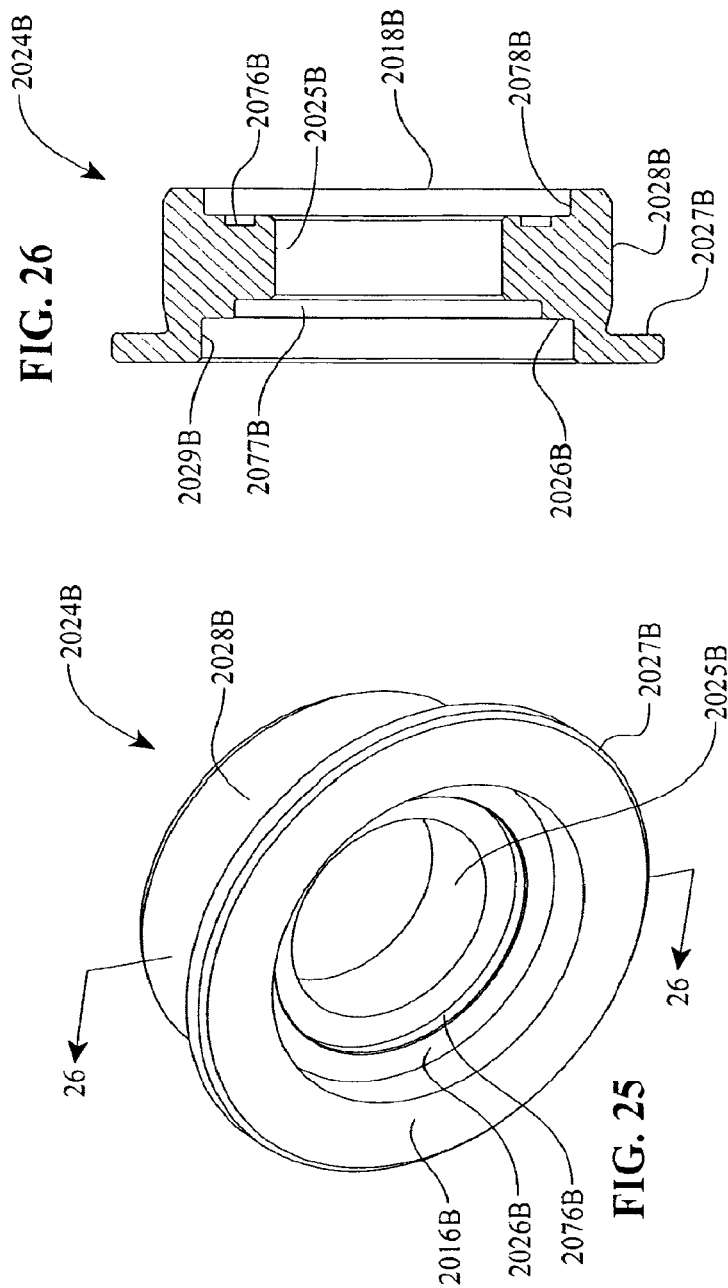

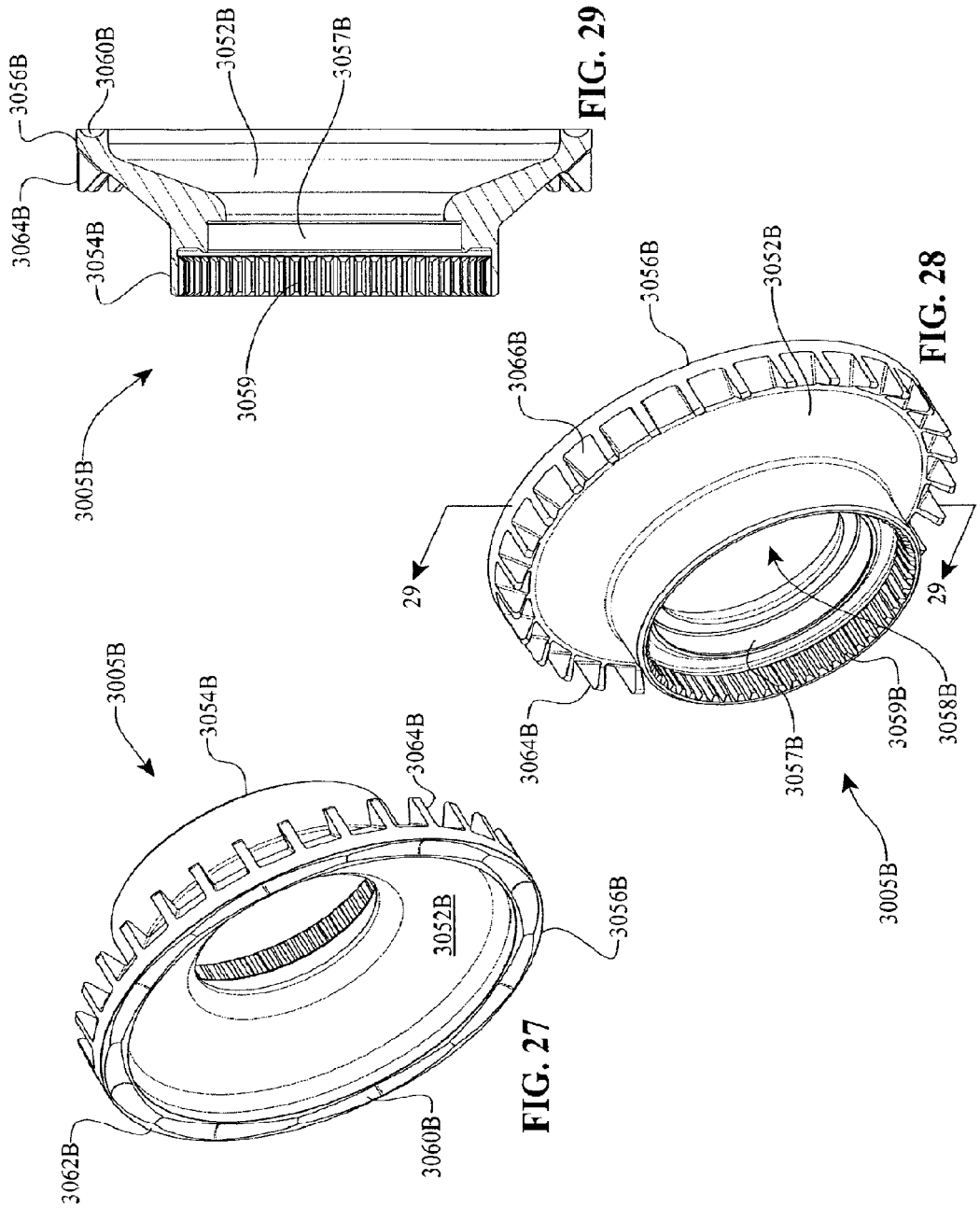

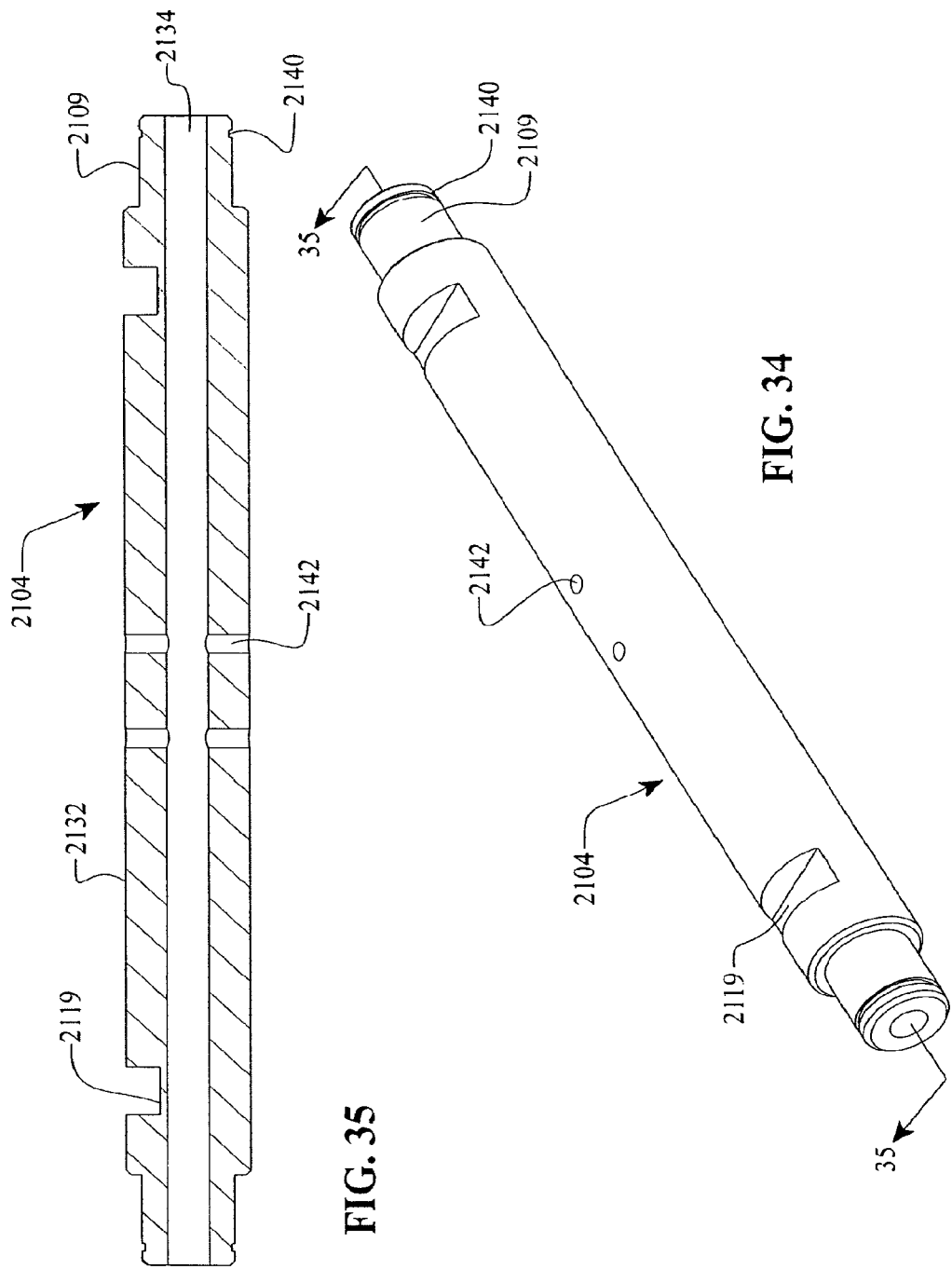

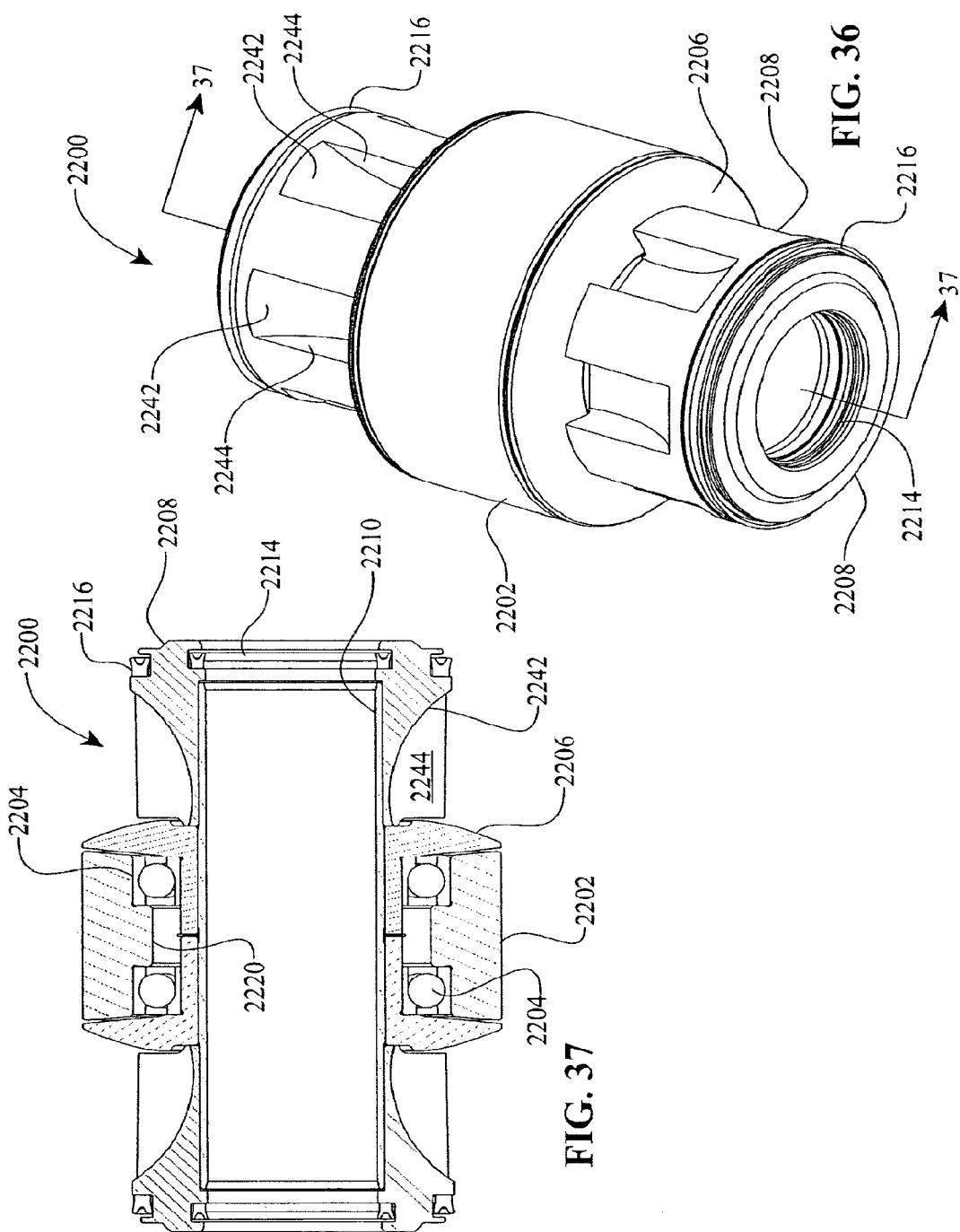

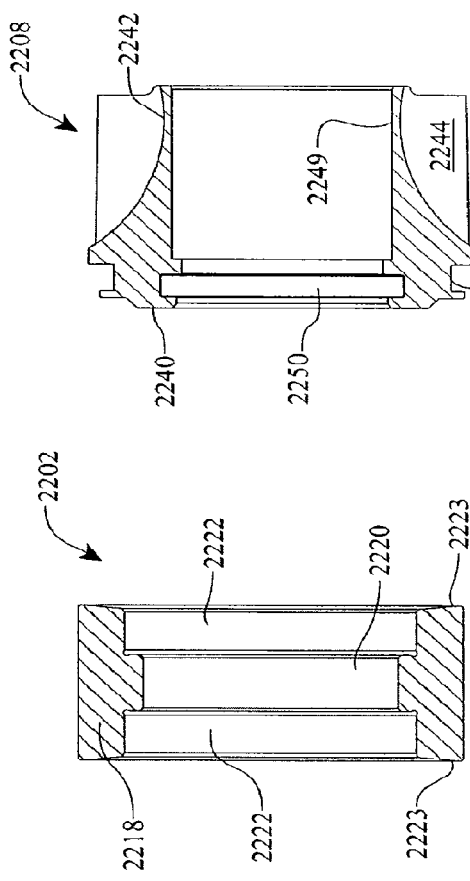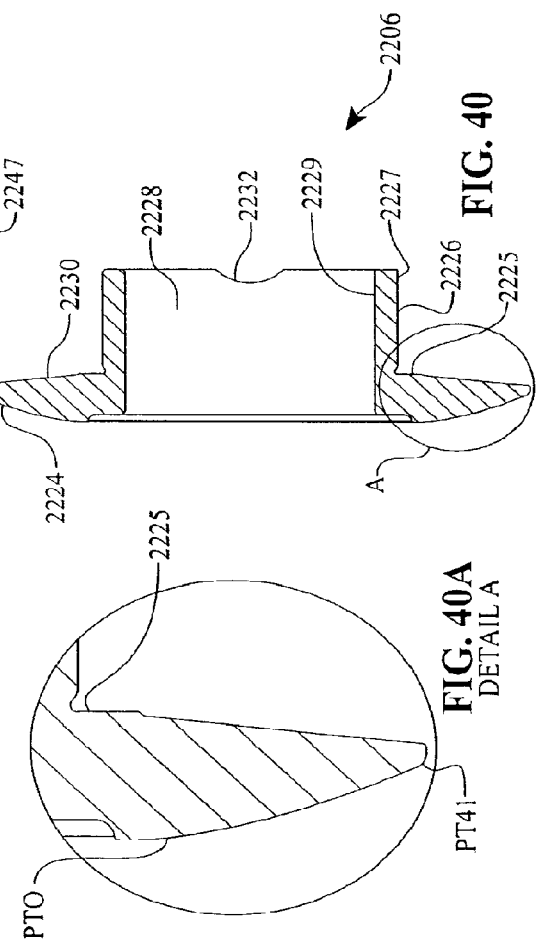

| CAM SURFACE PROFILE | | |
|---|---|---|
| Point Name | X | Y |
| PNT0 | -9.007 | 27.690 |
| PNT1 | -9.030 | 28.189 |
| PNT2 | -9.029 | 28.689 |
| PNT3 | -9.011 | 29.189 |
| PNT4 | -8.979 | 29.688 |
| PNT5 | -8.935 | 30.186 |
| PNT6 | -8.882 | 30.683 |
| PNT7 | -8.819 | 31.179 |
| PNT8 | -8.747 | 31.674 |
| PNT9 | -8.668 | 32.168 |
| PNT10 | -8.582 | 32.660 |
| PNT11 | -8.489 | 33.152 |
| PNT12 | -8.390 | 33.642 |
| PNT13 | -8.285 | 34.131 |
| PNT14 | -8.174 | 34.618 |
| PNT15 | -8.058 | 35.104 |
| PNT16 | -7.937 | 35.589 |
| PNT17 | -7.811 | 36.073 |
| PNT18 | -7.680 | 36.556 |
| PNT19 | -7.544 | 37.037 |
| PNT20 | -7.404 | 37.517 |
| PNT21 | -7.259 | 37.996 |
| PNT22 | -7.110 | 38.473 |
| PNT23 | -6.958 | 38.949 |
| PNT24 | -6.801 | 38.424 |
| PNT25 | -6.640 | 38.897 |
| PNT26 | -6.476 | 40.370 |
| PNT27 | -6.308 | 40.841 |
| PNT28 | -6.136 | 41.310 |
| PNT29 | -5.961 | 41.778 |
| PNT30 | -5.783 | 42.246 |
| PNT31 | -5.601 | 42.711 |
| PNT32 | -5.416 | 43.176 |
| PNT33 | -5.227 | 43.639 |
| PNT34 | -5.036 | 44.101 |
| PNT35 | -4.841 | 44.561 |
| PNT36 | -4.644 | 45.021 |
| PNT37 | -4.443 | 45.479 |
| PNT38 | -4.240 | 45.935 |
| PNT39 | -4.033 | 46.391 |
| PNT40 | -3.824 | 46.845 |
| PNT41 | -3.528 | 46.475 |

*FIG. 41*

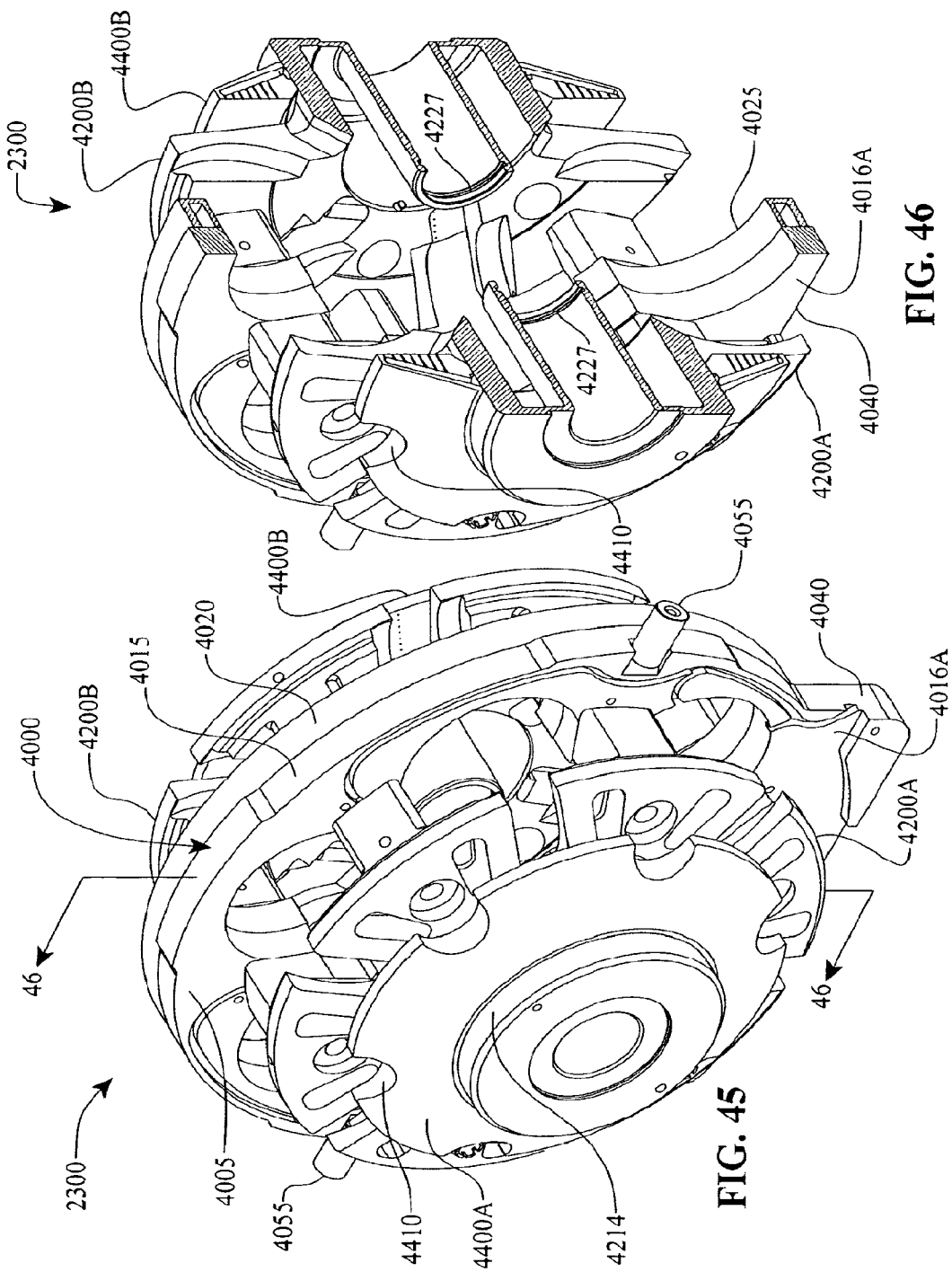

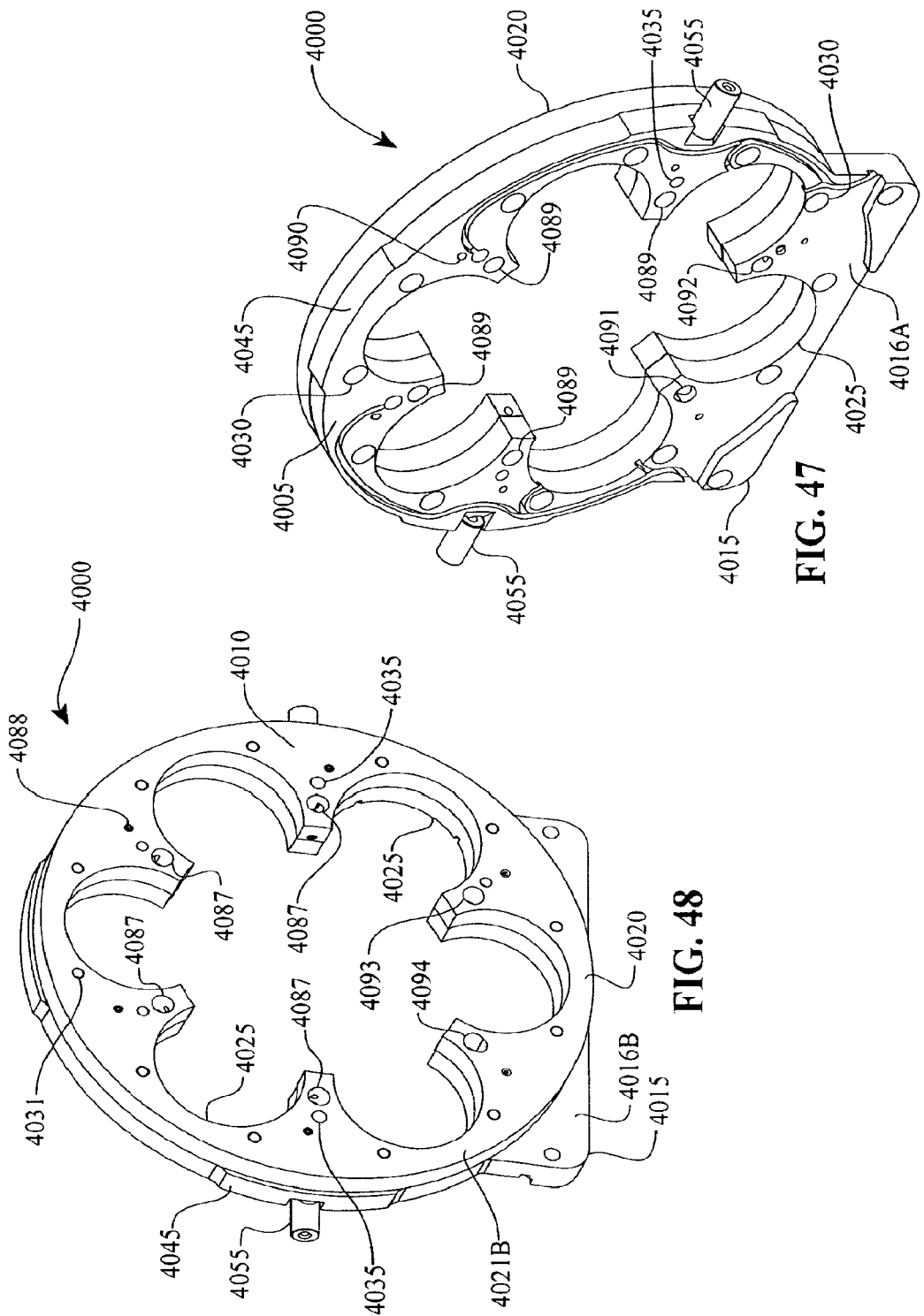

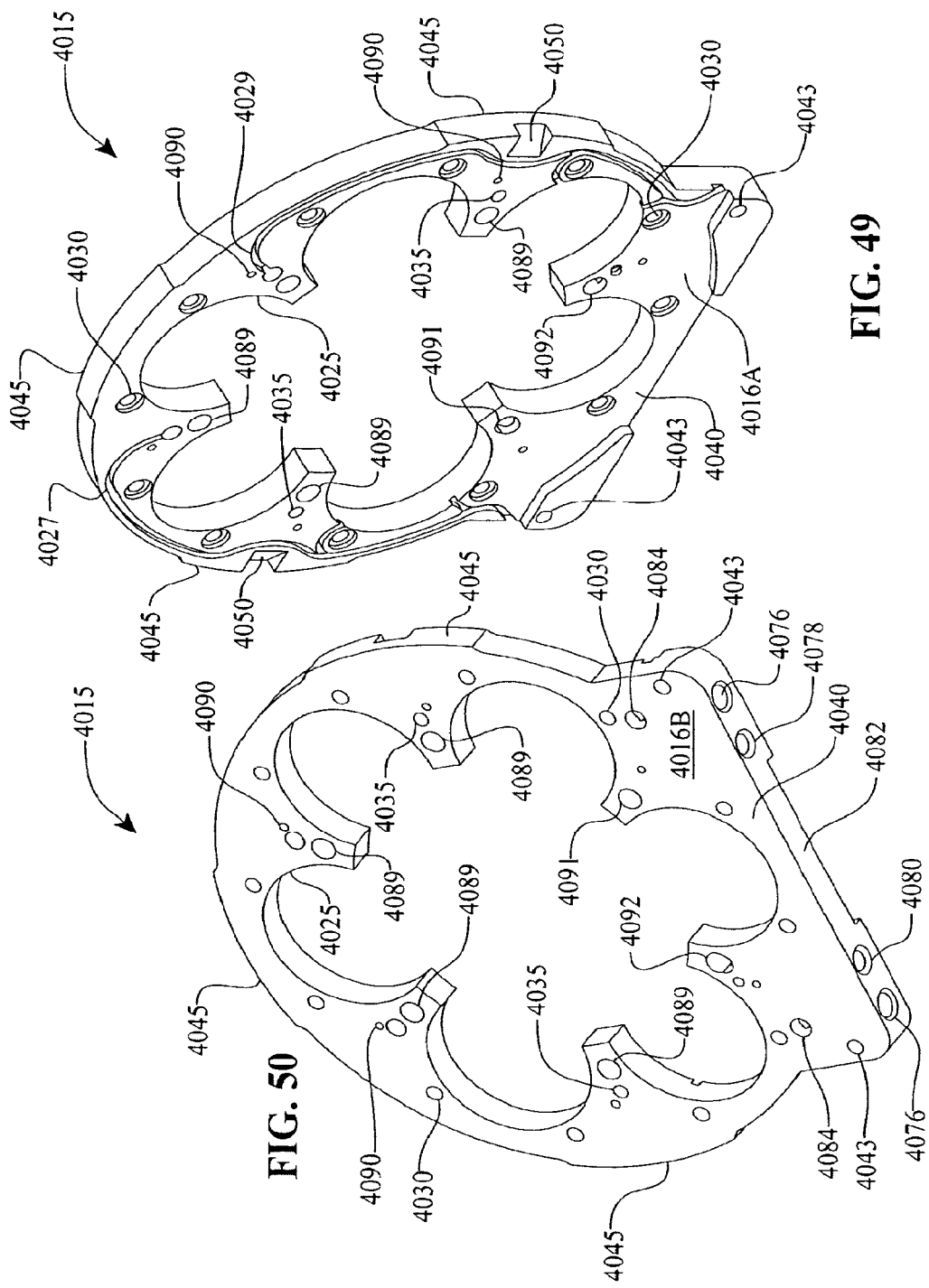

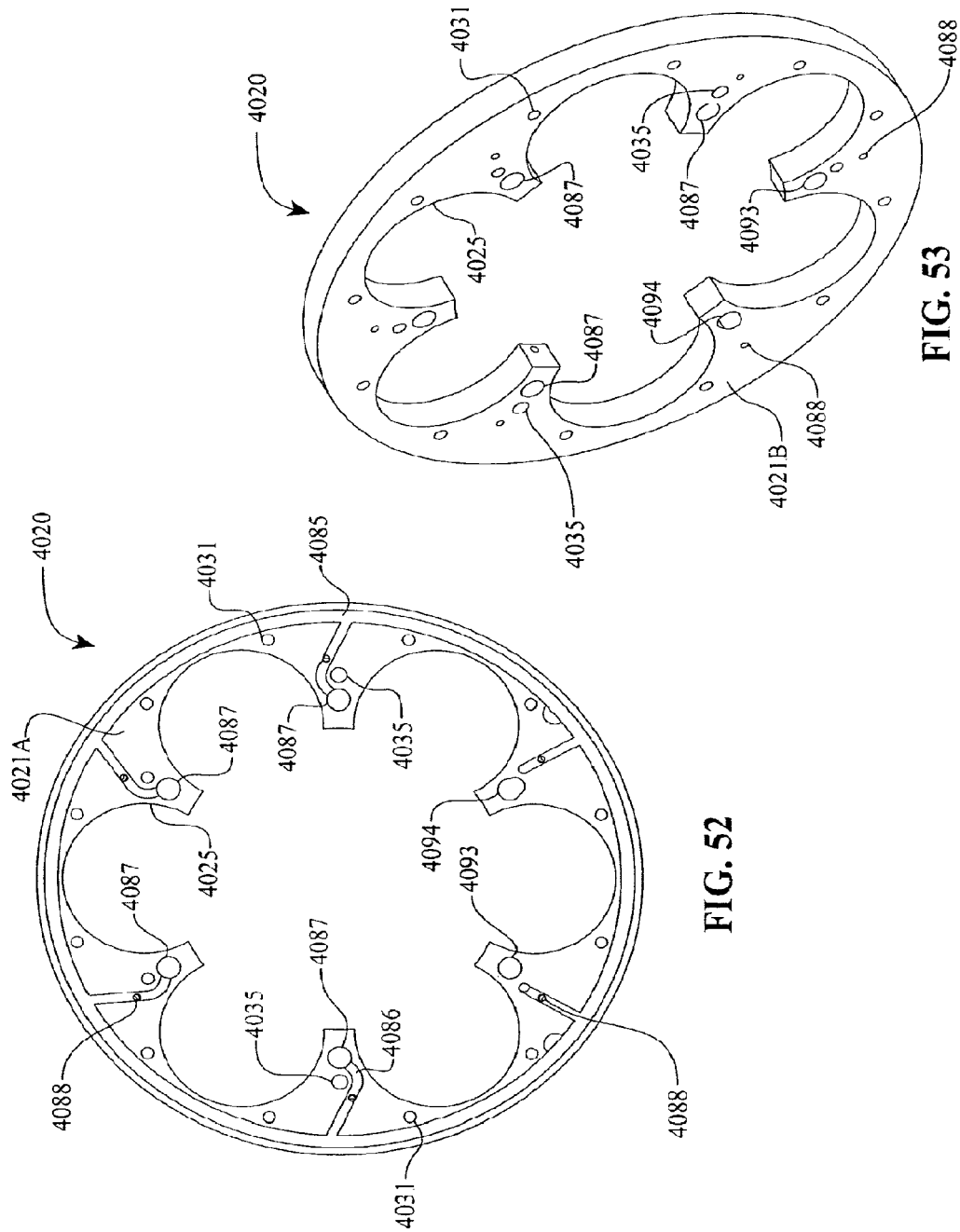

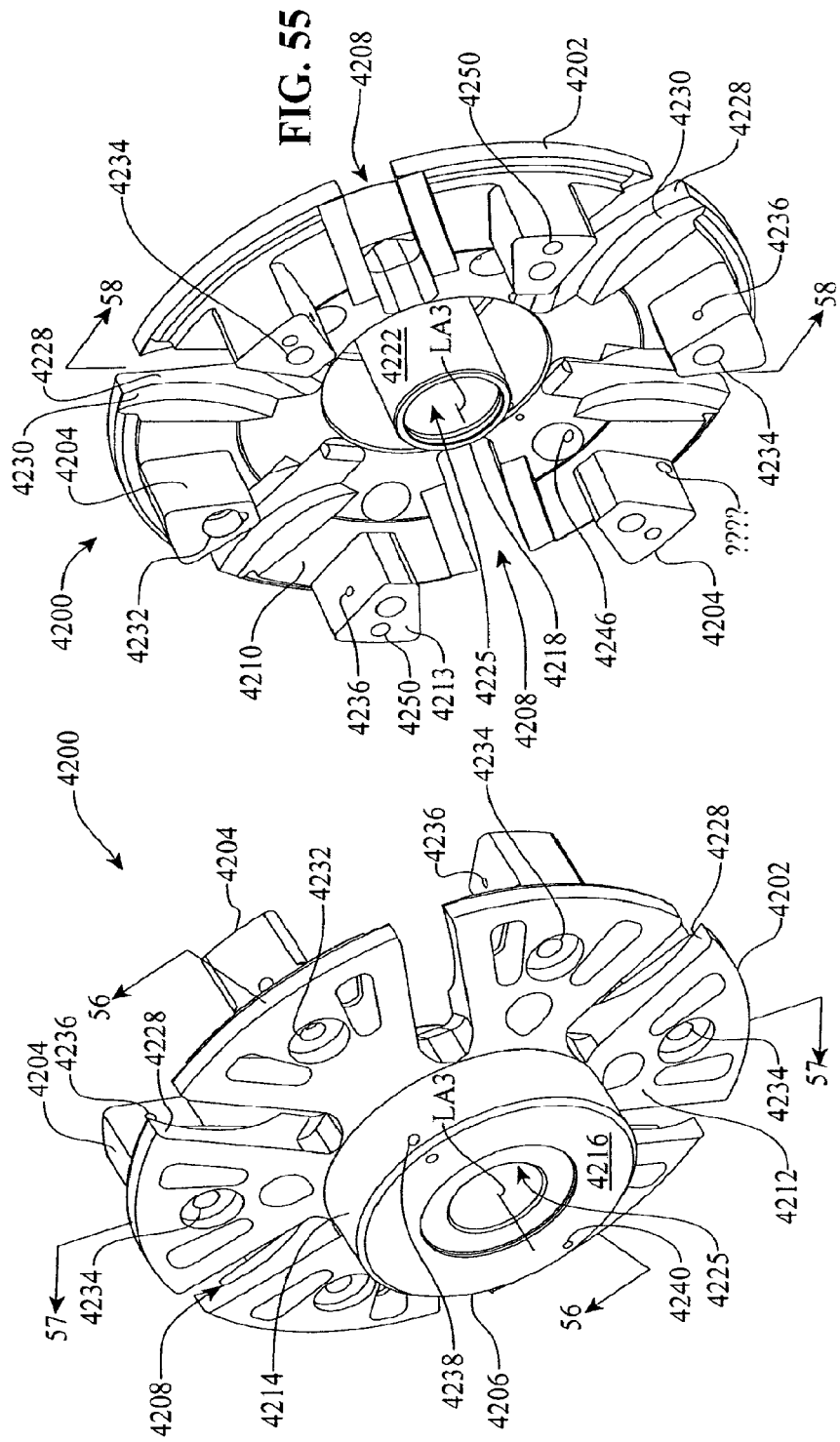

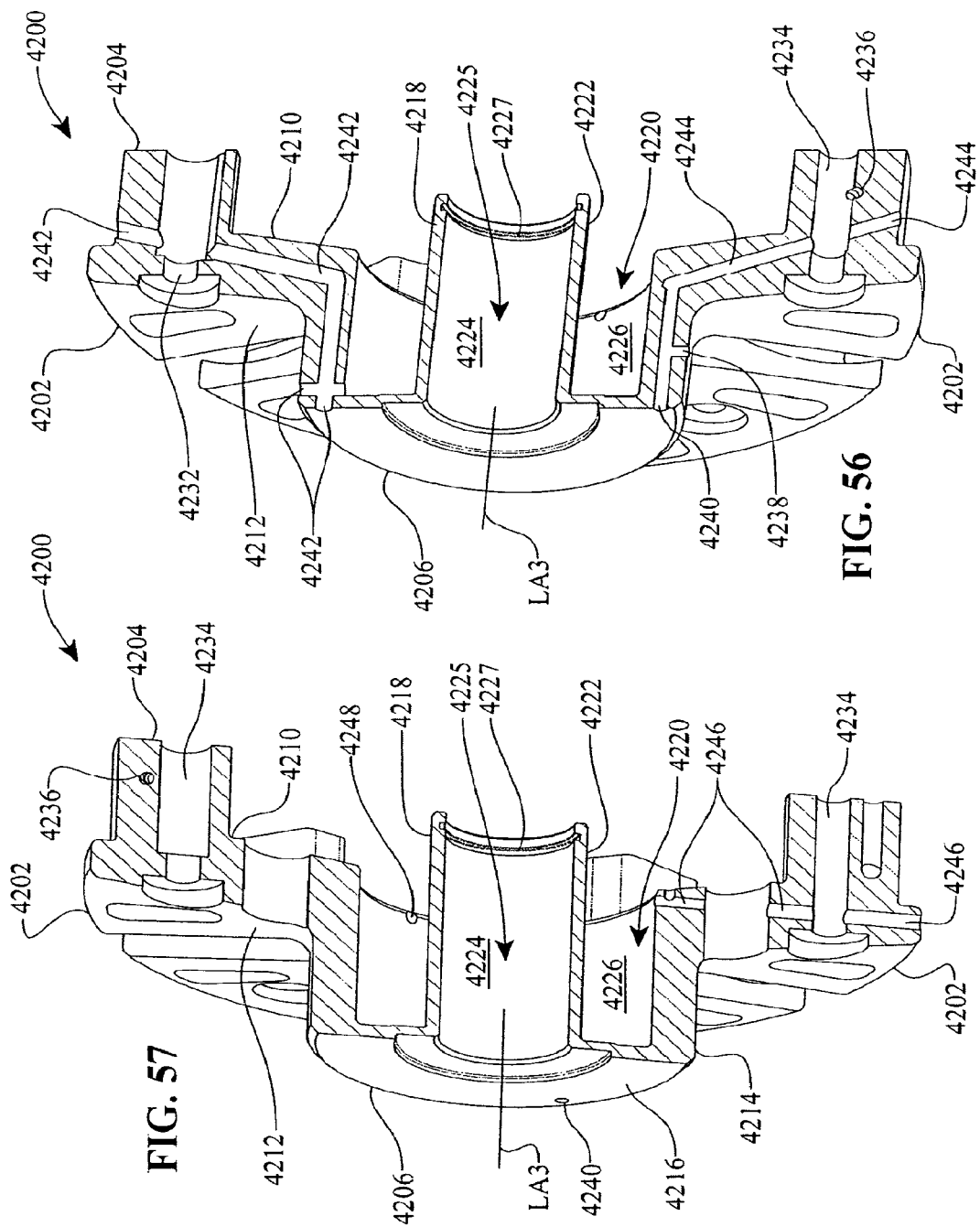

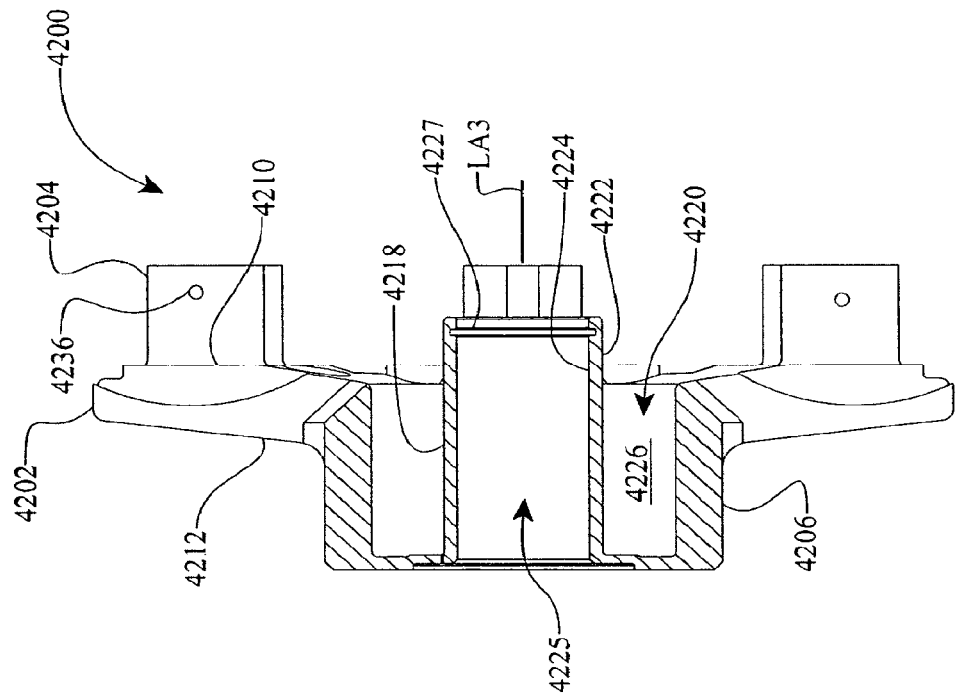
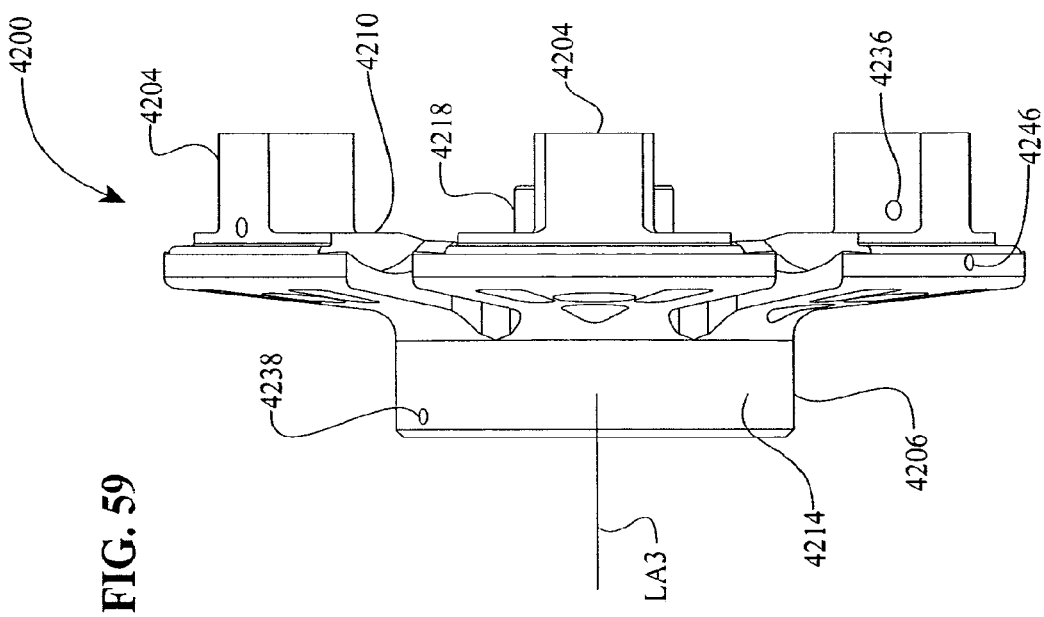

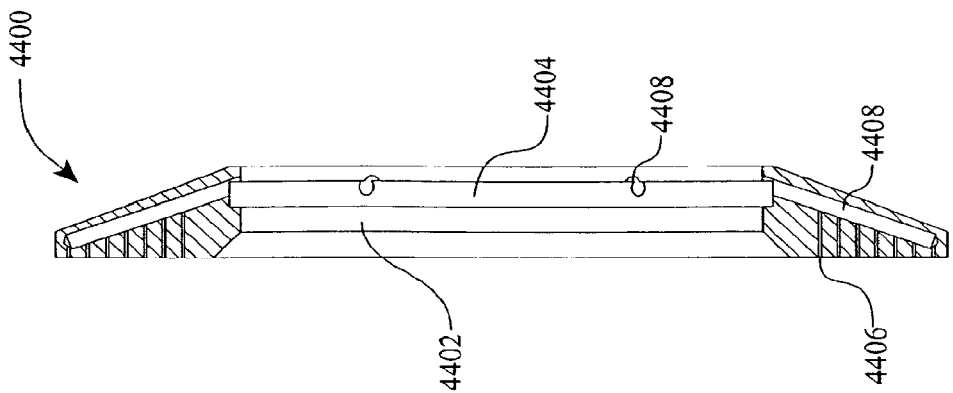
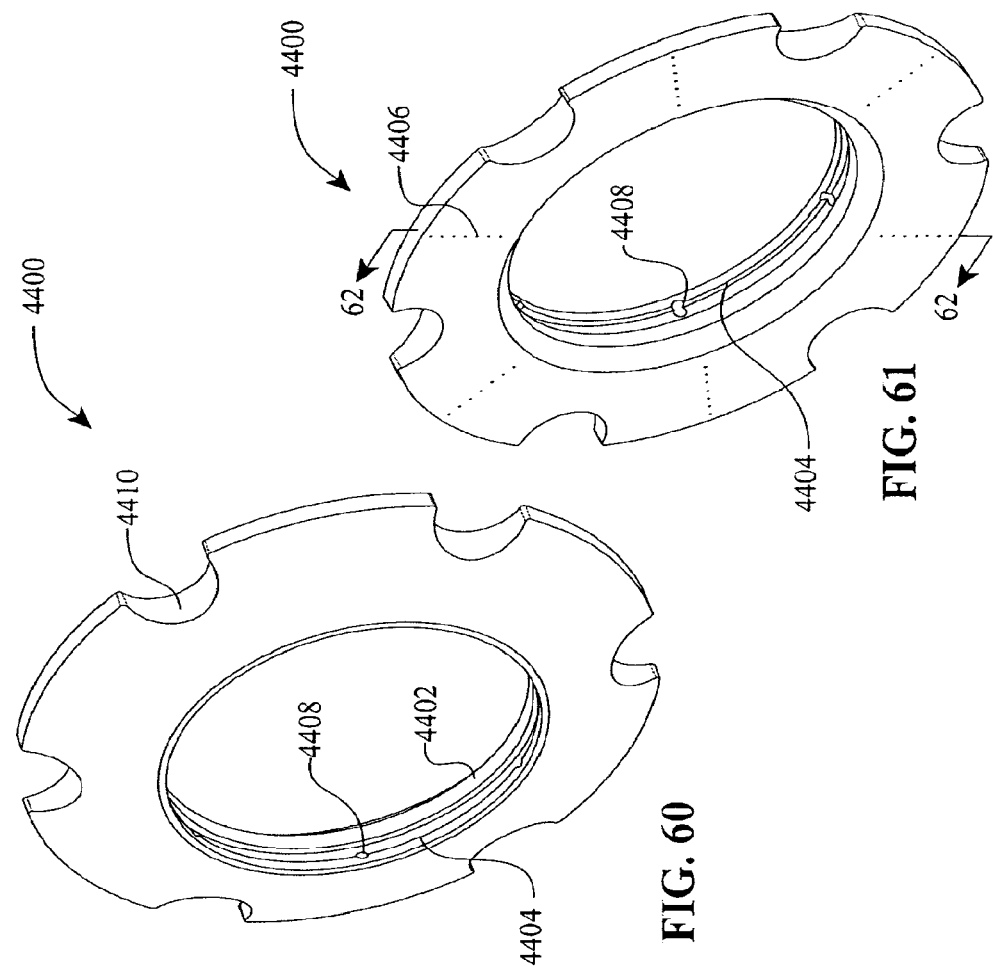

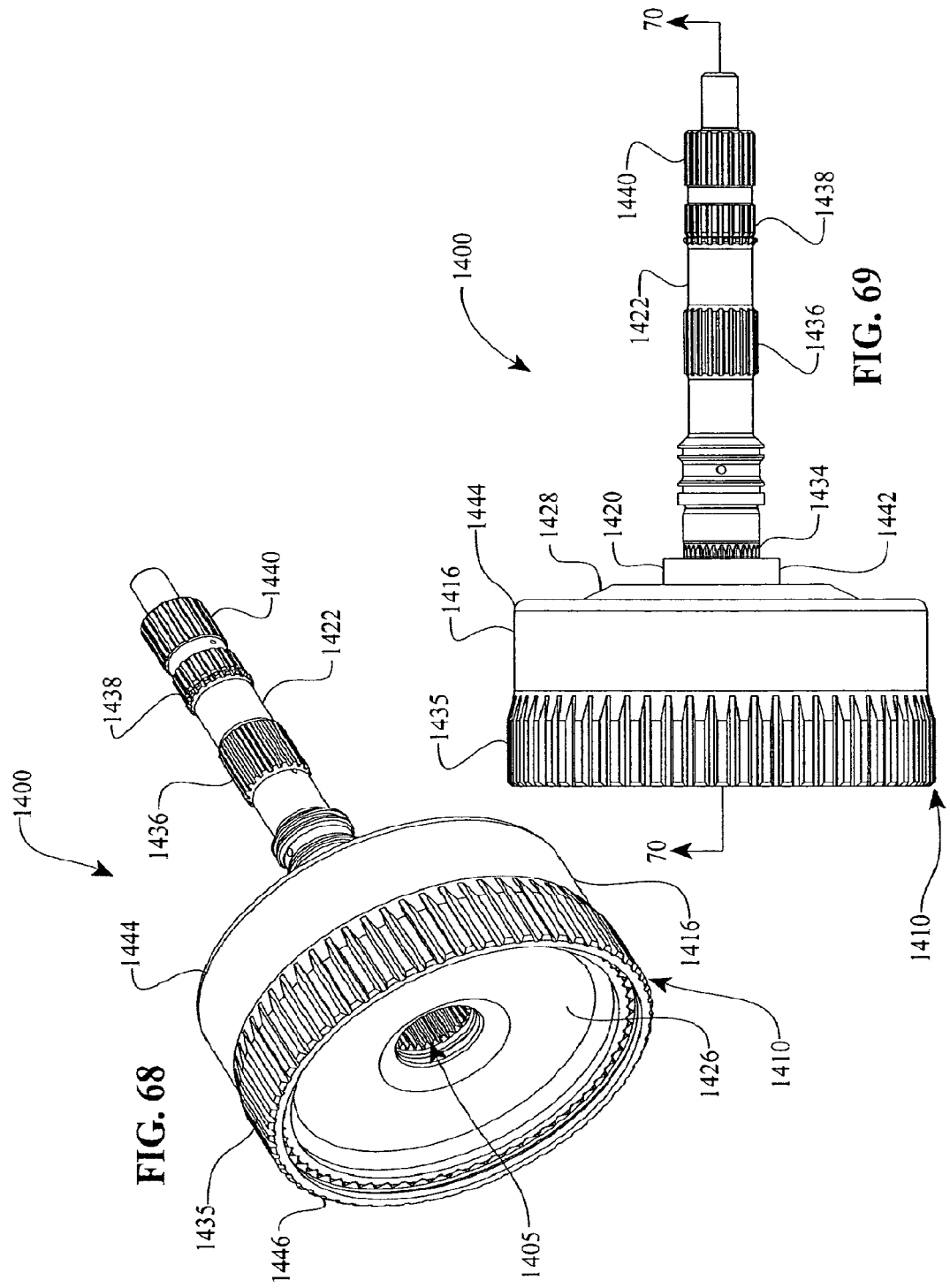

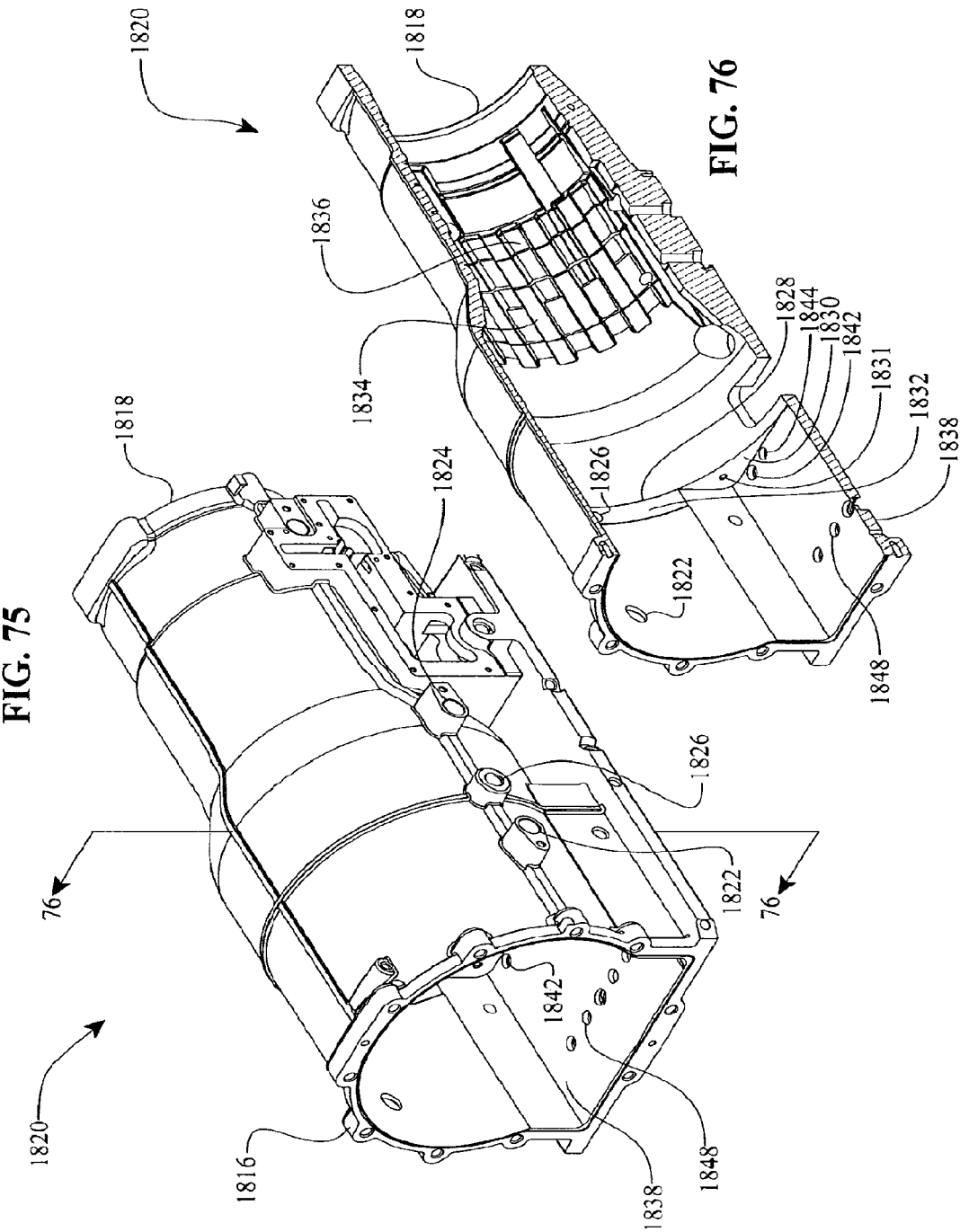

CONTINUOUSLY VARIABLE TRANSMISSIONS AND METHODS THEREFOR

CROSS REFERENCE TO RELATED APPLICATIONS

This application is a continuation of U.S. application Ser. No. 12/526,770, filed Aug. 11, 2009, which is a national phase application of Application No. PCT/US2008/053347, filed Feb. 7, 2008, which claims the benefit of U.S. Provisional Application No. 60/889,512, filed Feb. 12, 2007. The disclosures of all of the above-referenced prior applications, publications, and patents are considered part of the disclosure of this application, and are incorporated by reference herein in their entirety.

BACKGROUND OF THE INVENTION

1. Field of the Invention

The disclosed invention relates generally to mechanical power modulation and transmission. More specifically, the invention concerns continuously variable units and transmissions, subassemblies, components, and methods for use therewith.

2. Description of the Related Art

In the relevant technology various types of continuously variable transmissions (CVT) are known. The particular type of CVT which pertains to the present disclosure is typically known as a ball-type rolling traction CVT. Although ball-type rolling traction CVTs have gained some acceptance in certain industrial applications, the technology has generally been unable to overcome technical and economic hurdles to gain a wider adoption across multiple fields of use.

The inventive embodiments disclosed here address many of the challenges that have prevented ball-type rolling traction CVTs from gaining wider acceptance in the marketplace. In particular, though certainly not limited in scope of applicability, the inventive embodiments disclosed here provide mechanisms and methods for employing ball-type continuously variable units and/or continuously variable transmissions in automotive applications.

SUMMARY OF INVENTION

The systems and methods herein described have several features, no single one of which is solely responsible for its desirable attributes. Without limiting the scope as expressed by the claims that follow, its more prominent features will now be discussed briefly. After considering this discussion, and particularly after reading the section entitled "Detailed Description of Certain Inventive Embodiments" one will understand how the features of the system and methods provide several advantages over traditional systems and methods.

One aspect of the invention relates to a drive having a prime mover and a transmission coupled to the prime mover. In one embodiment the transmission has a continuously variable unit (CVU), an input interface coupled to the prime mover and to the CVU, and an output interface coupled to the CVU. The drive also has a parallel branch for mechanical power transmission. The parallel branch can be coupled to the input interface and to the output interface.

Another aspect of the invention addresses a transmission having a main shaft, an input load cam, an input traction ring, and a first set of load cam rollers positioned between the input load cam and the input traction ring. In one embodiment, the transmission has a number of traction planets in contact with the input traction ring, and the transmission has a traction sun in contact with the traction planets. In some embodiments, the transmission has an output traction ring in contact with the traction planets, an output load cam, and a second number of load cam rollers positioned between the output traction ring and the output load cam. In one embodiment, the transmission has a planetary gearset that has a sun gear, a ring gear, and a carrier. The output load cam is coupled to the ring gear, and the main shaft is coupled to the sun gear. The transmission can also have a transfer shaft coupled to the planetary gear set carrier.

One more aspect of the invention concerns a transmission including a number of traction rollers, a carrier assembly operably coupled to the traction rollers, and an input element configured to transfer torque to the traction rollers. The input element includes a load cam and a traction ring that each has bidirectional load cam ramps. In one embodiment, the transmission includes an output element configured to transfer torque from the traction rollers. The transmission also includes a shifter assembly configured to adjust an axis of rotation of the traction rollers. In some embodiments, the transmission includes a hydraulic system operably coupled to the shifter assembly, and the transmission includes a lubrication system configured to provide lubricant to at least the traction rollers.

Yet another aspect of the invention involves a drive having a torque converter, a main shaft coupled to the torque converter, an input load cam coupled to the main shaft, and an input traction ring operationally coupled to the input load cam. The drive also includes a number of traction planets adapted to receive torque from the input traction ring. In one embodiment, the drive includes an output traction ring adapted to receive torque from the traction planets and an output load cam operationally coupled to the output traction ring. The drive also includes a planetary gearset coupled to the output load cam and to the main shaft.

One aspect of the invention concerns a transmission having a number of spherical traction rollers, a carrier assembly for supporting the traction rollers, an input element for transferring torque to the traction rollers, and an output element for transferring torque from the traction rollers. In one embodiment, the transmission includes an axial force generator for applying a clamping force to the spherical rollers, input element, and output element. The transmission includes a shifter assembly for adjusting an axis of rotation of the spherical traction rollers. In one embodiment, the transmission includes a hydraulic system for actuating the shifter assembly, and the transmission includes a lubrication system for providing lubricant to at least the spherical traction rollers.

Another aspect of the invention relates to a continuously variable unit (CVU) having a rotatable main shaft, an input load cam coupled to the main shaft, an input traction ring operationally coupled to the input load cam, and a number of traction planets in contact with the input traction ring. In one embodiment, the CVU includes an output traction ring in contact with the traction planets and an output load cam operationally coupled to the output traction ring. The CVU also includes a traction sun in contact with the traction planets. A number of planet axles define the axes of rotation for the traction planets. The CVU includes at least one shift lever for each planet axle. The CVU also includes at least one shift cam operationally coupled to the shift levers and at least one stator configured to axially and radially support the planet axles and the shift levers. The CVU includes at least one control piston configured to actuate an axial movement of the at least one shift cam, and the CVU can include a center manifold configured to support the at least one stator. The center manifold is also configured to provide control fluid and lubricant to the CVU.

Yet one more aspect of the invention addresses a continuously variable unit (CVU) having a number of traction planets arranged angularly about a longitudinal axis of the CVU. The CVU includes a traction sun in contact with the traction planets and a number of planet axles coupled to the traction planets. The planet axles define the axes of rotation for the traction planets. The CVU includes a number of shift levers. At least one shift lever is coupled to each planet axle. The CVU includes a shift cam operably coupled to the shift levers, and the CVU has a stator configured to axially and radially support the planet axles and the shift levers. The CVU also includes at least one control piston configured to actuate an axial movement of the shift cam and a center manifold configured to support the stator. The center manifold is adapted to provide a control fluid and a lubricant to the CVU.

In another aspect, the invention concerns a continuously variable unit (CVU) having an input element configured to receive a power input, a number of traction members coupled to the input element, a carrier assembly adapted to facilitate support of the traction members, and a load-cam-and-traction-ring subassembly configured to generate axial force. The CVU includes a shifter assembly operably coupled to the traction members and an output element configured to receive power from the traction members. In one embodiment, the CVU includes a hydraulic system configured to be in fluid communication with the shifter assembly.

Another aspect of the invention relates to a shifting mechanism for a rolling traction transmission. The shifting mechanism includes a traction sun, a number of shift cams, and a number of control pistons operationally coupled to the shift cams. In one embodiment, the traction sun is placed between the shift cams.

One aspect of the invention relates to a control piston for a shifting mechanism of a continuously variable unit (CVU). The control piston includes a generally cylindrical body having a central bore adapted to engage a piston tube. In one embodiment, the control piston includes a piston face configured to interface with control fluid and a surface configured to facilitate sensing of an axial position of the control piston. Another aspect of the invention relates to a control piston a control piston tube having a generally cylindrical tube with a through central bore. The control piston tube includes a surface adapted to couple to a control piston, and the control piston tube has a surface adapted to coupled to a shift cam.

Another aspect of the invention addresses a shift cam for a shifting mechanism of a continuously variable unit (CVU). The shift cam includes a central bore, a shift cam profile, and a shift cam extension. In some embodiments, the shift cam profile is substantially defined by the data points shown in FIG. 41. In other embodiments, the shift cam has an angled face adapted to allow lubricant flow. In yet other embodiments, the central bore of the shift cam is adapted to couple to a control piston tube.

One more aspect of the invention concerns a piston tube for use in a rolling traction transmission. The piston tube includes a substantially annular cylindrical body having a center bore, a first face located on the outer circumference of the annular cylindrical body, and a second face located on the outer circumference of the annular cylindrical body. The first face is configured to receive a shift cam of the transmission. The second face is configured to receive a control piston of the transmission. The piston tube also includes an orifice located on the outer circumference of the annular cylindrical body. The orifice is adapted to provide a lubricant to the transmission.

Yet another aspect of the invention involves a stator-manifold assembly having a center manifold and at least one stator coupled to the center manifold so that the center manifold provides, and the stator receives, control fluid and lubricant. In some embodiments, the stator-manifold assembly includes at least one oil galley in fluid communication with the at least one stator.

One aspect of the invention concerns a center manifold for a continuously variable unit (CVU). The center manifold includes a base plate having a number of channels and ports for receiving and distributing control fluid and lubricant. In one embodiment, the center manifold includes a cover plate adapted to couple to the base plate. The cover plate has a number of channels and ports for receiving and distributing control fluid and lubricant.

Another aspect of the invention relates to a base plate for a center manifold of a continuously variable unit (CVU). The base plate includes a number of ports and channels for receiving and distributing fluid, and a number of recesses for clearing one or more traction planets of the CVU. In one embodiment, the base plate includes one or more structures for facilitating the locating and fastening of the base plate to a housing of the CVU. The base plate also includes a number of channels for receiving and housing sensor cables.

Yet one more aspect of the invention addresses a stator for a continuously variable unit (CVU). The stator includes a number of extensions adapted to facilitate the coupling of the stator to a manifold. The extensions comprise one or more channels for receiving and distributing fluid. The stator includes a tubular body configured to form a chamber for receiving a control fluid and a control piston. The stator also includes an extension configured to deliver lubricant to an oil galley.

In another aspect, the invention concerns a cover plate for continuously variable unit (CVU). The cover plate includes a substantially circular shaped body. The circular shaped body has a first side face, a second side face, and a cut-out pattern configured to substantially surround an array of planet-and-shift-lever subassemblies of the CVU. The cover plate includes a number of lubricant channels arranged on the first side face. The cover plate also includes a number of lubricant spray ports positioned to be in fluid communication with the lubricant channels.

Another aspect of the invention relates to an oil galley for a continuously variable unit (CVU). The oil galley includes a central bore having an annular recess for receiving fluid. In one embodiment, the oil galley has a number of radial channels extending substantially radially from the annular recess toward an outer perimeter of the oil galley. The radial channels are spaced angularly about the central bore. The oil galley also includes a number of axial channels that extend substantially axially from each of the radial channels.

One aspect of the invention relates to a transmission housing having one or more structures for retaining and locating a center manifold. The transmission housing includes a number of ports for delivering and receiving fluids to internal components of the transmission. In one embodiment, the transmission housing includes a number of ports for receiving a number of sensors. The transmission housing also includes one or more passages for receiving one or more cam dowels configured to cooperate with structures of the transmission housing and/or the center manifold for retaining and locating the center manifold.

Another aspect of the invention addresses a main shaft for a continuously variable transmission (CVT). The main shaft includes an elongated body having a first end portion, a central portion, and a second end portion. The main shaft includes a set of torque converter engagement splines formed on the first end portion. A first engagement extension extends from the torque converter engagement splines. The main shaft includes a set of combining device engagement splines formed on the second end portion. A second engagement extension extends from the second end portion. In one embodiment, the main shaft includes an axial reaction flange located on the second end portion.

One more aspect of the invention concerns a main shaft for a continuously variable transmission (CVT). The main shaft includes an elongated body having a first end portion, a central portion, and a second end portion. In one embodiment, the main shaft includes a number of input load cam engagement splines formed on the central portion and an axial reaction flange located on the second end portion.

Yet another aspect of the invention involves a traction ring for use in a continuously variable transmission. The traction ring includes a substantially annular ring having a front face and a back face. In one embodiment, the traction ring includes a contact surface formed on the front face. The traction also includes a groove formed on the back face.

One aspect of the invention concerns a load cam for use in a continuously variable transmission (CVT). The load cam includes a bowl shaped body having a perimeter edge portion and a hub portion. The hub portion has a central bore. The load cam includes a cylindrically shaped flange that is concentric with the hub portion. In one embodiment, the load cam includes a number of ribs radially extending from the hub portion to the perimeter edge portion. The ribs intersect the flange. The load cam also includes a number of bi-directional ramps formed on a face of the perimeter edge portion.

Another aspect of the invention relates to an input load cam shroud for use in a continuously variable transmission. The input load cam shroud includes a bowl shaped body having a central opening. In one embodiment, the input load cam includes several flanges formed about the perimeter of the bowl shaped body. The flanges form a number of shoulders that are adapted to engage a number of mating features of a load cam of the CVT.

Yet one more aspect of the invention addresses an input load cam assembly for use in a continuously variable transmission. The input load cam assembly includes a load cam and a load cam shroud. The load cam has a bowl shaped body with a perimeter edge portion and a hub portion having a central bore. The load cam includes a cylindrically shaped flange concentric with the hub portion and a number of ribs extending from the hub portion to the perimeter edge portion. The ribs intersect the flange. The load cam also includes a number of bi-directional ramps formed on a face of the perimeter edge portion. The load cam shroud includes a bowl shaped body having a central opening. The load cam shroud also includes a number of flanges formed about the perimeter of the bowl shaped body. The flanges form a plurality of shoulders adapted to engage a plurality of mating features of a load cam shroud of the CVT.

In another aspect, the invention concerns a load cam for use in a continuously variable transmission. The load cam includes a substantially bowl shaped body having a hub portion and a perimeter edge portion. The perimeter edge portion has a front face and a rear face. The load cam includes a number of fins arranged angularly around the front face of the perimeter edge portion. The load cam also includes a number of bi-directional ramps formed on a rear face of the perimeter edge portion.

Another aspect of the invention relates to an axial lock nut for use in a continuously variable transmission (CVT). The axial lock nut includes a substantially cylindrical body that has a threaded central bore, an extension portion, and a polygon-shaped outer periphery portion. A number of notches are formed on the outer periphery portion. The notches are configured to couple to a dowel pin of the CVT. The axial lock nut also includes an anti-rock piloting surface formed on the central bore.

One aspect of the invention relates to a bearing support adapter for use in a continuously variable transmission (CVT). The bearing support adapter includes a substantially cylindrical body having a first face, a second face, and a central bore. In one embodiment, the bearing support adapter has a flange extending radially from the first face. The flange is configured to react axial force. The bearing support adapter also includes a bearing support surface located on the outer circumference of the cylindrical body and a shoulder arranged on the central bore in proximity to the first face. In one embodiment, the bearing support adapter has a thrust bearing recess formed on the second face.

Another aspect of the invention addresses a continuously variable transmission having a main shaft, a number of spherical planets, a first load-cam-and-traction-ring subassembly, a second load-cam-and-traction-ring subassembly, and a bearing support adapter. The main shaft is arranged along a longitudinal axis of the transmission and adapted to receive a power input. The planets are arranged angularly about the longitudinal axis of the transmission. The first load-cam-and-traction-ring subassembly is operably coupled to the main shaft and to the spherical planets. The second load-cam-and-traction-ring subassembly is operably coupled to the spherical planets. The bearing support adapter is coupled to the main shaft and configured to support a bearing coupled to the second load-cam-and-traction-ring subassembly.

One more aspect of the invention concerns a shift-cam-and-sun subassembly for a continuously variable transmission (CVT). The shift-cam-and-sun subassembly includes a traction sun, a shift cam operably coupled to the traction sun, and a piston tube coupled to the shift cam. The piston tube is coaxial with the traction sun. The shift-cam-and-sun subassembly also includes a control piston coupled to the piston tube. The control piston is coaxial with the traction sun.

Yet another aspect of the invention involves a traction sun for a continuously variable transmission (CVT). The traction sun includes a generally cylindrical body having a central bore. A first recess is formed on the central bore, and is configured to receive a bearing. A central shoulder is formed on the central bore, and is in proximity to the first recess. The traction sun also includes an exterior edge face formed on the outer circumference of the cylindrical body. The exterior edge face configured to be a rolling contact surface for number of traction planets of the CVT.

One aspect of the invention concerns a shift cam for a continuously variable transmission (CVT). The shift cam includes a substantially disc-shaped body having a front face, a rear face, and a central bore. In one embodiment, the shift cam has an extension surface extending from the central bore. The shift cam has a reference surface formed on the rear face. The shift cam also has a shift cam profile formed on the front face. A set of coordinates define the shape of the shift cam profile. The coordinates are based on the reference surface and include those of the data table shown in FIG. 41.

Another aspect of the invention relates to a cam dowel having a substantially cylindrical body with a central bore, a first end portion, and a second end portion. The cam dowel includes a cam wedge formed on the first end portion. The cam dowel also includes a substantially flat face formed on the second end portion.

Yet one more aspect of the invention addresses a combining device for a continuously variable transmission (CVT). The combining device includes a transfer shaft, a hub, a number of planet gears, a planet gear carrier, and a sun gear. The transfer shaft is an elongated body with a first end, a second end, and a central bore. The hub is operably coupled to the transfer shaft and is coaxial with the transfer shaft. The planet gears are operably coupled to the hub. The planet gear carrier is configured to support the planet gears. In one embodiment of the combining device, the sun gear is coupled to the planet gears. The sun gear has a central bore configured to couple to a main axle of the CVT.

In another aspect, the invention concerns a combining device for use in a continuously variable transmission (CVT). The combining device includes a hub configured to support a planetary gear set. In one embodiment, the combining device has a first power input portion operably coupled to the hub. The hub has a second power input portion. The combining device also has a power output portion operably coupled to the hub.

Another aspect of the invention relates to a continuously variable transmission having a rotatable main shaft arranged along the longitudinal axis of the transmission. In one embodiment, the transmission includes a variator having a number of traction planets arranged angularly about the longitudinal axis of the transmission. The transmission includes a combining device operably coupled to the variator and to the main shaft. The transmission also includes a rangebox operably coupled to the combining device.

One aspect of the invention relates to a rangebox for use in a continuously variable transmission (CVT). The rangebox includes a power input portion configured to receive power from a transfer shaft of the CVT, and an output shaft arranged along the longitudinal axis of the rangebox. The output shaft is configured to transfer power out of the rangebox. The rangebox includes a high-and-low mode subassembly configured to receive power from the power input portion. The high-and-low mode subassembly is arranged along the longitudinal axis of the range box and coaxial with the output shaft. The rangebox includes a reverse mode subassembly configured to receive power from the power input portion. The reverse mode subassembly is operably coupled to the output shaft. The rangebox also includes an overrun clutch operably coupled to the high-and-low mode subassembly and arranged between the forward clutch and the power input portion.

Another aspect of the invention addresses a planet axle for supporting rotation of a traction roller and facilitating a tilting of the axis of rotation. The planet axle includes a generally cylindrical body having a through bore along a longitudinal axis of the cylindrical body. In one embodiment, the planet axle also includes one or more axle capturing features for engagement of a transverse axle.

One more aspect of the invention concerns a shift lever for a continuously variable transmission (CVT). The shift lever has an elongated body with a first end portion and a second end portion. The shift lever includes a first bore formed on the first end portion. The first bore is configured to receive a planet axle of the CVT. In one embodiment, the shift lever has a second bore formed on the first end portion. The second bore intersects the first bore in a substantially perpendicular location. The second bore is configured to receive a shift guide roller axle of the CVT. The shift lever also has an axle receiving passage formed on the second end. The axle receiving passage is configured to receive a shift cam roller axle of the CVT.

Yet another aspect of the invention involves a planet-and-shift-lever mechanism for use in a continuously variable transmission. The planet-and-shift-lever mechanism includes a spherical planet having a central bore, a planet axle placed in the central bore, and a first shift lever coupled to a first end of the planet axle. In one embodiment, the planet-and-shift-lever mechanism has a second shift lever coupled to a second end of the planet axle and a first skew roller coupled to the first end of the planet axle. The planet-and-shift-lever mechanism also has a second skew roller coupled to the second end of the planet axle, a first shift cam roller coupled to the first shift lever, and a second shift cam roller coupled to the second shift lever.

BRIEF DESCRIPTION OF THE FIGURES

FIG. 5 is a perspective view of a shaft that can be used with the CVU of FIG. 4.

FIG. 6 is a cross-sectional view of the shaft of FIG. 5.

FIG. 8 is a perspective view of a traction ring that can be used with the CVU of FIG. 4.

FIG. 9 is a cross-sectional view of the traction ring of FIG. 8.

FIG. 10 is a perspective view of a load cam and shroud assembly that can be used with the CVU of FIG. 4.

FIG. 11 is a perspective view of the load cam and shroud assembly of FIG. 10.

FIG. 13 is a perspective view of a load cam that can be used with the CVU of FIG. 4.

FIG. 14 is a cross-sectional view of the load cam of FIG. 13.

FIG. 17 is a perspective view of yet another load cam that can be used with the CVU of FIG. 4.

FIG. 18 is yet another perspective of the load cam of FIG. 17.

FIG. 21 is a perspective view of yet another load cam that can be used with the CVU of FIG. 4.

FIG. 22 is a cross-sectional view of the load cam of FIG. 21.

FIG. 23 is another perspective view of the load cam of FIG. 21.

FIG. 25 is a perspective view of a bearing support adapter that can be used with the CVU of FIG. 4.

FIG. 26 is a cross-sectional view of the bearing support adapter of FIG. 25.

FIG. 27 is a perspective view of yet another load cam that can be used with the CVU of FIG. 4.

FIG. 28 is another perspective view of the load cam of FIG. 27.

FIG. 29 is a cross-sectional view of the load cam of FIG. 27.

FIG. 34 is a perspective view of a planet axle that can be used with the CVU of FIG. 4.

FIG. 35 is a cross-sectional view of the planet axle of FIG. 34.

FIG. 36 is a perspective view of a shift-cam-and-sun subassembly that can be used with the CVU of FIG. 4.

FIG. 37 is a cross-sectional view of certain components of the shift-cam-and-sun subassembly of FIG. 36.

FIG. 39 is a cross-sectional view of a sun that can be used with the CVU of FIG. 4.

FIG. 40 is a cross-sectional view of a shift cam that can be used with the CVU of FIG. 4.

FIG. 40A is a detail view A of the shift cam of FIG. 40.

FIG. 41 is a data table with data points specifying a suitable profile for the shift cam of FIG. 40.

FIG. 42 is a cross-sectional view of a control piston that can be used with the CVU of FIG. 4.

FIG. 45 is a perspective view of a stator-manifold subassembly that can be used with the CVU of FIG. 4.

FIG. 46 is a cross-sectional view of certain components of the stator-manifold of FIG. 45.

FIG. 47 is a perspective view of a center manifold that can be used with the stator-manifold of FIG. 45.

FIG. 48 is a second perspective view of the center manifold of FIG. 47.

FIG. 49 is a perspective view of a base plate that can be used with the center manifold of FIG. 47.

FIG. 50 is a second perspective view of the base plate of FIG. 49.

FIG. 52 is a plan view of a cover plate that can be used with the center manifold of FIG. 47.

FIG. 53 is a perspective view of the cover plate of FIG. 52.

FIG. 54 is a perspective view of a stator that can be used with the CVU of FIG. 4.

FIG. 55 is a second perspective view of the stator of FIG. 54.

FIG. 56 is a cross-sectional view of the stator of FIG. 54.

FIG. 57 is yet another cross-sectional view of the stator of FIG. 54.

FIG. 58 is yet another cross-sectional view of the stator of FIG. 54.

FIG. 59 is side view of the stator of FIG. 54.

FIG. 60 is a perspective view of an oil galley that can be used with the CVU of FIG. 4.

FIG. 61 is a second perspective view of the oil galley of FIG. 60.

FIG. 62 is a cross-sectional view of the oil galley of FIG. 60.

FIG. 68 is a perspective view of a combining device that can be use with the transmission o FIG. 3A.

FIG. 69 is a side view of the combining device of FIG. 68.

FIG. 75 is a perspective view of a rear housing that can be used with the transmission of FIG. 3A.

FIG. 76 is a cross-sectional, perspective view of certain components and features of the rear housing of FIG. 75.

DETAILED DESCRIPTION OF CERTAIN INVENTIVE EMBODIMENTS

Certain inventive embodiments will now be described with reference to the accompanying figures, wherein like numerals refer to like elements throughout. The terminology used in the description presented herein is not intended to be interpreted in any limited or restrictive manner simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described. The CVT/IVT embodiments described here are generally related to transmissions and variators disclosed in U.S. Patent Application 60/890,438, the entire disclosure of which is hereby incorporated herein by reference.

As used here, the terms "operationally connected," "operationally coupled", "operationally linked", "operably connected", "operably coupled", "operably linked," and like terms, refer to a relationship (mechanical, linkage, coupling, etc.) between elements whereby operation of one element results in a corresponding, following, or simultaneous operation or actuation of a second element. It is noted that in using said terms to describe inventive embodiments, specific structures or mechanisms that link or couple the elements are typically described. However, unless otherwise specifically stated, when one of said terms is used, the term indicates that the actual linkage or coupling may take a variety of forms, which in certain instances will be obvious to a person of ordinary skill in the relevant technology.

For description purposes, the term "radial" is used here to indicate a direction or position that is perpendicular relative to a longitudinal axis of a transmission or variator. The term "axial" as used here refers to a direction or position along an axis that is parallel to a main or longitudinal axis of a transmission or variator. For clarity and conciseness, at times similar components labeled similarly (for example, control piston 582A and control piston 582B) will be referred to collectively by a single label (for example, control pistons 582).

Figure 1:
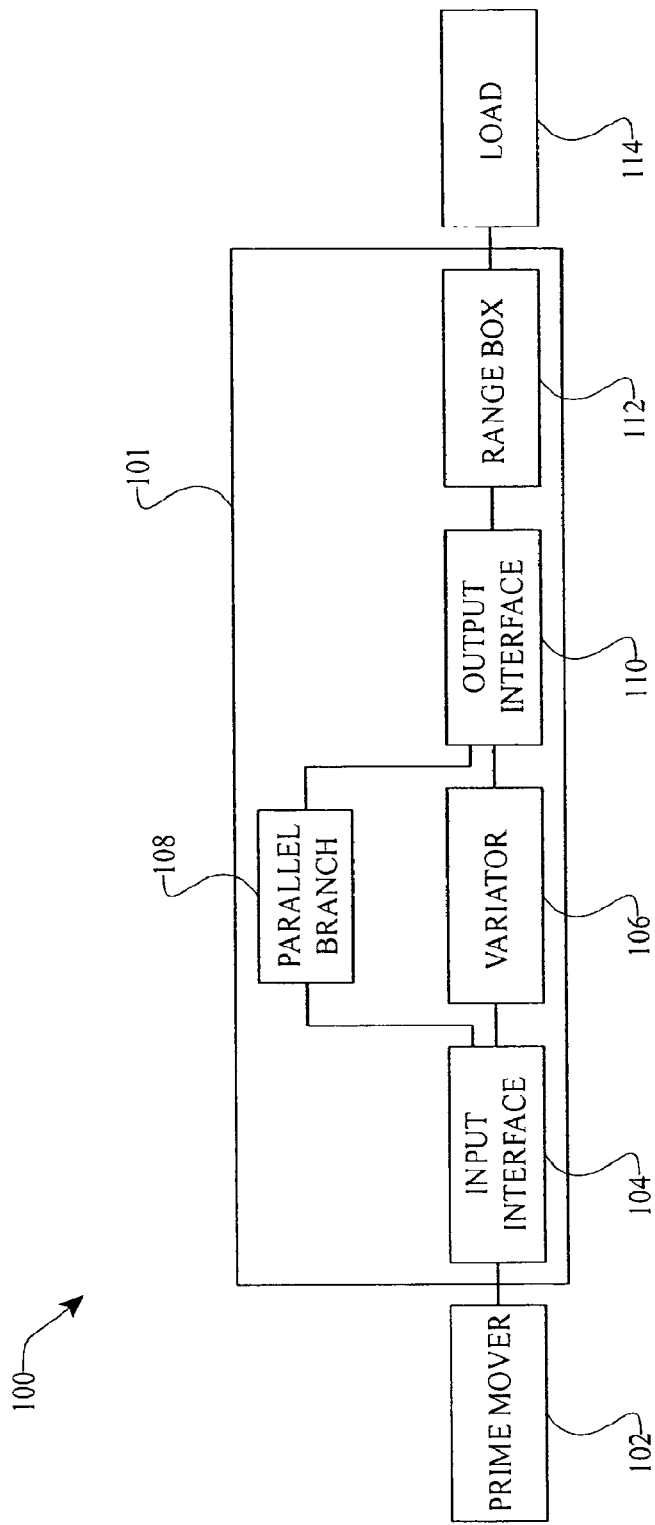
FIG. 1 is a high-level block diagram showing an embodiment of a drive apparatus 100 that includes an inventive continuously variable transmission and continuously variable unit.

FIG. 1 is a high-level block diagram showing an embodiment of a drive apparatus 100, which is referred to herein as the drive 100. In some embodiments, the drive 100 includes a transmission 101 operationally coupled between a prime mover 102 and a load 114. The prime mover 102 delivers power to the transmission 101, and the transmission 101 delivers power to the load 114. The prime mover 102 can be one or more of any number of power generating devices, and the load 114 can be one or more of any number of driven devices or components. Examples of the prime mover 102 include, but are not limited to, engines, motors and the like. Examples of loads include, but are not limited to, drivetrain differential assemblies, power take-off assemblies, generator assemblies, pump assemblies, and the like.

In one embodiment, the transmission 101 includes an input interface 104, a variator 106, a parallel branch 108 (for example, a fixed ratio branch), an output interface 110, and a rangebox 112. The input interface 104 is operationally coupled to the prime mover 102. The variator 106 and the parallel branch 108 can be operationally coupled in parallel between the input interface 104 and the output interface 110. The rangebox 112 is operationally coupled between the output interface 110 and the load 114.

The input interface 104 can be configured for receiving power from the prime mover 102 and transferring such power to the variator 106 and the parallel branch 108 in a distributed manner. The output interface 110 can be configured for combining power (that is, torque applied at a given rotational speed) from the variator 106 and the parallel branch 108 and transferring such combined power to the rangebox 112. It is disclosed herein that neither the input interface 104 nor the output interface 110 is necessarily limited to a particular respective physical and/or operational configuration. Accordingly, the input interface 104 may include any gearing or coupling structure suitable for providing such distributed power transfer and distribution functionality, and the output interface 110 may include any gearing or coupling structure suitable for providing such combined power transfer functionality. Examples of the input interface 104 include, but are not limited to, a torque converter assembly, a hydraulic clutch coupling, a manually actuated clutch assembly, a computer-controlled clutch assembly, a magnetorheological clutch coupling, and the like.

The parallel branch 108 can be configured for enabling power distributed thereto from the input interface 104 to be directly transferred to the output interface 110 without any selective variation (that is, adjustment) of rotational speed and/or rotational direction associated with that power. However, in other embodiments, the parallel branch 108 can be configured to modulate power in discrete (that is, stepped) or continuously variable modes. The variator 106 can be configured for enabling power distributed thereto from the input interface 104 to be transferred to the output interface 110 in a manner whereby torque and/or rotational speed associated with that power is selectively variable (that is, selectively adjustable). Accordingly, a torque split unit in accordance with one embodiment of the present invention comprises the variator 106 and the parallel branch 108 and provides for two power paths between the input interface 104 and the output interface 110. A first one of the power paths extends through the variator 106 and a second one of the power paths extends through the parallel branch 108. As will be discussed below in greater detail, power distribution between the two power paths is dependent upon a selectively variable ratio of an input power specification of the variator 106 (for example, input torque and input rotational shaft speed) with respect to an output power specification of the variator 106 (for example, output torque and output rotational shaft speed). One reason for implementing a split torque unit is to increase a torque capacity of the transmission 101. For example, during a duty cycle that requires a high torque output, it is desirable to route a majority of such high torque through the parallel branch 108 thereby precluding torque carrying components of the variator 106 from having to experience long periods of high torque application. Preferably, but not necessarily, a transmission in accordance with the present invention is of a split torque type. However, it is disclosed herein that the parallel branch 108 may, in some embodiment of the present invention, be omitted such that power is transferred between the input interface 104 and the output interface 110 solely through the variator 106.

The rangebox 112 provides various gear selection and clutch engagement functionalities. Examples of such gear selection functionality include, but are not limited to, selective engagement of available rangebox gear ratios and selective engagement of various load drive directions. Examples of such clutch engagement functionality include, but are not limited to, passive implementation of various clutch engagement operations and active implementation of various clutch engagement operations.

Figure 2:
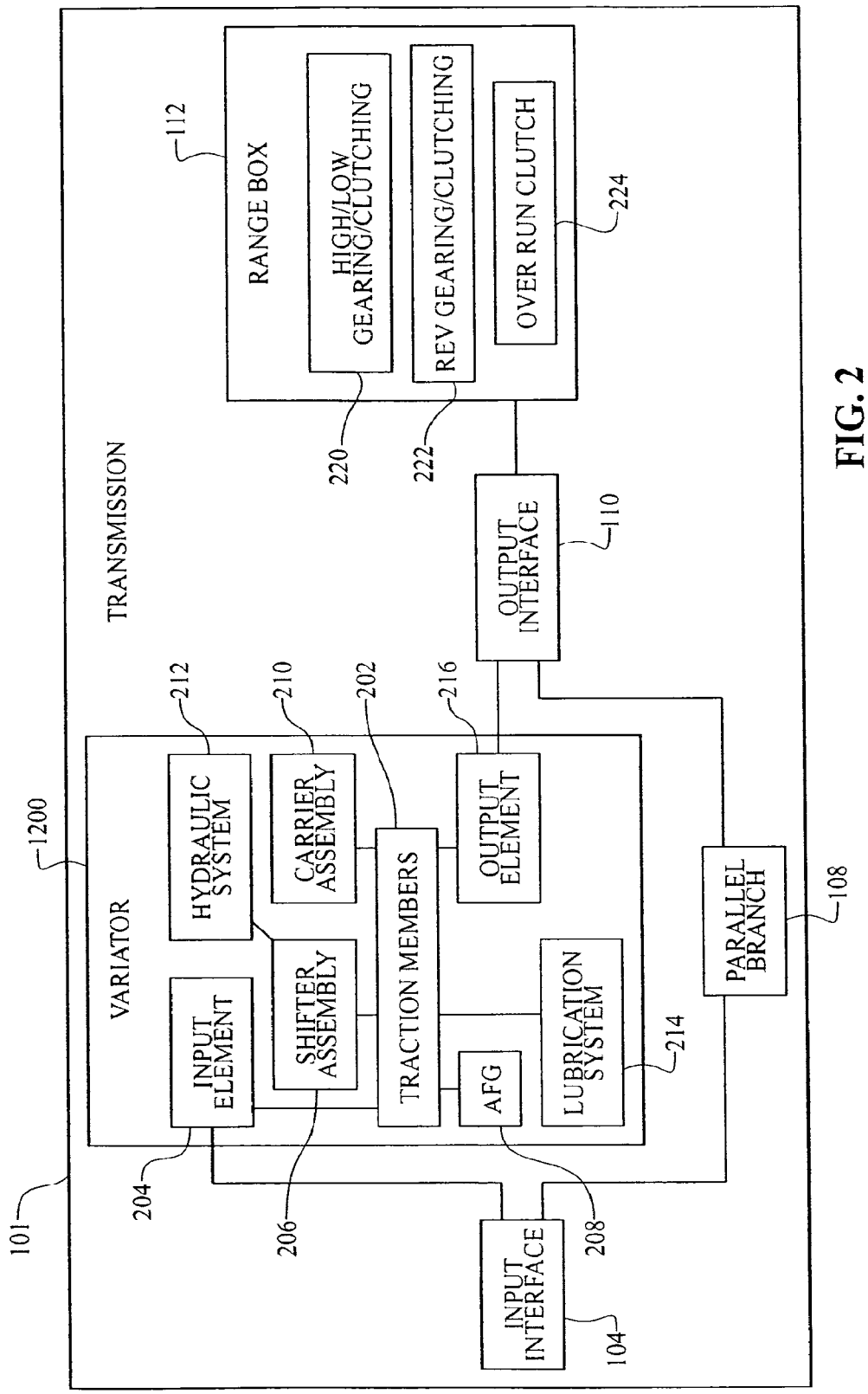
FIG. 2 is a schematic diagram of one embodiment of continuously variable transmission and continuously variable unit in accordance with certain inventive teachings of the disclosure.

Referring to FIG. 2 now, one embodiment of the transmission 101 will be described. As shown in FIGS. 1 and 2, the input interface 104 can serve as a torque interface for receiving an applied input torque at a given rotational speed or range of rotational speeds from the prime mover 102. Through the input interface 104, the applied input torque is delivered to the variator 106 and the parallel branch 108 in a distributed manner. Torque is distributed dependent upon a torque ratio setting of the variator 1200.

As discussed above, the parallel branch 108 can be configured to receive power from the input interface 104 and to distribute that power directly to the output interface 110 without any selective variation of rotational speed and/or rotational direction associated with that power. In one embodiment, the parallel branch 108 includes a shaft rotatably coupled between the input interface 104 and the output interface 110 for transferring power from the input interface 104 and the output interface 110 without any selective variation of rotational speed and/or rotational direction associated with that power.

As shown in FIG. 2, in one embodiment the variator 106 can include traction members 202, an input element 204, a shifter assembly 206, an axial force generator (AFG) 208, a carrier assembly 210, a hydraulic system 212, a lubrication system 214, and an output element 216. The input element 204, the shifter assembly 206, the axial force generator 208, the carrier assembly 210, the lubrication system 214, and the output element 216 are operationally coupled to the traction members 202. The hydraulic system 212 is operationally connected to the shifter assembly 206 and is configured for adjusting a torque ratio setting of the variator 106. The input element 204 is operationally coupled to the input interface 104 for receiving power from the input interface 104. Power is transmitted from input element 204 to the output element 216 through the traction members 202. Power is output from the variator 106 through the output element 216, being delivered to the output interface 110.

The carrier assembly 210 provides for physical placement and support of the traction members 202. The shifter assembly 206 provides functionality for selectively manipulating the traction members 202, thereby enabling a ratio of input torque exerted on the input element 204 to output torque exerted on the output element 216 (that is, the torque ratio) to be selectively varied in a continuous, or stepless, manner. In doing so, the shifter assembly 206 enables the amount of torque transferred jointly by the variator 106 and the parallel branch 108 between the input interface 104 and the output interface 110 to be selectively varied. The hydraulic system 212 can be configured for hydraulically controlling the shifter assembly 206 to vary the torque ratio. The lubrication system 214 can be configured to deliver a lubricant to, among other things, mechanical interfaces between traction members 202, the input element 204, and the output element 216. In one embodiment, the lubrication system 214 is adapted to provide lubricant to the rangebox 112. The axial force generator 208 can be configured for exerting a force (for example, clamping force, axial force, etc.) to keep the input element 204 and the output element 216 in sufficient contact with the traction members 202, thereby limiting slippage at points of contact therebetween. In some embodiments, the axial force generator 208 can cooperate with, or be at least partly operationally coupled with the hydraulic system 212.

Still referring to FIG. 2, in one embodiment, the rangebox 112 includes a first rangebox structure 220 configured for varying a gear range, a second rangebox structure 222 configured for adjusting a load drive direction, and a third rangebox structure 224 configured to protect against load overrun conditions. The first rangebox structure 220 preferably facilitates selective adjustment between a rangebox high gear ratio (for example, relatively low torque output exerted at a relatively high rotational speed) and a rangebox low gear ratio (for example, relatively high torque output exerted at a relatively low rotational speed), which increases the overall gear ratio range of the transmission 101. The second rangebox structure 222 can be configured to facilitate selective adjustment between a first rotary drive direction (for example, corresponding to driving the load 114 in a forward operational direction) and a second rotary drive direction (for example, corresponding to driving the load 114 in a reverse operational direction). The third rangebox structure 224 is adapted to facilitate mechanical slippage in the case where the load 114 attempts to back drive the prime mover 102 through the transmission 101.

Passing to FIGS. 3A and 3B now, various aspects of a transmission 600 will now be discussed. In one embodiment, the transmission 600 can include a torque converter subassembly 800, a main shaft 1000, a variator 1200, a combining device 1400, a rangebox 1600, and a transmission housing 1800. The transmission housing 1800 can include a bell housing 1810 (that is, a first housing portion) and a rear housing 1820 (that is, a second housing portion) separably connected to the bell housing 1810. In the embodiment illustrated, the torque converter subassembly 800, the main shaft 1000, the variator 1200, the combining device 1400, and the rangebox 1600 are operably mounted on or within the transmission housing 1800 in an axially aligned manner. Thus, it is disclosed herein that the transmission housing 1800 is configured for housing and supporting various subassemblies and/or components of the transmission 600. In other embodiments, any one of the torque converter subassembly 800, the variator 1200, the combining device 1400, and the rangebox 1600 can be arranged in a parallel shaft configuration relative to the other components.

In some embodiments, the variator 1200 and the main shaft 1000 can be operably coupled between a power output portion of the torque converter subassembly 800 and power input portions of the combining device 1400. In operation, the torque converter subassembly 800 transfers power to the variator 1200 through the main shaft 1000. The variator 1200 supplies power to a first power input portion 1410 of the combining device 1400. The main shaft 1000 supplies power to a second power input portion 1405 of the combining device 1400. Power from the variator 1200 and the main shaft 1000 can be supplied to the combining device 1400 in a selectively variable ratio (for example, power from the variator 1200 in relation to power from the main shaft 1000) and can be combined by the combining device 1400. The combining device 1400 delivers the combined power to the rangebox 1600 via a power output portion 1401 of the combining device 1400. The power output portion 1401 can include a carrier of planetary gear set and/or a transfer shaft.

In one embodiment, the variator 1200 mounts on the main shaft 1000. In one configuration, the variator 1200 and the main shaft 1000 form a torque split unit. More specifically, the ratio of torque transferred to the combining device 1400 through the variator 1200 or through the main shaft 1000 is selectively variable dependent upon a torque ratio setting of the variator 1200. To this end, the variator 1200 transfers power to the combining device 1400 in a manner whereby the torque and/or the rotational speed associated with that power is selectively and continuously variable (that is, adjustable). Thus, the variator 1200 can be configured for receiving power of a first specification (for example, first torque and first rotational shaft speed) and outputting power of a second specification (for example, second torque and second rotational shaft speed).

The torque converter subassembly 800 is one embodiment of an input interface 104, for example, thereby providing the functionality of transferring power from a prime mover attached to the torque converter subassembly 800 to the variator 1200 via, for example, the main shaft 1000. In other embodiments, a different type of input interface such as, for example, a manually controlled clutch subassembly, a computer controlled clutch assembly, or a flywheel can be implemented in place of the torque converter subassembly 800. The combining device 1400 is an embodiment of an output interface, thereby providing the functionality of combining power received from the variator 1200 and the main shaft 1000 and transferring such power to the rangebox 1600. In one embodiment, the rangebox 1600 receives power from the combining device 1400 and outputs power in conjunction with providing one or more of the various gear selection and clutch engagement functionalities discussed above in reference to FIGS. 1 and 2. As is discussed further below, the rangebox 1600 in combination with the variator 1200 enables the transmission 600 to operate in multiple modes (that is, a multi-mode transmission).

Figure 3A:
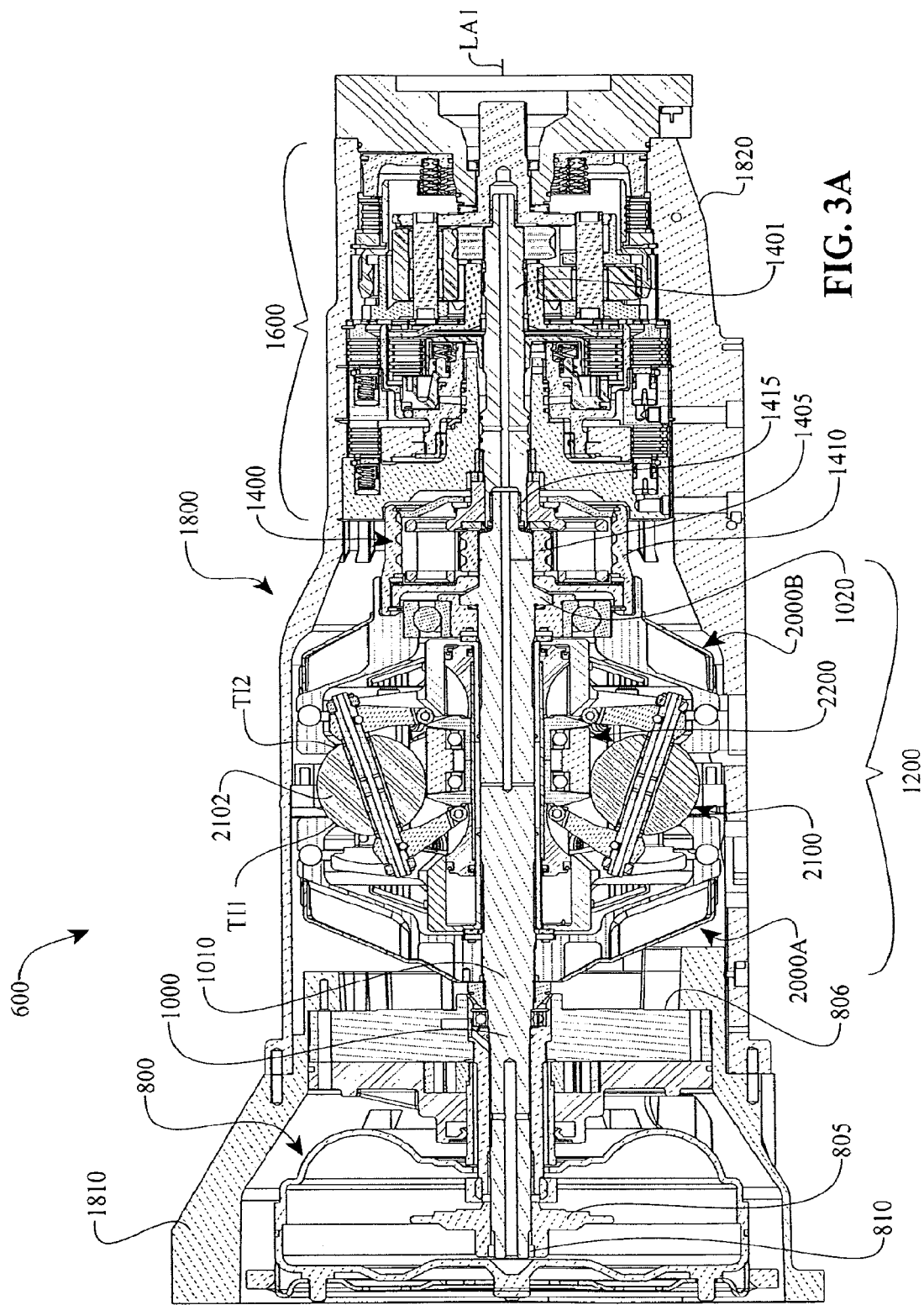
FIG. 3A is a cross-sectional view of one embodiment of a continuously variable transmission employing a continuously variable unit.
Figure 3B:
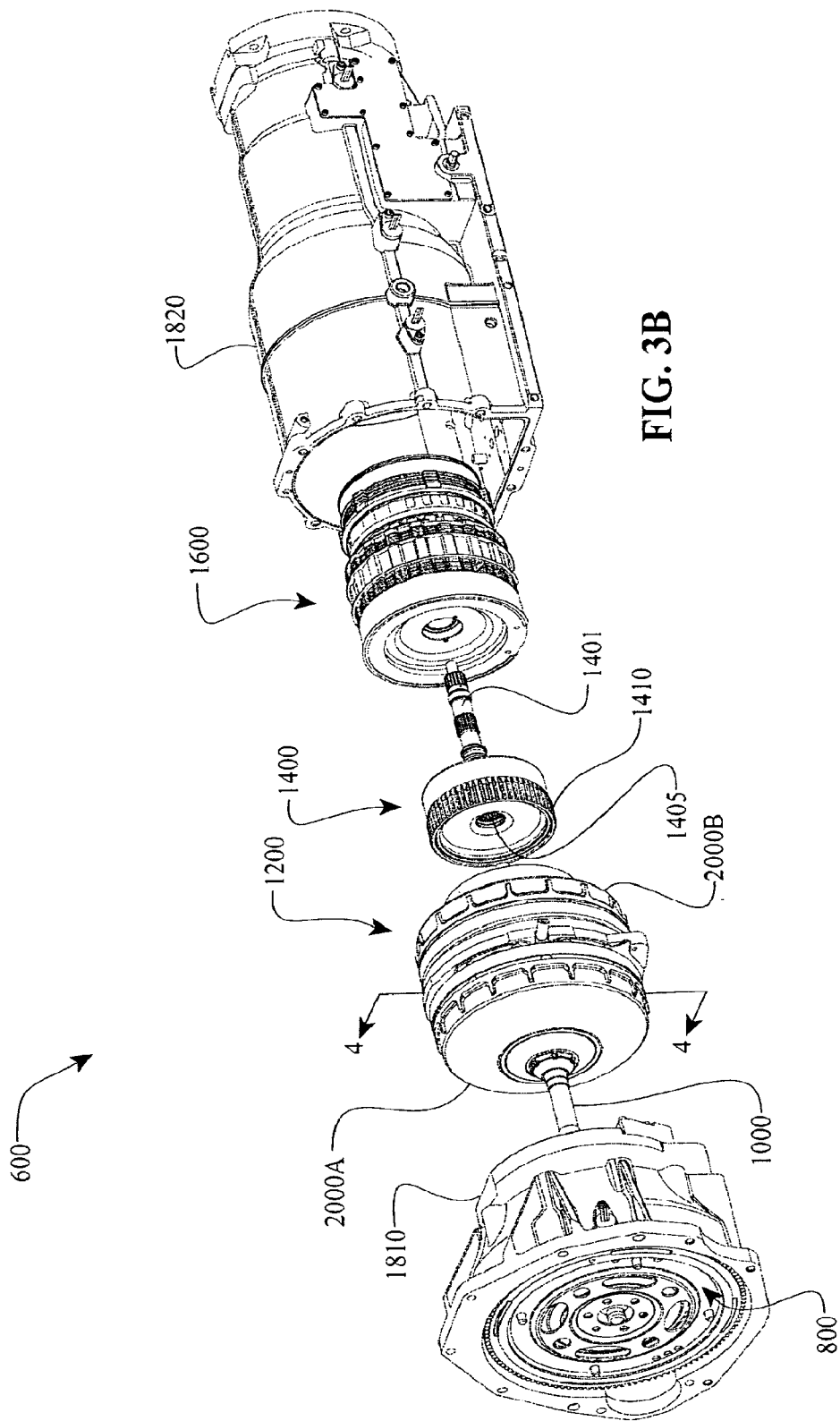
FIG. 3B is a partially exploded view of the continuously variable transmission of FIG. 3A.
Figure 4:
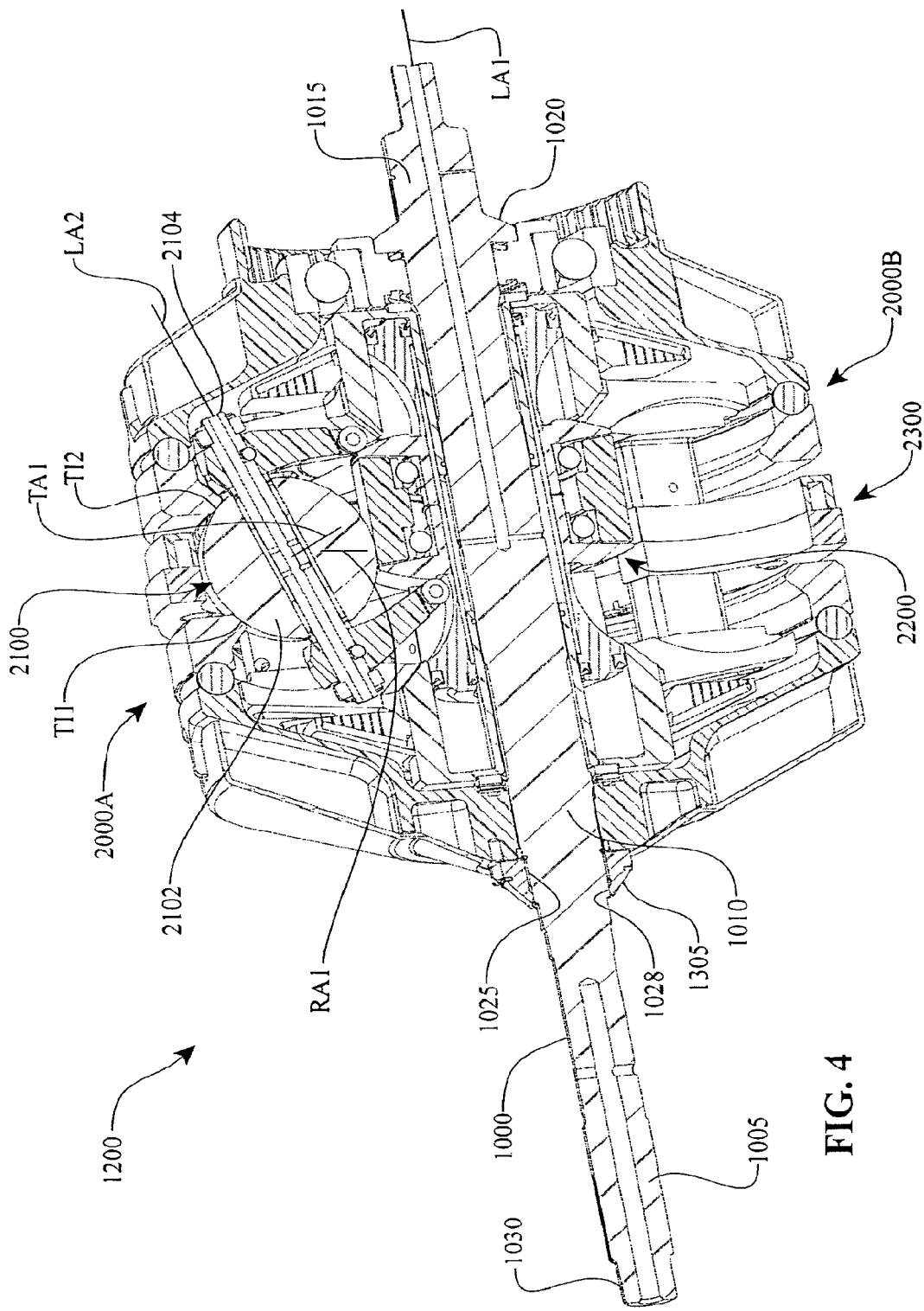
FIG. 4 is a partial cross-section of certain components of a continuously variable unit (CVU).

Referring to FIGS. 3A and 4, in one embodiment, the variator 1200 can include an input load-cam-and-traction-ring subassembly 2000A, an output load-cam-and-traction-ring subassembly 2000B, an array of planet-and-shift-lever subassemblies 2100, a shift-cam-and-sun subassembly 2200, and a stator-manifold subassembly 2300. In one embodiment, the shift-cam-and-sun subassembly 2200 is supported by the stator-manifold subassembly 2300. The shift-cam-and-sun subassembly 2200 is supported in a manner enabling the shift-cam-and-sun subassembly 2200 to be translated along a longitudinal axis LA1 of the main shaft 1000. The planet-and-shift-lever subassemblies 2100 are arrayed angularly around the main shaft 1000, and are supported jointly by the shift-cam-and-sun subassembly 2200 and the stator-manifold subassembly 2300. Each one of the planet-and-shift-lever subassemblies 2100 is supported in a manner that facilitates synchronous rotation of all the planet-and-shift-lever subassemblies 2100 about a respective reference axis TA1 extending through a planet 2102 of each one of the planet-and-shift-lever subassemblies 2100. Through such synchronous rotation, all of the planet-and-shift-lever subassemblies 2100 are in the same relative rotational position at a given point in time. The axis TA1 (see FIG. 4) associated with each one of the planet-and-shift-lever subassemblies 2100 extends through a center point of the respective planet 2102 substantially perpendicular to a radial reference axis RA1 extending from the longitudinal axis LA1 through the center point of the respective planet 2102.

In some embodiments, the main shaft 1000 includes a first end portion 1005, a central portion 1010 and a second end portion 1015. The first end portion 1005 couples to a power output portion 805 of the torque converter assembly 800 (for example, an output hub of a converter turbine) in a manner precluding relative rotation of the main shaft 1000 with respect to the power output portion 805. The central portion 1010 of the main shaft 1000 couples to the input load-cam-and-traction-ring subassembly 2000A in a manner precluding relative rotation of the main shaft 1000 with respect to the input load-cam-and-traction-ring subassembly 2000A. The second end portion 1015 of the main shaft 1000 couples to the first power input portion 1405 of the combining device 1400 in a manner precluding relative rotation of the main shaft 1000 with respect to the first power input portion 1405. The output load-cam-and-traction-ring subassembly 2000B of the variator 1200 couples to a second power input portion 1410 of the combining device 1400 in a manner precluding relative rotation of the output load-cam-and-traction-ring subassembly 2000B with respect to the second power input portion 1410. Thus, the main shaft 1000 is suitably configured for transferring power from the torque converter subassembly 800 (a) directly to the combining device 1400, and (b) to the combining device 1400 through the variator 1200.

Each of the planets 2102 is located by the input load-cam-and-traction-ring subassembly 2000A, the output load-cam-and-traction-ring subassembly 2000B, and the shift-cam-and-sun subassembly 2200. The main shaft 1000 can be configured to exert torque on the input load-cam-and-traction-ring subassembly 2000A. Through traction at a respective input traction interface TI1 between the input load-cam-and-traction-ring subassembly 2000A and each planet 2102, torque is exerted by the input load-cam-and-traction-ring subassembly 2000A on the planets 2102, thereby causing each planet 2102 to rotate about a respective planet axle 2104 (see FIG. 4). The input traction interface TI1 is defined, as used here, at a region of contact between the input load-cam-and-traction-ring subassembly 2000A and the respective planet 2102.

Through traction at a respective output traction interface TI2 between the input load-cam-and-traction-ring subassembly 2000B and each planet 2102, torque is exerted by the planets 2102 on the output load-cam-and-traction-ring subassembly 2000B, thereby causing the output load-cam-and-traction-ring subassembly 2000B to rotate about the main shaft 1000. The output traction interface TI2 is defined, as used here, at a region of contact between the output load-cam-and-traction-ring subassembly 2000B and the respective planet 2102. As shown in FIG. 3A, the output load-cam-and-traction-ring subassembly 2000B can be coupled to the combining device 1400. Accordingly, torque can be transferred from the main shaft 1000 to the combining device 1400 through the variator 1200.

As discussed above in reference to FIGS. 3A and 3B, the ratio of torque transferred to the combining device 1400 through the variator 1200 or through the main shaft 1000 can be selectively variable dependent upon the torque ratio of the variator 1200. The torque ratio refers to a relative position of the input traction interface TI1 and the output traction interface TI2, relative to the axis LA2, for a given tilt of the planet-and-shift-lever subassemblies 2100. When the tangential surface velocity of the planets 2102 at the input traction interface TI1 is the same as the tangential surface velocity of the planets 2102 at the output traction interface TI2, the torque ratio is substantially equal to 1 and there is no corresponding torque multiplication. Through tilting of the planet-and-shift-lever subassemblies 2100, the ratio of the tangential surface velocity of the planets 2102 at the input traction interface TI1 to that of the tangential surface velocity of the planets 2102 at the output traction interface TI2 is selectively adjustable. As discussed further below, the shift-cam-and-sun subassembly can be configured such that translation of the shift-cam-and-sun subassembly 2200 causes such tilt of the planet-and-shift-lever subassemblies 2100. The direction of tilt of the planet-and-shift-lever subassemblies 2100 from the position corresponding to the torque ratio of 1 dictates whether the torque multiplication is greater than 1 (that is, torque output is greater than torque input) or less than 1 (that is, torque input is greater than torque output).

As depicted in FIGS. 3A and 4, the input traction interface TI1 and the output traction interface TI2 are angularly equidistant relative to a radial reference axis RA1 extending through the tangential reference axis TA1. As a result, the torque ratio is 1 when a longitudinal axis LA2 of each planet 2102 is parallel with the longitudinal axis LA1 of the main shaft 1000. Such an equidistant configuration provides for a balanced adjustment range such that full adjustment of the planet-and-shift-lever subassemblies 2100 in a first adjustment direction results in the same absolute torque multiplication value as full adjustment in a second direction. In other embodiments, the input traction interface TI1 and the output traction interface TI2 may be non-equidistant from the reference axis TA1 when the torque ratio is 1.0 and the longitudinal axis LA2 is parallel with the longitudinal axis LA1. Such a non-equidistant configuration provides for biasing of the adjustment range such that full adjustment of the planet-and-shift-lever subassemblies 2100 in the first adjustment direction results in a different absolute torque multiplication value than full adjustment in the second adjustment direction.

Referring now to FIGS. 3A and 4-6, in one embodiment the variator 1200 can be axially constrained on the main shaft 1000 between an axial reaction flange 1020 of the main shaft 1000 and an axial lock nut 1305 (FIG. 4). The axial lock nut 1305 includes a threaded bore configured for mating with a corresponding threaded portion 1025 of the main shaft 1000. The axial reaction flange 1020 can be fixedly attached to the main shaft 1000 adjacent the second end portion 1015 of the main shaft 1000. The threaded portion 1025 can be an integral component of the main shaft 1000, adjacent to the central portion 1010 of the main shaft 1000. In one embodiment, the main shaft 1000 includes an anti-rock piloting surface 1028 configured for engaging a mating anti-rock piloting surface of the axial lock nut 1305 for limiting rocking of the axial lock nut 1305 with respect to the main shaft 1000.

A first engagement extension 1030 at the first end portion 1005 of the main shaft 1000 can be configured for engaging or supporting a bearing assembly 810 (FIG. 3A) that interfaces with certain components of the torque converter subassembly 800 or other support member. A second engagement extension 1035 at the second end portion 1015 of the main shaft 1000 can be configured for engaging or supporting a bearing assembly 1415 (FIG. 3A) that interfaces with certain components of the combining device 1400. In some embodiments, the bearing assemblies 810, 1415 include each only a bushing or a bearing component. In other embodiments, the bearing assemblies 810, 1415 each include a bushing or a bearing component and a seal component configured to engage a mating surface of the respective engagement extension 1030, 1035.

Referring to FIGS. 5 and 6, the first end portion 1005 of the main shaft 1000 can include torque converter engaging splines 1040 configured to couple to mating splines of the power output hub of the torque converter assembly 800. The central portion 1010 of the main shaft 1000 includes input load cam engaging splines 1045 configured to couple to mating splines of the input-load-and-traction-ring subassembly 2000A (that is, a power input portion) of the variator 1200. The second end portion 1015 of the main shaft 1000 can include combining device engaging splines 1050 configured to couple to mating splines of the first power input portion 1405 of the combining device 1400. Thus, the main shaft 1000 can be configured for transferring power from the torque converter subassembly 800 directly to the combining device 1400, and to the combining device 1400 through the variator 1200. A splined coupling is one example of a coupling suitable for precluding relative rotation of the main shaft 1000 with respect to the power output portion of the torque converter subassembly 800, the power input portion of the variator 1200, and the first power input portion 1405 of the combining device 1400. However, other couplings can be used. A key and mating engagement coupling is another example of a suitable coupling.

In one embodiment, the main shaft 1000 can include a first channel 1055 (FIGS. 3A, 4 and 6) for facilitating flow of a transmission fluid from the power output portion 805 of the torque converter subassembly 800 to an interface between the main shaft 1000 a transmission oil pump 806 (FIG. 3A) of the torque converter subassembly 800. The main shaft 1000 can include a second channel 1060 for enabling flow of lubricant to the variator 1200 and/or to the combining device 1400.

Referring now to FIGS. 7-14, in one embodiment the input load-cam-and-traction-ring subassembly 2000A can include an input load cam 2005A, an input traction ring 2010A, a plurality of input load cam rollers 2015A (FIG. 7), and an input load cam shroud 2020A. In one embodiment, the input load cam 2005A is in splined engagement with the main shaft 1000, thereby facilitating the transfer of torque from the main shaft 1000 to the input load cam 2005A. The input load cam 2005A can be configured to transfer torque to an input traction ring 2010A via the plurality of input load cam rollers 2015A. The input load cam rollers 2015A are engaged between the input load cam 2005A and the input traction ring 2010A. The input traction ring 2010A can be positioned between the input load cam rollers 2015A and the planets 2102. Torque applied to the input load cam 2005A by the main shaft 1000 is transferred from the input load cam 2005A to the input traction ring 2010A through the load cam rollers 2015A.

In one embodiment, the input load cam 2005A can include a generally bowl-shaped body 2052A (see FIGS. 10-11) having a hub portion 2054A and a perimeter edge portion 2056A. In one embodiment, the hub portion 2054A includes a central bore 2058A having internal splines configured for mating with the input load cam engaging splines 1045 (FIG. 5) of the main shaft 1000, thereby supporting the input load cam 2005A and enabling power to be transferred from the main shaft 1000 to the variator 1200.

In one embodiment, a set of bi-directional ramps 2060A can be provided in a rear face 2062A of the perimeter edge portion 2056A. The ramps 2060A can be configured for receiving one of the input load cam rollers 2015A (FIG. 7) and cooperates with the respective input load cam roller 2015A for applying an axial force and a tangential force on the input traction ring 2010A. In other embodiments, a cam roller retainer (not shown) can be provided to receive and support the input load cam rollers 2015. Through such cooperation, rotation of the input load cam 2005A causes the input load cam rollers 2015A to urge the input traction ring 2010A into compressive engagement with the planets 2102 and to urge the input traction ring 2010A into rotation about the longitudinal axis LA1 of the main shaft 1000, thereby providing for torque transfer from the input load cam 2005A to the planets 2102 via the input traction ring 2010A.

Referencing FIGS. 8 and 9, in one embodiment, the input traction ring 2010A has a generally annular ring shape with a front face 2061A and a back face 2063A. The input traction ring 2010A includes a contact surface 2065A that engages the planets 2102 (one shown in FIG. 7). The input traction interface TI1 is the region of contact between the contact surface 2065A of the input traction ring 2010A and each one of the planets 2102 (one shown in FIG. 7). Through traction at each input traction interface TI1, torque imparted to the input traction ring 2010A by the input load cam 2005A is transferred to the planets 2102, thereby causing each planet 2102 to rotate about the respective planet axle 2104. Preferably, but not necessarily, traction at each input traction interface TI1 is provided through an elastohydrodynamic layer formed by a traction fluid. The contact surface 2065A is generally angled relative to the front face 2061A, such that the profile of the contact surface 2065A mates efficiently with a curvature of each planet 2102. The angle of inclination between the front face 2061A and the contact surface 2065A can be between about 5 degrees and 75 degrees, more preferably between about 15 degrees and 65 degrees, even more preferably between about 30 degrees and 55 degrees, and most preferably between about 35 degrees and 50 degrees.

The back face 2063A can include a radiused groove 2067A configured for receiving the load cam rollers 2015A to facilitate torque transfer from the input load cam 2005A to the input traction ring 2010A. It is disclosed herein that an input traction ring can include the set of bi-directional ramps, and an input load cam can include the radiused groove. In other embodiments, the input traction ring and the input load cam both have ramps.

Figure 12:
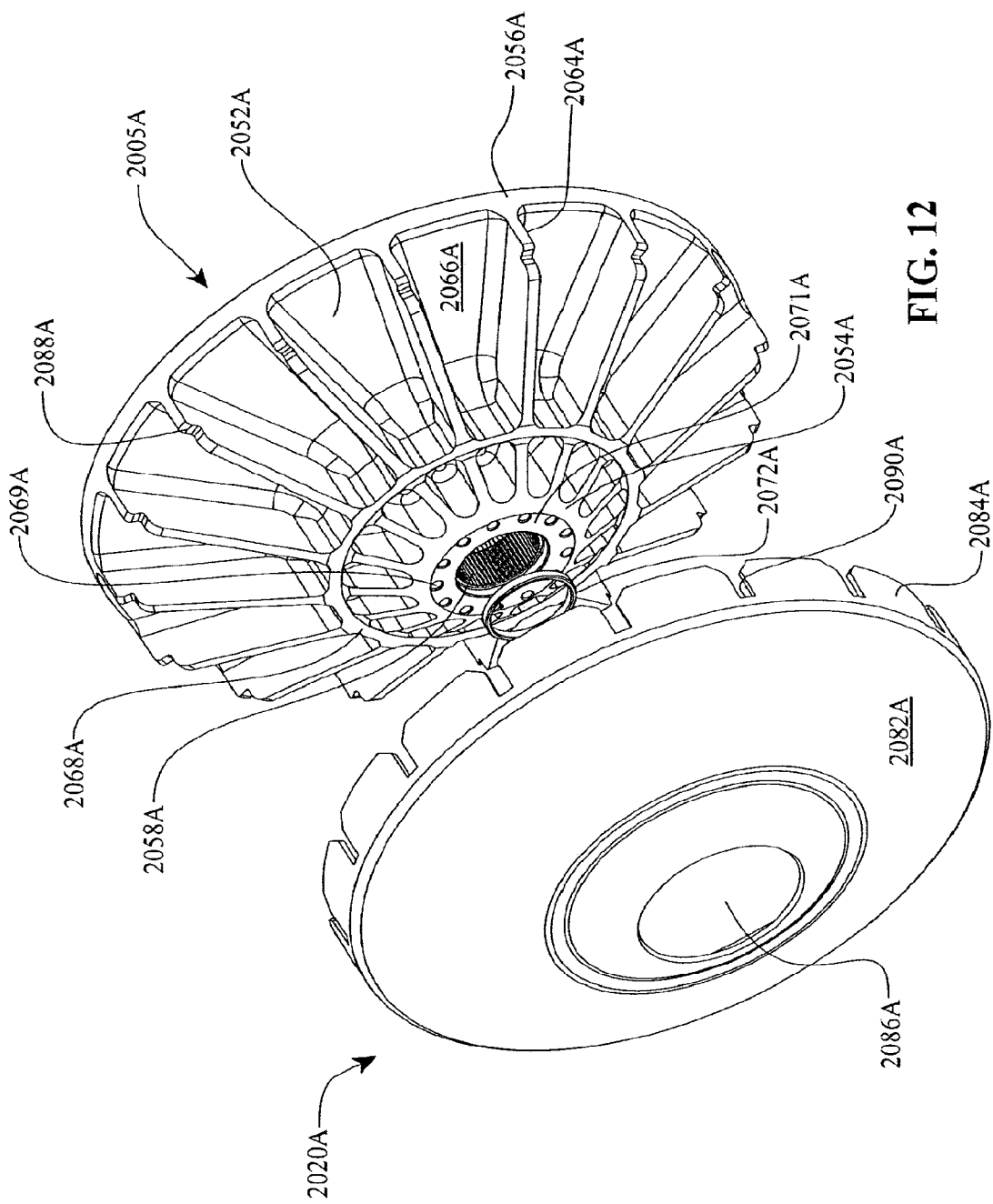
FIG. 12 is a partially exploded view of the load cam and shroud assembly of FIG. 10.

Referring to FIGS. 12-14, in some embodiments, radially extending ribs 2064A can be attached to a front face 2066A of the body 2052A, extending generally from the perimeter edge portion 2056A to the hub portion 2054A. A cylindrically shaped flange 2068A extends from the front face 2066A. The cylindrically shaped flange 2068A intersects the radially extending ribs 2064A. The radially extending ribs 2064A and the cylindrically shaped flange 2068A jointly and individually enhance stiffness of the bowl-shaped body 2052A and serve as cooling fins for dissipating heat. Furthermore, in some embodiments, the radially extending ribs 2064A can be used to facilitate the sensing of rotational speed of the input load cam 2005A.

Figure 7:
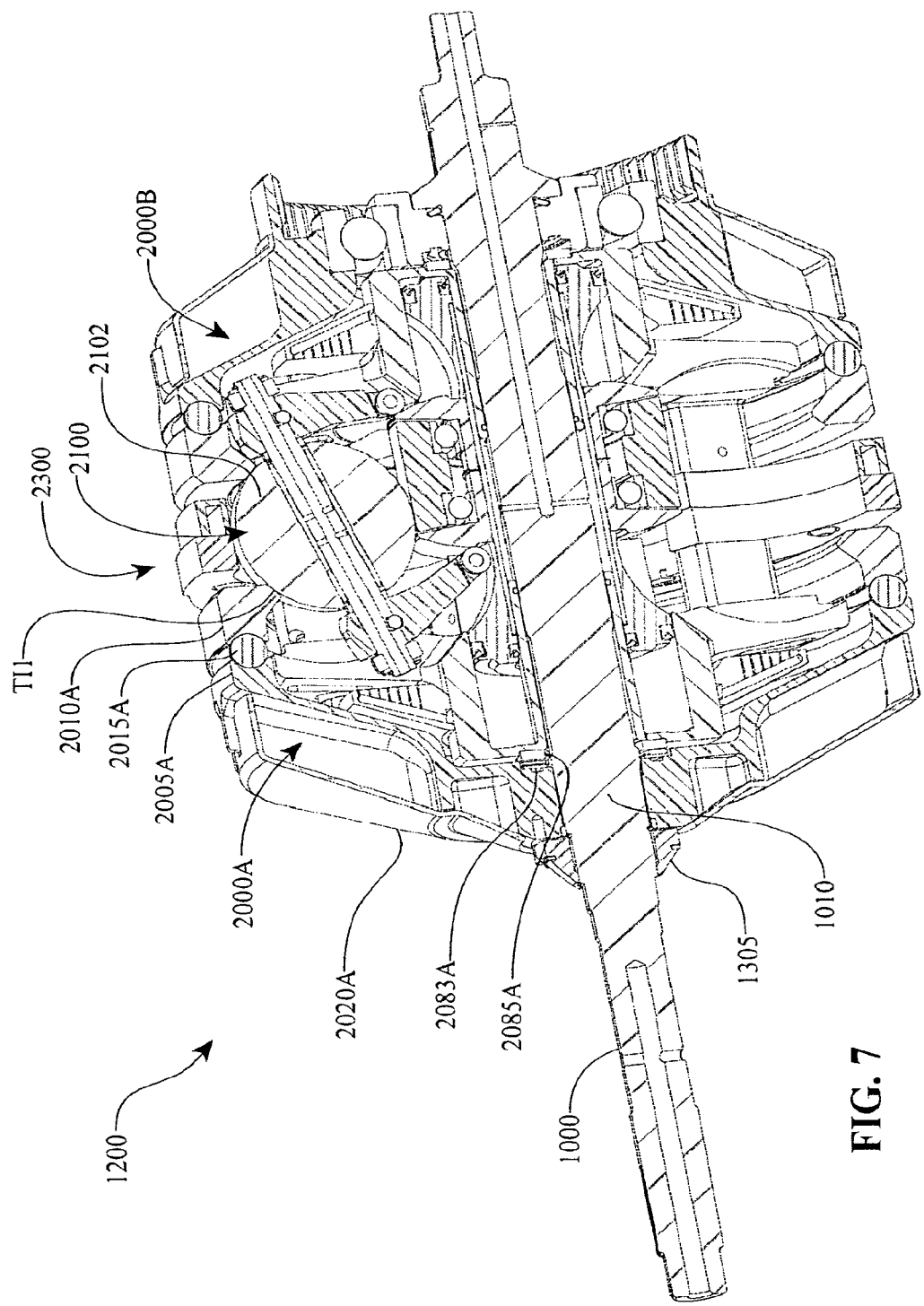
FIG. 7 is a partial cross-section of certain components of the CVU of FIG. 4.

Referencing FIGS. 11, 12, and 14, a recess 2070A in a front face 2071A of the hub portion 2054A is configured for receiving an anti-rocking device 2072A (FIG. 12) such as, for example, a bushing, a bearing or a sleeve, which serves to limit rocking of the input load cam 2005A with respect to the main shaft 1000. A preloading spring recess 2076A and a thrust bearing recess 2078A are provided in a rear face 2079A of the hub portion 2054A. The preload spring recess 2076A is configured for receiving a preloading spring 2083A (FIG. 7), and the thrust bearing recess 2078A is configured for receiving a thrust bearing 2085A (FIG. 7). Jointly, such a preloading spring and thrust bearing arrangement serves to exert a reactive preload force between the input load cam assembly 2000A, the stator-manifold subassembly 2300 and the output load cam assembly 2000B when the preloading spring 2083A is compressed. Examples of the preloading spring 2083A include, but are not limited to, a Bellville washer, a wavy washer, a helical compression spring and other suitably configured spring members. Examples of the thrust bearing 2085A include, but are not limited to, a roller thrust bearing, a thrust bushing, and other devices suitably configured for carrying a thrust load.

Figure 16:
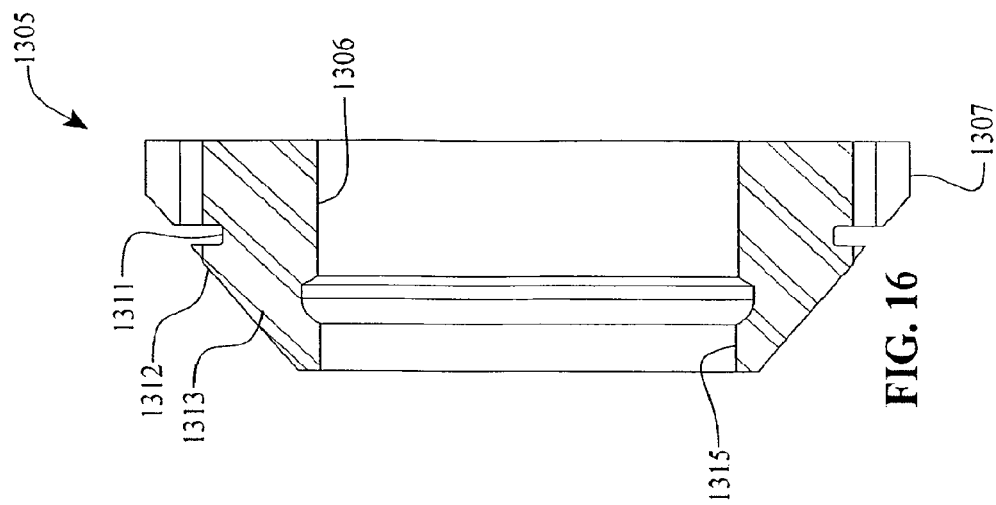
FIG. 16 is a cross-sectional view of the lock nut of FIG. 15.
Figure 15:
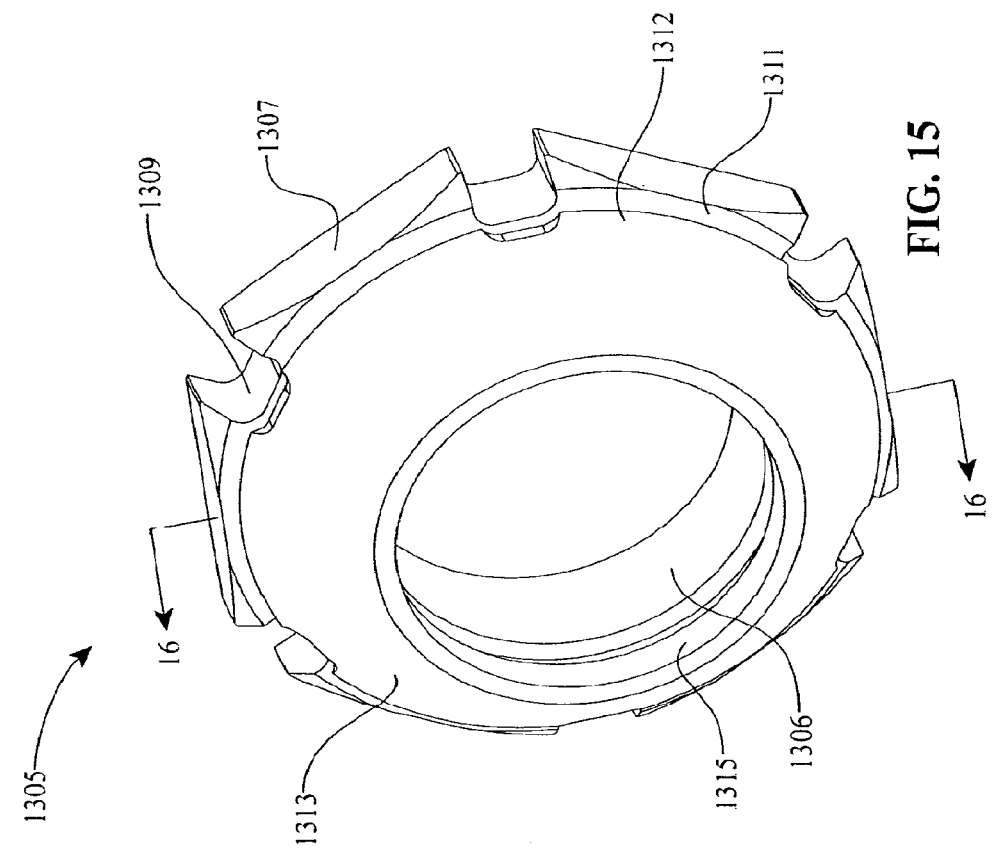
FIG. 15 is a perspective view of a lock nut that can be used with the CVU of FIG. 4.

Referring now to FIGS. 7, 12, 14, 15 and 16, a plurality of dowel pin holes 2069A (FIGS. 12 and 14) in the front face 2071A can be configured for receiving one or more dowel pins (not shown) to facilitate coupling of the axial lock nut 1305 (FIGS. 7, 15 and 16) to the input load cam 2005A for preventing unintentional loosening of the axial lock nut 1305. As shown in FIGS. 15 and 16, the axial lock nut 1305 can have a threaded bore 1306 configured for engaging the corresponding threaded portion 1025 of the main shaft 1000. In on embodiment, the axial lock nut 1305 can be provided with a polygonal-shaped (for example, hexagonal) outer periphery portion 1307 configured to engage a tool for manipulating the axial lock nut 1305. A plurality of notches 1309 (for example, dowel engaging features) can be provided in the outer periphery portion 1307 for engaging dowels (not shown) received within one of the dowel pin holes 2069A. Such engagement facilitates selective angular positioning and constraining of the axial lock nut 1305 with respect to the load input cam 2005A, which is useful for preventing unintentional loosening of the axial lock nut 1305. A circumferential groove 1311 exposed at an exterior surface 1312 of the axial lock nut 1305 can be configured to receive a retaining device (not shown) such as, for example, a snap ring to retain the one or more dowels within respective ones of the dowel pin holes 2069A. When engaged within the circumferential groove 1311, the retaining device prevents the dowels from unintentionally backing out of the respective dowel pin holes 2069A. An extension portion 1313 of the axial lock nut 1305 includes an anti-rock piloting surface 1315 (that is, a reaction surface) that engages the mating anti-rock piloting surface 1028 (FIG. 5) of the main shaft 1000 for limiting rocking of the axial lock nut 1305 with respect to the main shaft 1000.

As shown in FIGS. 7 and 10-14, the input load cam shroud 2020A includes a bowl-shaped body 2082A having perimeter flanges 2084A. The input load cam shroud 2020A is mountable over the front face 2066A of the input load cam 2005A. When so mounted, each one of the perimeter flanges 2084A can be positioned between a respective adjacent pair of the radially extending ribs 2064A, and the hub portion 2054A is exposed within a central opening 2086A of the body 2082A. The radially extending ribs 2064A can include a recessed portions 2088A (FIG. 12) that receives a shoulder 2090A (FIG. 12) extending between adjacent ones of the perimeter flanges 2084A. The input load cam shroud 2020A can be mounted on the input load cam 2005A to, among other things, reduce the potential for the radially extending ribs 2064A to generate unwanted fluid dynamics (for example, air and/or lubricant drag).

Figure 19:
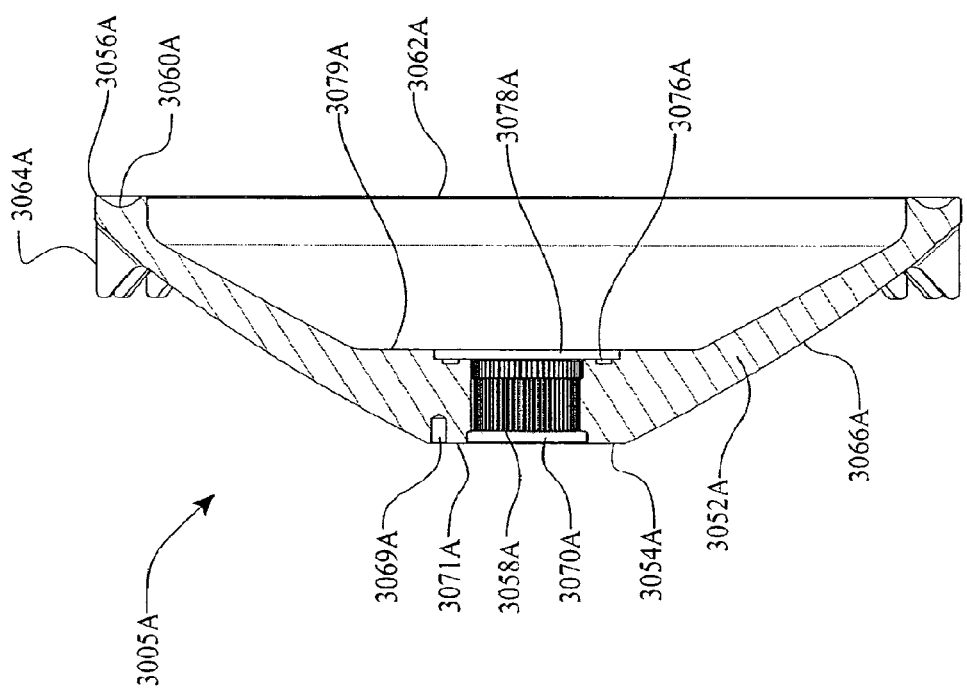
FIG. 19 is a cross-sectional view of the load cam of FIG. 17.

FIGS. 17-19 show an alternative embodiment of an input load cam, which is referred to herein as the input load cam 3005A. The input load cam 3005A is suitably configured for being used in place of the input load cam 2005A discussed above with reference to FIGS. 4 and 13-14. The input load cam 3005A includes a generally bowl-shaped body 3052A having a hub portion 3054A and a perimeter edge portion 3056A. In some embodiments, the body 3052A has a conical shape. The hub portion 3054A can include a central bore 3058A having splines configured to mate with splines of the central portion 1010 of the main shaft 1000 (FIG. 4), thereby facilitating power transfer from the main shaft 1000 to the variator 1200. A set of bi-directional ramps 3060A can be provided in a rear face 3062A of the perimeter edge portion 3056A. The ramps 3060A can be configured for receiving the input load cam rollers 2015A (FIG. 7) and to cooperate with the input load cam rollers 2015A for applying an axial force and a tangential force on the input traction ring 2010A. Through such cooperation, the ramps 3060A facilitate torque transfer from the input load cam 3005A to the input traction ring 2010A.

Radial fins 3064A can be attached to a front face 3066A of the body 3052A, extending outwardly from the perimeter edge portion 3056A. The radial fins 3064A serve, among other things, as cooling fins for dissipating heat. Furthermore, the radial fins 3064A can be used for facilitating the sensing of the rotational speed of the input load cam 3005A. The input load cam shroud 2020A of FIGS. 10-12 is compatible with the input load cam 3005A. The input load cam shroud 2020A can be mounted on the input load cam 3005A; however, in some embodiments, the input load cam shroud 2020A is not used.

A recess 3070A (FIGS. 11, 12 and 14) in a front face 3071A of the hub portion 3054A can be configured for receiving an anti-rock device such as, for example, the anti-rock device 3072A shown in FIG. 12. A preloading spring recess 3076A and a thrust bearing recess 3078A are provided in a rear face 3079A of the hub portion 3054A. The preloading spring recess 3076A is configured for receiving the preloading spring 2083A (FIG. 7), and the thrust bearing recess 3078A is configured for receiving the thrust bearing 2085A (FIG. 7). Jointly, such a preloading spring and thrust bearing arrangement serves to, among other things, exert a reactive preload force between the input load cam assembly 2000A, the stator-manifold subassembly 2300, and the output load cam assembly 2000B. A plurality of dowel pin holes 3069A (FIGS. 18 and 19) in the front face 3071A can be configured for receiving dowel pins (not shown) to facilitate coupling of the axial lock nut 1305 (FIGS. 7, 15 and 16) to the input load cam 3005A for preventing unintentional loosening of the axial lock nut 1305.

Figure 20:
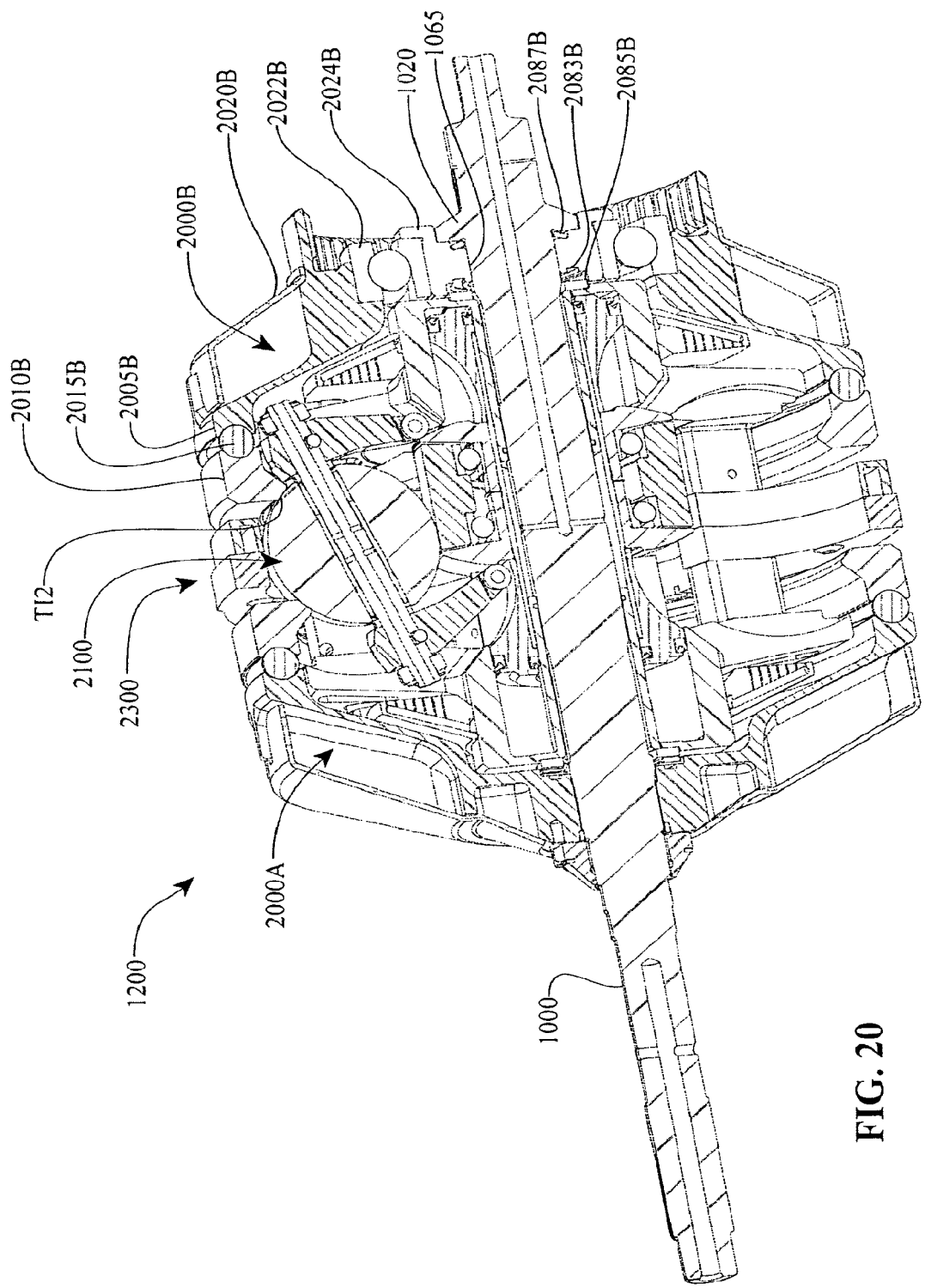
FIG. 20 is a partial cross-section of certain components of the CVU of FIG. 4.

Referring now to FIGS. 20-26 the output load-cam-and-traction-ring subassembly 2000B can include an output load cam 2005B, an output traction ring 2010B, a plurality of output load cam rollers 2015B (FIG. 20), an output load cam shroud 2020B, an output load cam bearing assembly 2022B, and a bearing support adapter 2024B. The output load cam 2005B can be mounted on the main shaft 1000 through use of the output load cam bearing assembly 2022B and the bearing support adapter 2024B. As shown in FIG. 20, the output load cam bearing assembly 2022B fits between the output load cam 2005B and the bearing support adapter 2024B. In one embodiment, the output load cam bearing assembly 2022B can be axially constrained by corresponding structural features of the output load cam 2005B and the bearing support adapter 2024B.

Referencing FIGS. 25-26, in one embodiment, the bearing support adapter 2024B can include a central bore 2025B configured for engaging a mating surface 1065 (FIGS. 5 and 20) of the main shaft 1000. The bearing support adapter can include a shoulder 2026B configured to abut against the axial reaction flange 1020 of the main shaft 1000 to react axial loads that arise in the variator 1200. The shoulder 2026B is accessible through a first face 2016B of the bearing support adapter 2024B. The bearing adapter 2024B can be mounted on the main shaft 1000 by, for example, an interference fit, press fit, or close tolerance clearance fit with the mating support surface 1065 of the main shaft 1000. A flange 2027B of the bearing support adapter 2024B can be adapted to react axial loads from the output load cam bearing assembly 2022B. In one embodiment, the bearing support adapter 2024B can include a piloting surface 2029B that pilots on, or alternatively provides clearance with respect to, the axial reaction flange 1020. The bearing support adapter 2024B can include a recess 2077B for receiving and supporting a spring 2087B (see FIG. 20). The spring 2087B can be a Bellville spring for providing preloading.

A bearing support surface 2028B of the bearing support adapter 2024B can be configured to support the output load cam bearing assembly 2022B. The bearing support adapter 2024B can include a preloading spring recess 2076B and a thrust bearing recess 2078B, which are both accessible through a second face 2018B of the bearing support adapter 2024B. The preloading spring recess 2076B is configured for receiving a preloading spring 2083B (FIG. 20), and the thrust bearing recess 2078B is configured for receiving a thrust bearing 2085B (FIG. 20). Jointly, such a preloading spring and thrust bearing arrangement serves to exert a reactive preload force between the input load cam assembly 2000A, the stator-manifold subassembly 2300, and the output load cam assembly 2000B, when the preloading spring 2083B is compressed. Examples of the preloading spring 2083B include, but are not limited to, a Bellville washer, a wavy washer, a helical compression spring, and other suitably configured spring members. Examples of the thrust bearing 2085B include, but are not limited to, a roller thrust bearing, a thrust bushing, and other devices suitably configured for carrying a thrust load. In some embodiments, the thrust bearing recess 2078B receives a bearing race adapted to cooperate with a needle bearing, which couples to a bearing race 4243 that is integral with, or positioned adjacent to, the stator 4200 (see FIG. 56).

In one embodiment, the output load cam 2005B is coupled to the output traction ring 2010B via the output load cam rollers 2015B, which can be positioned between the output load cam 2005B and the output traction ring 2010B. The output traction ring 2010B is placed between the output load cam rollers 2015B and the planets 2102. Torque exerted on the output traction ring 2010B by the planets 2102 is transferred from the output traction ring 2010B to the output load cam 2005B through the load cam rollers 2015B.

In some embodiments, the output load cam 2005B can include a generally bowl-shaped body 2052B having a hub portion 2054B and a perimeter edge portion 2056B. The hub portion 2054B includes a central bore 2058B having splines 2059B configured to mate with splines of the second power input portion 1410 of the combining device 1400 (FIG. 3A), thereby facilitating power transfer from the variator 1200 to the combining device 1400. The hub portion 2054B can also include a bearing recess 2057B configured for receiving an outer race of the output load cam bearing assembly 2022B (FIG. 20).

A set of bi-directional ramps 2060B is provided in a rear face 2062B of the perimeter edge portion 2056B. The ramps 2060B can be configured for receiving the output load cam rollers 2015B (FIG. 20) and for cooperating with the output load cam rollers 2015B for, among other things, applying an axial force on the output traction ring 2010B. Through such cooperation, rotation of the output traction ring 2010B causes the output load cam rollers 2015B to urge the output traction ring 2010B into compressive engagement with the planets 2102 and to urge the output load cam 2005B into rotation about the longitudinal axis LA1 of the main shaft 1000, thereby providing for torque transfer from the planets 2102 to the output load cam 2005B. Radially extending ribs 2064B can be attached to a front face 2066B of the body 2052B, extending generally from the perimeter edge portion 2056B to the hub portion 2054B. The radially extending ribs 2064B enhance stiffness of the body 2052B and serve as cooling fins for dissipating heat, among other things. Furthermore, the radially extending ribs 2064 can be used for facilitating the sensing of rotational speed of the output load cam 2005B. In some embodiments, the output load cam 2005B can include a hub portion 2054B configured to engage the second power input portion 1405 of the combining device 1400 in a manner precluding relative rotation of the output load cam 2005B with respect to the second power input portion 1405. In this manner, the interface between the output load cam 2005B and the second power input portion 1405 enables power transfer from the variator 1200 to the combining device 1400.

Figure 24:
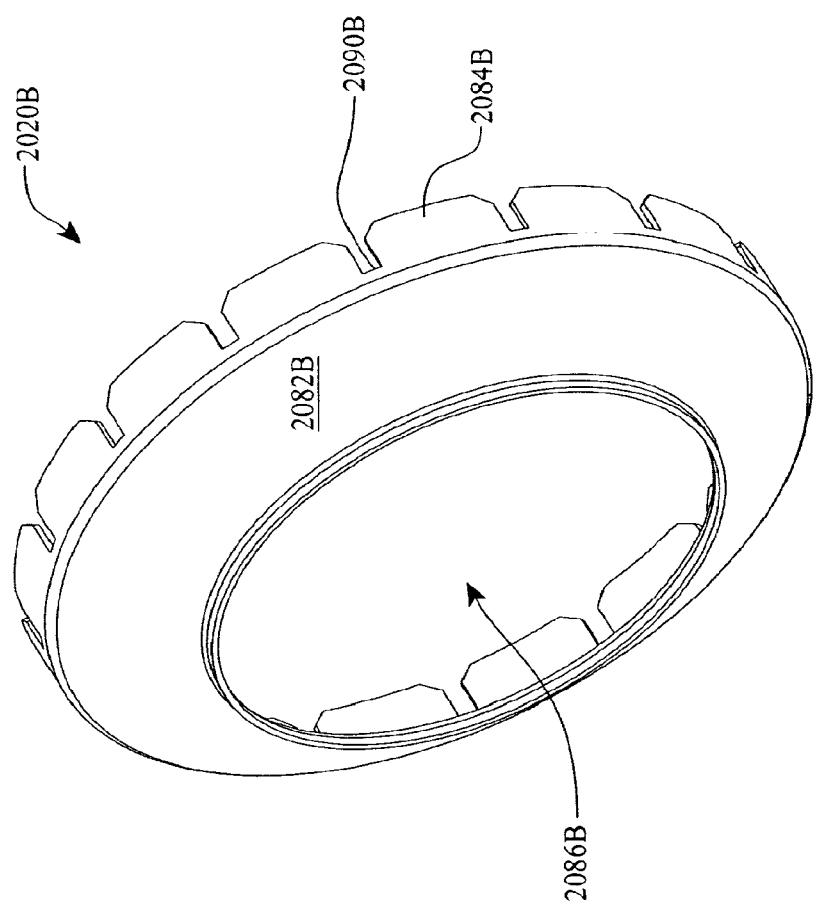
FIG. 24 is a perspective view of a shroud that can be used with the CVU of FIG. 4.

As shown in FIGS. 20 and 24, in one embodiment, the output load cam shroud 2020B can include a bowl-shaped body 2082B having perimeter flanges 2084B. The output load cam shroud 2020B is mountable over the front face 2066B of the output load cam 2005B. When so mounted, each one of the perimeter flanges 2084B is positioned between a respective adjacent pair of the radially extending ribs 2064B, and the hub portion 2054B of the output load cam 2005B is exposed within a central opening 2086B of the body 2082B. The radially extending ribs 2064B can include a recessed portions 2088B (FIG. 24) that receive shoulders 2090B extending between adjacent ones of the perimeter flanges 2084B. The shroud 2020B can be mounted on the output load cam 2005B to, among other things, reduce the potential for the radially extending ribs 2064B to generate undesired fluid dynamics.

FIGS. 27-29 show an alternative embodiment of an output load cam, which is referred to herein as the output load cam 3005B. The output load cam 3005B is suitably configured for being used in place of the output load cam 2005B discussed above in reference to FIGS. 4 and 20-23. In one embodiment, the output load cam 3005B includes a generally bowl-shaped body 3052B having a hub portion 3054B and a perimeter edge portion 3056B. The hub portion 3054B includes a central passage 3058B having splines 3059B configured to mate external splines of the second power input portion 1405 of the combining device 1400, thereby facilitating power transfer from the variator 1200 to the combining device 1400. In one embodiment, the hub portion 3054B can also include a bearing recess 3057B configured for receiving an outer race of the output load cam bearing assembly 2022B (FIG. 20). In some embodiments, a set of bi-directional ramps 3060B can be provided in a rear face 3062B of the perimeter edge portion 3056B. The ramps 3060B can be configured for receiving the output load cam rollers 2015B (FIG. 20) and to cooperate with the output load cam rollers 2015B for applying an axial force on the output traction ring 2010B and the output load cam 3005B. Through such cooperation, the ramps 3060B enable torque transfer from the output traction ring 2010B to the output load cam 3005B. In some embodiments, radial fins 3064B are attached to a front face 3066B of the body 3052B, extending outwardly from the perimeter edge portion 3056B. The radial fins 3064B serve as cooling fins for dissipating heat. Furthermore, the radial fins 3064B can be used for facilitating the sensing of rotational speed of the output load cam 3005B. The shroud 2020B of FIG. 24 is compatible with the output load cam 3005B. The shroud 2020B can be mounted on the output load cam 3005B to, among other things, reduce the potential for the radial fins 3064B to generate undesirable fluid dynamics.

Referring now to FIGS. 30-33, in one embodiment, each one of the planet-and-shift-lever subassemblies 2100 includes a planet 2102 rotatably mounted on a planet axle 2104, which can be positioned on a planet central bore 2103. Spaced apart planet bearings 2108, an inner spacer 2110, and outer spacers 2112 can mount coaxially on the planet axle 2104. In some embodiment, the inner spacer 2110 is positioned between the planet bearings 2108, and each one of the planet bearings 2108 is positioned between a respective one of the outer spacers 2112 and the inner spacer 2110. Accordingly, each planet 2102 is rotatably mounted on a respective planet axle 2104 in a load-bearing and rotatable manner. It is disclosed herein that the present invention is not limited to a particular planet bearing and spacer arrangement for rotatably mounting each planet 2102 on the respective planet axle 2104. For example, in some embodiments, a planet bearing and spacer arrangement using more than two or less two planet bearings and more than two or less spacers (that is, inner position and/or outer position) can be implemented.

Planet axle shift levers 2106 ("shift levers 2106") can be fixedly attached to opposing end portions 2107 of the planet axle 2104 such that the planet 2102 is positioned between the shift levers 2106. The planet axle 2104 extends through a planet axle bore 2111 (see FIGS. 32 and 33) of each shift lever 2106. In one embodiment, the opposing end portions 2107 include a skew roller shoulders 2109 on which skew rollers 2122 mount. Each skew roller 2122 can be held in place by a washer 2124 and a clip ring 2126, which clip ring 2126 can be engaged within a groove in the skew roller shoulder 2109. It is disclosed herein that, in some embodiments, a shift lever 2106 can include one or more features (not shown) such as, for example, a recess, a channel, etc., for providing clearance with other components of the variator 1200.

Figure 30:
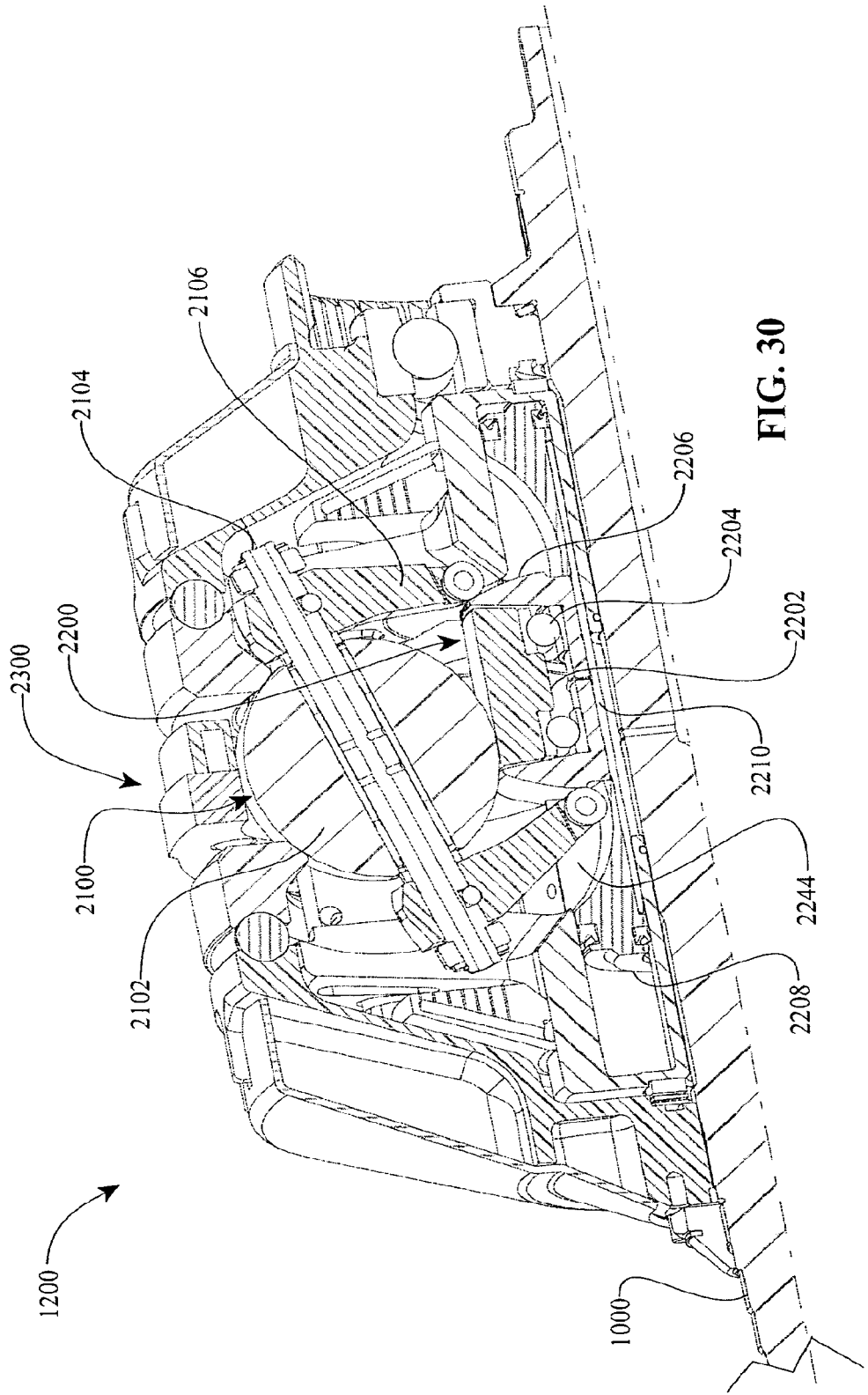
FIG. 30 is a partial cross-sectional view of certain components of the CVU of FIG. 4.
Figures 31, 32:
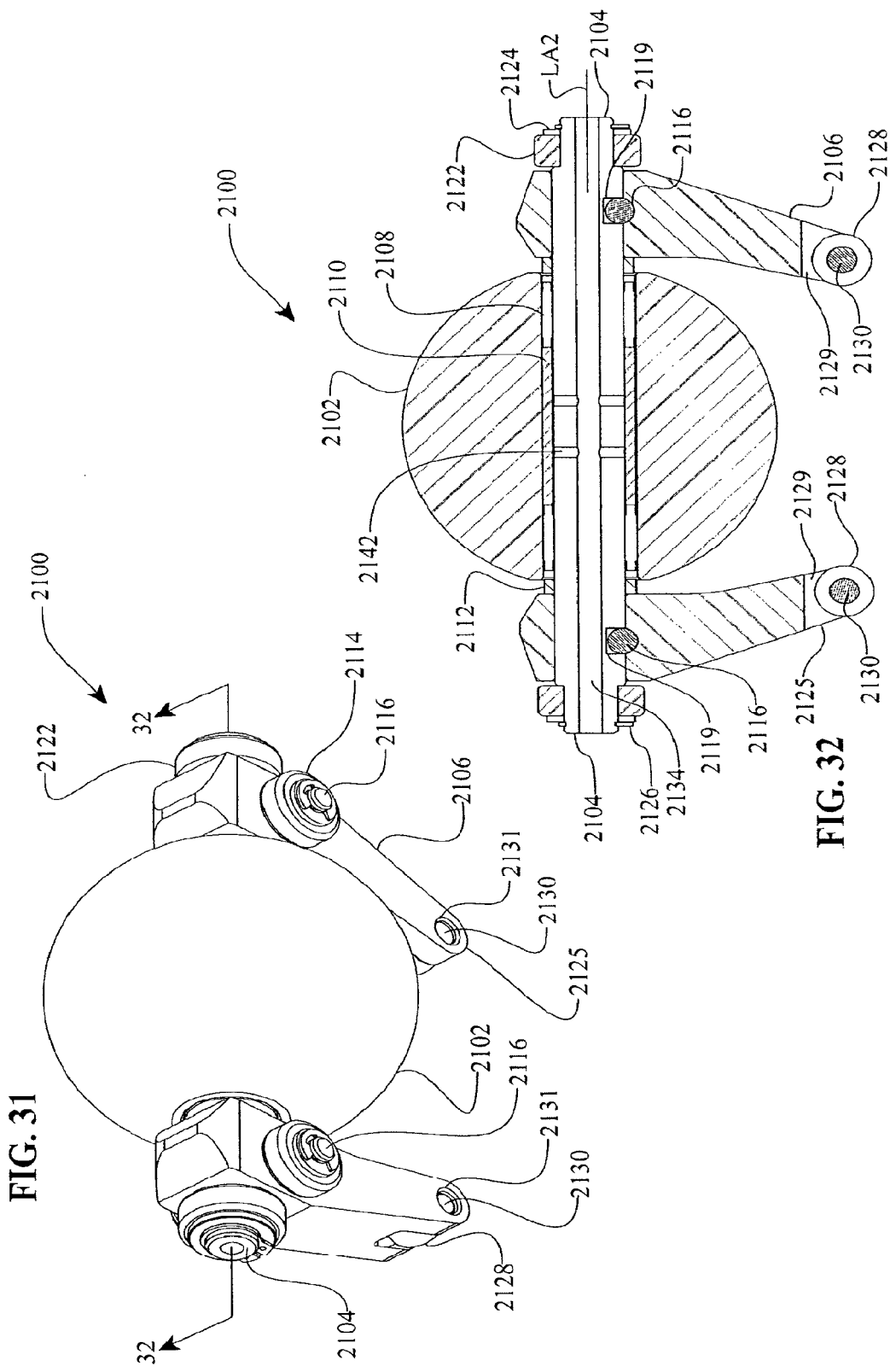
FIG. 31 is a perspective view of a planet-and-shift-lever subassembly that can be used with the CVU of FIG. 4.
FIG. 32 is a cross-sectional view of certain components of the planet-and-shift-lever subassembly of FIG. 31.
Figure 33:
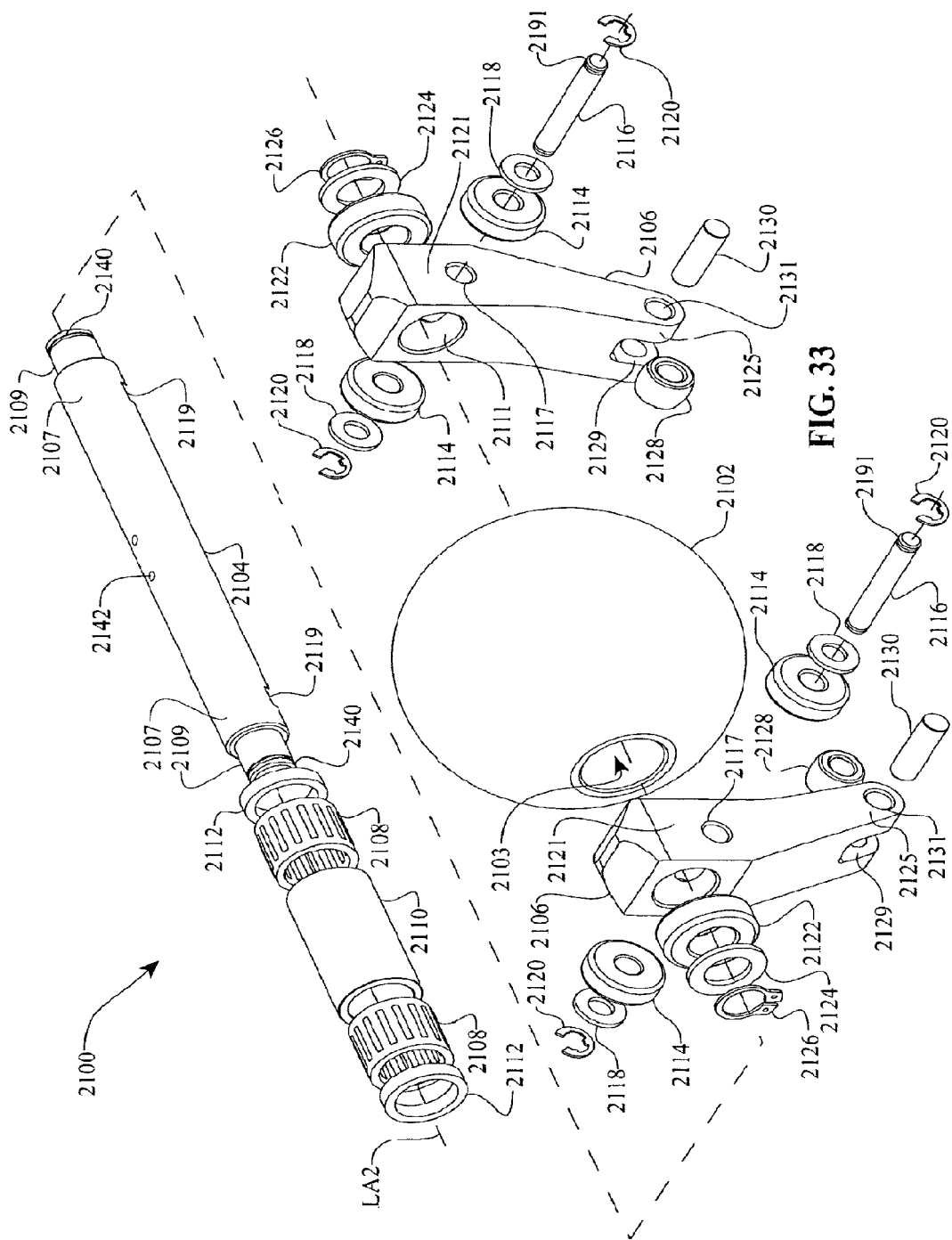
FIG. 33 is an exploded view of the planet-and-shift-lever-subassembly of FIG. 32.

As shown in FIGS. 30-33, in some embodiments, a shift guide roller axle 2116 can be engaged within a shift guide roller axle bore 2117 (FIG. 33) of each shift lever 2106 and within a corresponding axle capturing feature 2119 (FIGS. 32 and 33) of the planet axle 2104. In one embodiment, the shift guide roller axle bore 2117 intersects and is generally perpendicular to the planet axle bore 2111. The shift guide roller axle bore 2117 is adjacent to a first end portion 2121 of the shift lever 2106. Examples of the axle capturing feature 2119 include, but are not limited to, a feature generally characterized as a notch, a cut out, a channel, a seat, or the like. The shift guide roller axle 2116 and the corresponding axle capturing feature 2119 can be configured for limiting (for example, substantially precluding) radial displacement of the shift guide roller axle 2116 with respect to the engaged axle capturing feature 2119. Thus, such mating configuration of the shift guide roller axle 2116 and the corresponding axle capturing feature 2119 limits displacement of the shift lever 2106 along the longitudinal axis LA2 of the planet axle 2104 when the shift guide roller axle 2116 is mounted on the planet axle 2104 with the shift guide roller axle 2116 engaged within the shift guide roller axle bore 2117 and the corresponding axle capturing feature 2119 (FIGS. 32 and 33). Shift guide rollers 2114 can be mounted on opposing end portions of each shift guide roller axle 2116. Each shift guide roller axle 2116 can be secured in place by, for example, washers 2118 and clip rings 2120, which clip rings 2120 can be engaged within a groove 2191 of the shift guide roller axle 2116. In other embodiments, the shift guide roller axle 2116 can be secured by, for example, an interference fit, press fit, etc.

At a second end portion 2125 of each shift levers 2106, a roller receiving channel 2129 is provided. A shift cam roller 2128 is positioned in the roller receiving channel 2129. A shift cam roller axle 2130 extends through the shift cam roller 2128 and into engagement with axle receiving passages 2131 (FIG. 33). The shift cam roller axle 2130 can be secured in place through an interference fit with the respective axle receiving passages 2131. In other embodiments, securing means such as a clip and groove arrangement can be implemented.

Referring to FIGS. 32-35, in one embodiment, the planet axle 2104 can have a through central bore 2134 and transverse channels 2142 in a substantially cylindrical body 2132. The transverse channels 2142, among other things, enable fluid communication between the central bore 2134 and the space external of the planet axle 2104, thereby allowing for lubrication of the bearings 2108. The skew roller shoulders 2109, which are provided for receiving the skew rollers 2122, are defined by a reduction in diameter of the cylindrical body 2132. Grooves 2140 are provided in the skew roller shoulders 2109 for receiving the clip rings 2126 that constrain the skew rollers 2122 (FIG. 32). It is disclosed herein that, in other embodiments, the cylindrical body 2132 has a generally uniform diameter from over its entire length, such that reduction in diameter defining the skew roller shoulders 2109 is omitted and the skew rollers 2122 are corresponding configured for mating with uniform diameter of the cylindrical body 2132.

Figure 38:
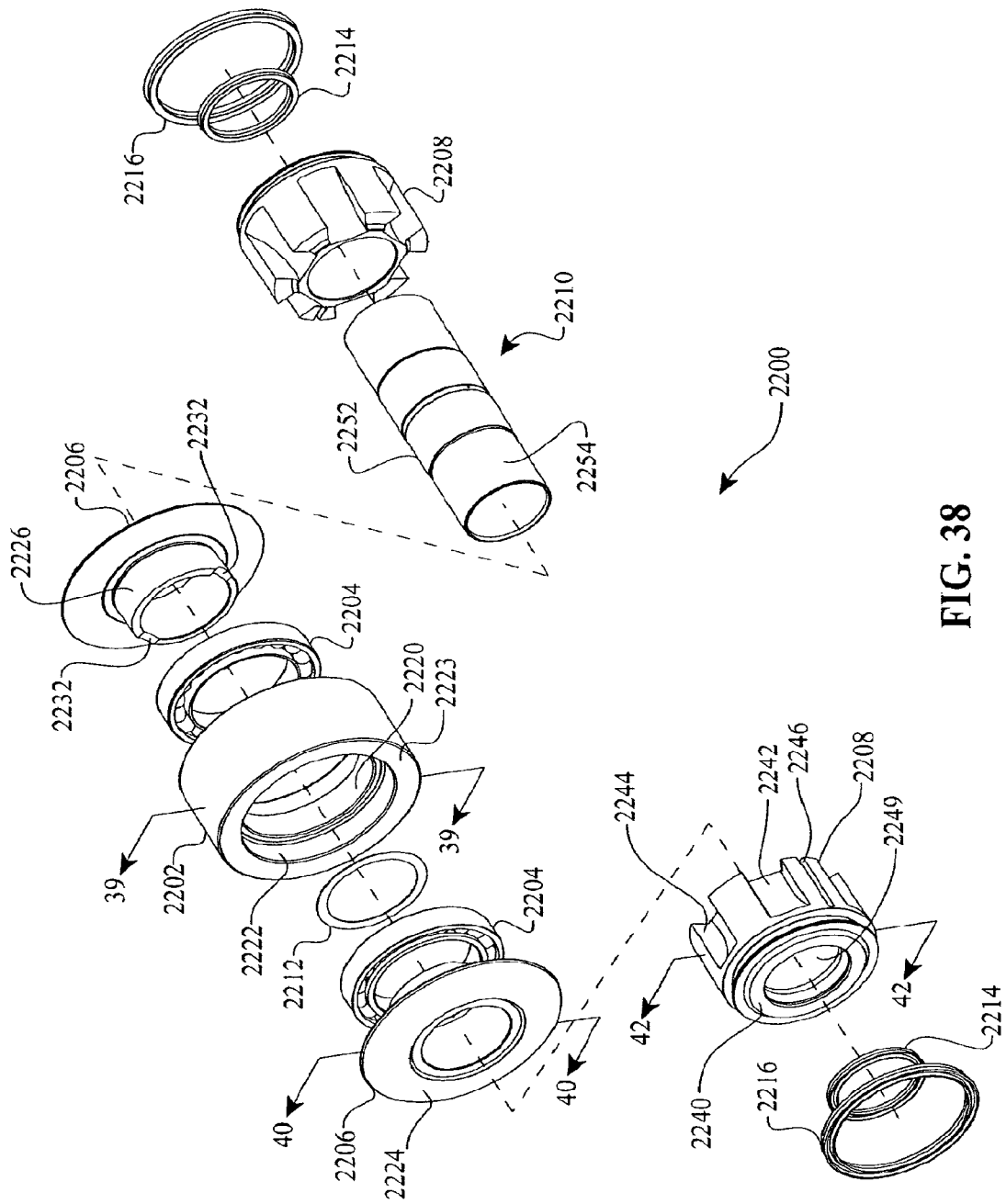
FIG. 38 is an explode view of certain components of the shift-cam-and-sun subassembly of FIG. 37.

Referring to FIGS. 30 and 37-43, in one embodiment, the shift-cam-and-sun subassembly 2200 can include sun 2202, bearings 2204, shift cams 2206, control pistons 2208, piston tube 2210, shim 2212, inner seals 2214, and outer seals 2216. As shown in FIGS. 30, 37 and 38, in some embodiments, the control pistons 2208 are coupled to the shift cams 2206 through the piston tube 2210. The control pistons 2208 and the shift cams 2206 can be mounted on the piston tube 2210 by, for example, a press-fit interface. The sun 2202 can be operationally coupled to the shift cams 2206 through the bearings 2204. The bearings 2204 can be configured to transfer axial and radial loads between the sun 2202 and the shift cams 2206. The sun 2202 and the shift cams 2206 can be configured to receive the bearings 2204. The inventive embodiments are not limited to bearings of a particular type. For example, an angular contact bearing is a suitable bearing type for the bearings 2204.

In one embodiment, the shim 2212 is positioned between the shift cams 2206 for setting a desired axial clearance between the sun 2202 and the shift cams 2206. Such clearance facilitates relative rotation between the shift cams 2206 and the sun 2202 without allowing contact between adjacent surfaces. In other embodiments, a plurality of shims can be used for achieving the desired clearance between the sun 2202 and the shift cams 2206. In still other embodiments, the shim 2212 can be omitted and the shift cams 2206 and/or sun 2202 can be manufactured in a manner to achieve suitable clearance between the sun 2202 and the shift cams 2206.

As shown in FIGS. 37-39, in one embodiment, the sun 2202 can have a body 2218 having a generally cylindrical outer diameter and internal recesses 2222 for receiving the bearings 2204. As shown, the sun 2202 can have a central shoulder 2220 that facilitates axial constraint of the bearings 2204, thereby limiting an insertion depth of each one of the bearings 2204 within the respective one of the recesses 2222. The inventive embodiments are not limited to particular ways for positioning the bearings 2204 with respect to the body 2218. For example, in other embodiments, a bearing 2204 has an outer race with an integral positioning flange that engages an exterior edge face 2223 of the sun 2202. In still other embodiments, the recesses 2222 have a tapered face and each one of the bearings 2204 has an outer race with a tapered exterior surface that engages the tapered face of the respective one of the recesses 2222. In still other embodiments, a discrete spacer can be used to facilitate proper spacing between the bearings 2204. In yet other embodiments, the outer races of the bearings 2204 can be formed integral with the sun 2202, and/or the inner races of the bearing 2204 can be formed integral with the shift cam extensions 2206.

As shown in FIGS. 37, 38, 40 and 40A, in one embodiment, the shift cam 2206 can include a shift cam profile 2224, which are adapted to guide the motion of the shift cam rollers 2128. One embodiment of data points defining a shape of the shift cam profile 2224 is shown in the table of FIG. 41. The X-dimension refers to an axial distance between a reference surface 2225 and the shift cam profile 2224. The Y-dimension refers to a radial distance between a longitudinal centerline axis of a central bore 2228 of the shift cam 2206 and the shift cam profile 2224. In some embodiments, the shift cam 2206 includes a shift cam extension 2226 having an exterior face 2227 configured to receive a respective one of the bearings 2204, and having an interior face 2229 configured to engage an exterior face 2252 of the piston tube 2210. Preferably, but not necessarily, the shift cam extension 2226 includes a lubrication flow enhancing feature 2232 such as, for example a cut-out or notch. In one embodiment, a rear face 2230 of the shift cam 2206 opposite to the shift cam profile 2224 is configured to be slightly angled relative to the reference surface 2225 for, among other things, promoting the flow of lubricant in the general area of the bearings 2204 and to maintain a desired clearance between the rear face 2230 of the shift cam 2206 and the exterior surfaces 2223 (FIG. 39) of the sun 2202.

As shown in FIGS. 37, 38 and 42, in one embodiment, a control piston 2208 has a central bore 2249 configured for engaging an exterior face 2254 (FIGS. 37 and 38) of the piston tube 2210. In some embodiments, the control piston 2208 has an internal recess 2250 and an external neck 2248 each configured for receiving and supporting the inner seal 2214 and the outer seal 2216, respectively. The control piston 2208 has a piston face 2240 on which control fluid pressure exerts force. In one embodiment, the control piston 2208 includes a number of recesses 2242, wherein a recess 2242 can be configured to provide clearance for the second end portion 2125 (FIG. 33) of a respective shift lever 2106. Side faces 2244 of the recess 2242 can be configured to substantially constrain movement of the second end portion 2125 of the shift lever 2106, thereby limiting rotation of the respective shift lever 2106 about the longitudinal axis LA1 of the variator 1200. In some embodiments, the contoured shape of the recess 2242 can be used as a detectable proximity surface that facilitates the determination of a relative position of the control piston 2208 with respect to the longitudinal axis LA1. An anti-rotation feature 2246 (for example, a groove, pin, seat slot, etc.) can be provided in an exterior face of the control piston 2208 for engaging a mating anti rotation feature of an adjacent variator component to limit rotation of the control piston 2208 about the longitudinal axis LA1.

Figure 43:
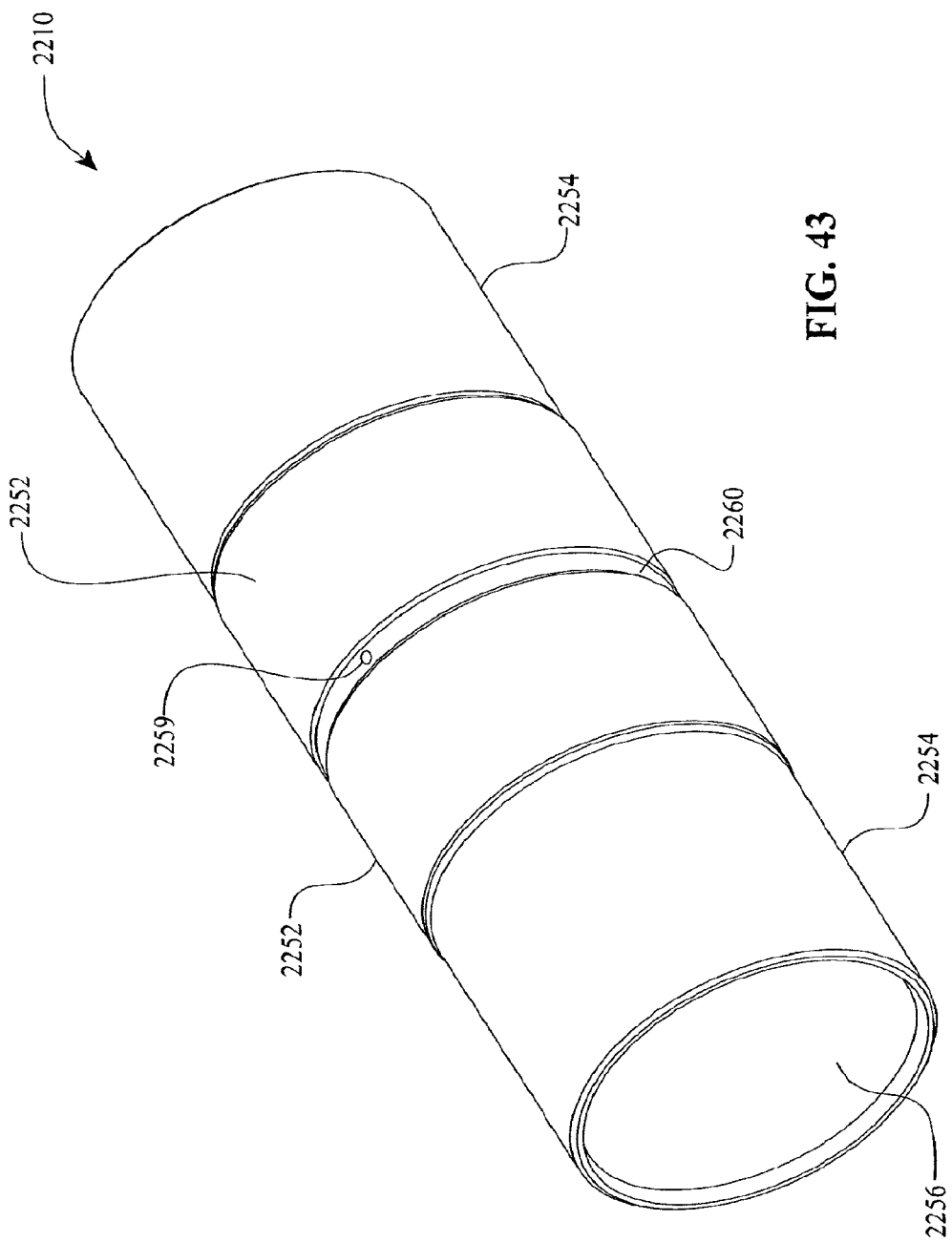
FIG. 43 is a perspective view of a piston tube that can be used with the CVU of FIG. 4.

As shown in FIGS. 38 and 43, in one embodiment, the piston tube 2210 can include exterior faces 2252, 2254 and a central bore 2256. The faces 2252 can be configured to receive the shift cams 2206, and the faces 2254 can be configured to receive the control pistons 2208. The outside diameter of the faces 2254 is nominally the same as each other, and the outside diameter of the faces 2252 are nominally the same as each other. In one embodiment, the outside diameter of the faces 2252 is slightly smaller than the outside diameter of the faces 2252, which precludes having to press fit the shift cams 2206 over the respective outer engagement surface 2252 prior to press fitting it onto the respective inner engagement surface 2254. As is discussed further below, the central bore 2256 can be configured to receive mating portions of a stator 4200A, 4200B (see FIG. 44) therein. Preferably, but not necessarily, the piston tube 2210 has a shim receiving recess 2260 (for example, a circumferential groove) for receiving a portion of the shim 2212 (FIG. 38) and has an orifice 2259 for allowing passage of lubricant. Preferably, but not necessarily, the orifice 2259 is exposed within the shim receiving recess 2260.

Figure 44:
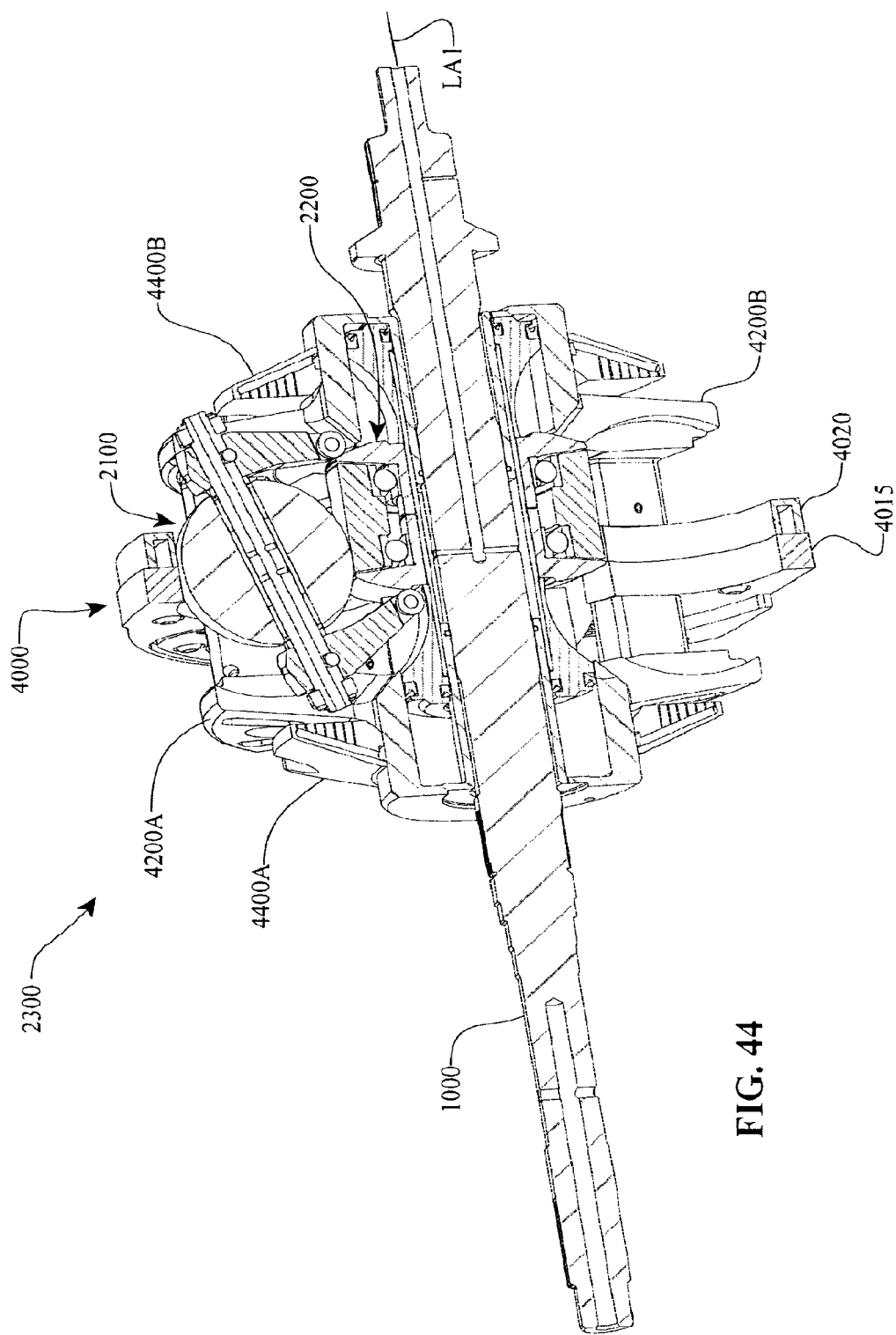
FIG. 44 is a partial, cross-sectional view of certain components of the CVU of FIG. 4.
Figure 51B:
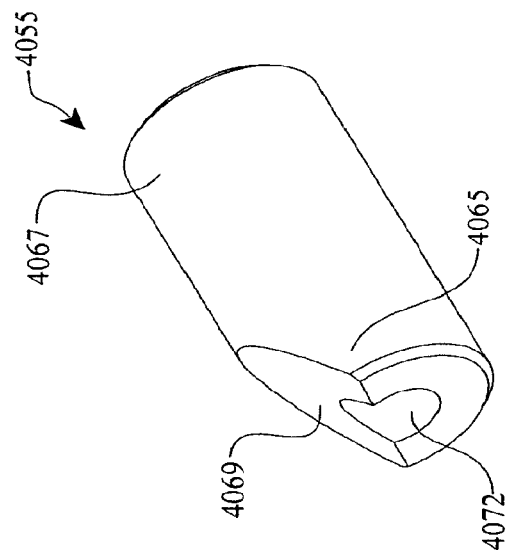
FIG. 51A and FIG. 51B are perspective views of a cam dowel that can be used with the CVU of FIG. 4 and the stator-manifold subassembly of FIG. 45.
Figure 51A:
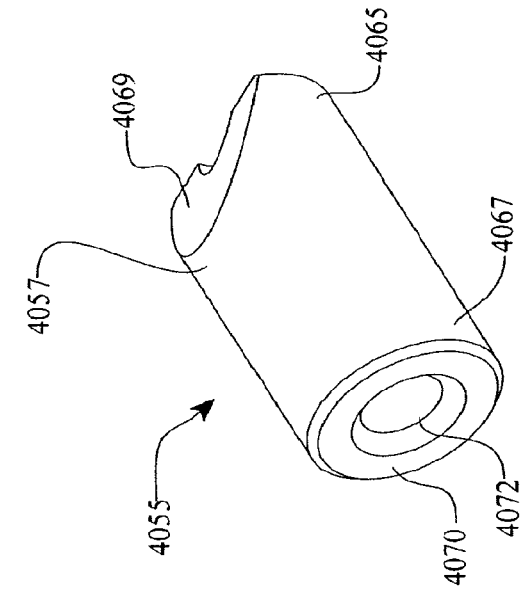

Referring now to FIGS. 44-46, in one embodiment, the stator-manifold subassembly 2300 includes a center manifold 4000, a first stator 4200A, a second stator 4200B, a first oil galley 4400A and a second oil galley 4400B. The first stator 4200A attaches to a first side face 4005 of the center manifold 4000, and the second stator 4200B attaches to a second side face 4010 of the center manifold 4000. The first oil galley 4400A mounts on the first stator 4200A, and the second oil galley 4400B mounts on the second stator 4200B. As used here, the terms "oil", "lubricant", "lubricating fluid," and "traction fluid" are generally interchangeable. Where appropriate, it will be clear by the context that the fluid, or condition, refers to lubrication rather than traction.

In one embodiment, the center manifold 4000 is configured for, among other things, facilitating the stator-manifold subassembly 2300 being fixedly mounted to the transmission housing 1800 of the transmission 600 (FIG. 3A), supporting the stators 4200A, 4200B, distributing control fluid and traction fluid to the variator 1200 (FIGS. 3A and 44), and housing and supporting various sensors. Examples of such sensors include, but are not limited to, sensors for sensing lubricant temperature, pressure, and viscosity. In some embodiments, a sensor is provided for sensing the position of the shift lever subassembly 2100 relative to a surface on the stator 4200.

The stators 4200A, 4200B can be configured for, among other things, supporting the planet-and-shift-lever subassemblies 2100, supporting the shift-cam-and-sun subassembly 2200, and communicating control and traction fluids. As discussed below, the planet-and-shift-lever subassemblies 2100 are each movably supported jointly by the stators 4200A, 4200B and the shift-cam-and-sun subassembly 2200. The shift-cam-and-sun subassembly 2200 cooperates with the stators 4200A, 4200B for facilitating control of movement of the planet-and-shift-lever subassemblies 2100. The oil galleys 4400A, 4400B are configured for spraying (that is, delivering) lubricant onto portions of the planet-and-shift-lever subassemblies 2100, the shift-cam-and-sun subassembly 2200, and other components of the variator 1200.

Referring now to FIGS. 44-53, the center manifold 4000 includes a base plate 4015 and a cover plate 4020. The base plate 4015 includes a first side face 4016A and a second side face 4016B, and the cover plate 4020 includes a first side face 4021A and a second side face 4021B. In one embodiment, the plates 4015, 4020 are generally circularly shaped when viewed in a direction perpendicular to a respective side face. In some embodiments, the plates 4015, 4020 each has a cut-out pattern 4025 configured to generally surround the array of planet-and-shift-lever subassemblies 2100 (FIG. 44). The plates 4015, 4020 attach to each other in a side-by-side configuration as shown in FIGS. 44-48 with the cut-out pattern of the base plate 4015 being aligned with the cut-out pattern of the cover plate 4020. The second side face 4016B of the base plate 4015 abuts the first side face 4021A of the cover plate 4020 when the plates 4015, 4020 are placed in the side-by-side configuration.

A first sensor cable groove 4027 and a second sensor cable groove 4029 can be provided in the first side face 4016A of the base plate 4015. Example sensors corresponding to such sensor cables include, but are not limited to, a gamma sensor, a fluid temperature sensor, and a speed measuring device sensor. The base plate 4015 includes bolt holes 4030 (FIGS. 47, 49 and 50), and the cover plate 4020 includes bolt holes 4031 (FIGS. 48, 52 and 53), which bolt holes 4030, 4031 are configured to receive bolts (not shown) for securing the plates 4015, 4020 in the side-by-side configuration. As shown, in one embodiment, the bolt holes 4030 are counterbored, and the bolt holes 4031 include threads for having a threaded portion of the respective bolt engaged therewith. In other embodiments, the bolt holes 4030, 4031 can have different configurations that still provide for securing the plates 4015, 4020 in the side-by-side configuration.

As shown in FIGS. 47-49, 52 and 53, the plates 4015, 4020 preferably, but not necessarily, each include dowel pin holes 4035. The dowel pin holes 4035 of the base plate 4015 and the dowel pin holes 4035 of the cover plate 4020 are located in the same relative positions with respect to the cut-out pattern 4025. The dowel pin holes 4035 can be located radially in line with lubricant ports 4089, 4087 of the respective plate 4015, 4020. Thus, engagement of dowel pins (not shown) within the dowel pin holes 4035 facilitates and simplifies proper alignment of the base plate 4015 with the cover plate 4020.

In one embodiment, the base plate 4015 includes a footing 4040 (see FIGS. 45-46 and 49-50) configured for cooperating with the transmission housing 1800 (FIG. 3A) to provide torque reaction at the footing 4040, thereby limiting movement of the base plate 4015 with respect to the transmission housing 1800. Bolt holes 4043 receive bolts (not shown) for fastening the base plate 4015 to the transmission housing 1800. In some embodiments, the base plate 4015 includes locating pads 4045 that engage a mating structure (for example, a conformingly shaped recess, protruding ridge, etc.) of the transmission housing 1800. The locating pads 4045 facilitate locating the base plate 4015 in the transmission housing 1800.

As shown in FIGS. 45, 47, and 49, in some embodiments, opposing ones of the locating pads 4045 include a cam wedge base 4050 that cooperates with a corresponding cam dowel 4055 (see FIGS. 45 and 51A-51B) for fixedly engaging (for example, pressing) the base plate 4015 and/or the cover plate 4020 against one or more mating features of the transmission housing 1800. The cam wedge base 4050 is a generally flat surface that is angled with respect to the first side face 4016A of the base plate 4015. Through such engagement, the center manifold 4000 can be positioned and, additionally, torque reaction can be provided adjacent one or more of the locating pads 4045 for limiting movement of the base plate 4015 with respect to the transmission housing 1800.

As best shown in FIGS. 47-48 and 51A-51B, a cam dowel 4055 includes a generally cylindrical shaped cam body 4057 having a first end portion 4065 and a second end portion 4067. The first end portion 4065 includes a cam wedge 4069 and the second end portion 4067 has a generally flat face 4070 (that is, extending generally perpendicular to a longitudinal reference axis of the cam body 4057). The cam wedge 4069 includes a face that is skewed with respect to the longitudinal reference axis of the cam body 4057. Preferably, but not necessarily, the face of the cam wedge 4069 is generally flat. Preferably, but not necessarily, a threaded bore 4072 extends from the flat face 4070 at least partially toward the second end portion 4067. In use, for example, the cam dowel 4055 resides within a threaded passage in a wall of the transmission housing 1800, with the cam wedge 4069 extending from within the threaded passage into engagement with the cam wedge base 4050. The cam dowel 4055 can be forced against the cam wedge base 4050 using, for example, a setscrew engaged within the threaded passage within the wall of the transmission housing 1800. Through such forced engagement between the tapered faces of the cam wedge 4069 and the cam wedge base 4050, the center manifold 4000 bears against a mating feature of the transmission housing 1800, thereby limiting movement of the center manifold 4000 with respect to the transmission housing 1800. The threaded bore 4072 provides for engagement with a threaded extractor device for facilitating removal of the cam dowel 4055 from a passage of the transmission housing 1800.

In one embodiment, the plates 4015, 4020 are configured for routing lubricant and control fluid to the stators 4200A, 4200B. It is disclosed herein that the lubricant and the control fluid can be the same fluid used for different purposes (that is, lubricant and control). It is further disclosed herein that the lubricant and the control fluid can be the same as the transmission fluid discussed above in reference to FIG. 3A, which is advantageous in that it obviates the need to segregate such fluids.

Referring to FIGS. 47-53, in some embodiments, the base plate 4015 can include lubricant flow passages (not shown) that extend between a respective lubricant inlet port 4076 and a respective lubricant outlet port 4084, thereby facilitating lubricant flow between corresponding lubricant inlet ports 4076 and lubricant outlet ports 4084. In one embodiment, the lubricant inlet ports 4076 receive lubricant from a lubrication fluid pump apparatus (not shown) of the transmission 600 or a standalone lubrication fluid pump apparatus. In some embodiments, the base plate 4015 can include a first control fluid passage (not shown) that extends between a first control fluid inlet port 4078 and a first control fluid outlet port 4091 to allow flow of control fluid between the first control fluid inlet port 4078 and the first control fluid outlet port 4091. The base plate 4015 can also include a second control flow passage (not shown) that extends between a second control fluid inlet port 4080 and a second control fluid outlet port 4092 to allow flow of control fluid between the second control fluid inlet port 4080 and the second control fluid outlet port 4092.

In one embodiment, each lubricant inlet port 4076, the first control fluid inlet port 4078, and the second control fluid inlet port 4080 are located in a bottom edge face 4082 of the footing 4040, as shown in FIG. 50. The control fluid outlet ports 4091, 4092 are in fluid communication with corresponding control fluid passages (not shown) that extend between the side faces 4016A, 4016B of the base plate 4015. A first control fluid port 4093 of the cover plate 4020 (FIGS. 52 and 53) aligns with the first control fluid outlet port 4091 of the base plate 4015, and a second fluid control port 4094 of the cover plate 4020 aligns with the second control fluid outlet port 4092 of the base plate 4015 when the plates 4015, 4020 are positioned in the side-by-side configuration.

In one embodiment, the center manifold 4000 can be configured so that lubricant flows from the lubricant inlet ports 4076 to the respective lubricant outlet ports 4084 and then into a lubricant distribution channel 4085 (FIG. 52) in the first side face 4021A of the cover plate 4020. The lubricant distribution channel 4085 extends at least partially around a perimeter region of the cover plate 4020. Branch lubricant channels 4086 extend between the lubricant distribution channel 4085 and lubricant ports 4087 and/or between the lubricant distribution channel 4085 and a respective lubricant spray port 4088. The lubricant ports 4087 communicate with fluid passages (not shown) that extend between the side faces 4021A, 4021B of the cover plate 4020. The lubricant ports 4087 align with lubricant ports 4089 when the plates 4015, 4020 are positioned in the side-by-side configuration, thereby enabling the first stator 4200A to receive lubricant from the lubricant ports 4089, and the second stator 4200B to receive lubricant from the lubricant ports 4087.

A spray of lubricant can be provided from the lubricant spray ports 4088 of the cover plate 4020, which can be directed at, for example, the output traction interface TI2 (FIG. 44) between the output traction ring 2010B and the planets 2102 (one shown in FIG. 44). Similarly, the base plate 4015 can include lubricant spray ports 4090 (see FIG. 49) that each aligns with the lubricant distribution channel 4085 and/or a respective one of the branch lubricant channels 4086, thereby facilitating the provision of a spray of lubricant from the lubricant spray ports 4090, which can be directed at, for example, the input traction interface TI1 (FIG. 44) between the input traction ring 2010A and the planets 2102 (one shown in FIG. 44).

In one embodiment, the control fluid passages (not shown) extending between the control fluid inlet ports 4078, 4080 and the respective control fluid outlet ports 4091, 4092 allow independent and selective communication of control fluid with a control fluid pump apparatus (not shown) of the transmission 600 or stand alone apparatus. Through such independent and selective communication, a pressure differential between the control fluid passages can be produced. As discussed further below, selective control of this pressure differential facilitates selective adjustment of a position of the shift-cam-and-sun subassembly 2200 (FIG. 44) with respect to the longitudinal axis LA1 of the main shaft 1000.

As shown in FIGS. 45 and 46, the stators 4200A, 4200B are preferably, but not necessarily, essentially identical in construction and will both sometimes be referred to herein generically as the stator 4200. Referring to FIGS. 45, 46 and 54-59, in one embodiment, the stator 4200 can include a number of shift lever guide flanges 4202, a plurality of stator extensions 4204, and a control piston receiver 4206. In one embodiment, the shift lever guide flanges 4202 attach to the control piston receiver 4206 in a radially extending and uniformly angularly spaced manner. A planet axle passage 4208 extends between each adjacent pair of shift lever guide flanges 4202. The stator extensions 4204 extend axially from a first side face 4210 of each shift lever guide flange 4202. The control piston receiver 4206 extends axially from a second side face 4212 of each shift lever guide flange 4202. Preferably, but not necessarily, the shift lever guide flanges 4202, the stator extensions 4204, the control piston receiver 4206A, and the planet axle passages 4208 are uniformly spaced and angularly arranged around a longitudinal axis LA3 of the control piston receiver 4206 whereby the stator 4200 is generally circularly shaped and symmetrical with respect to the longitudinal axis LA3. A center manifold engagement face 4213 (FIG. 55) of each one of the stator extensions 4204 is substantially flat and extends substantially perpendicular to the longitudinal axis LA3.

In some embodiments, the control piston receiver 4206 includes a receiver neck 4214, a receiver end face 4216, and a control piston engaging member 4218. The control piston engaging member 4218 is generally a cylindrically shaped tubular body having an exterior surface 4222 and an interior surface 4224. The interior surface 4224 defines a central bore 4225 of the control piston engaging member 4216, which receives the main shaft 1000. A circumferential seal groove 4227 (FIGS. 46 and 56-58) can be provided in the interior surface 4224 for receiving a seal (not shown) that engages a mating surface of the main shaft 1000. A control piston receiving chamber 4220 is defined between the receiver neck 4214, the receiver end face 4216, and the control piston engaging member 4218. The exterior surface 4222 of the control piston engaging member 4218 and an interior surface 4226 of the receiver neck 4214 extend substantially parallel to each other and serve as control piston support surfaces. The control piston receiving chamber 4220 is configured for receiving one of the control pistons 2208 (FIG. 36-38). The exterior surface 4222 of the control piston engaging member 4218 is configured (for example, has a sufficient smoothness and straightness) for forming a sealed interface with the inner seal 2214 of the control piston 2208, and the interior surface 4226 of the receiver neck 4214 is configured for forming a sealed interface with the outer seal 2216 of the control piston 2208. A longitudinal axis of the control piston engaging member 4218 extends coincidentally with the longitudinal axis LA3 of the control piston receiver 4206. The surfaces 4222, 4226 are concentric about the longitudinal axis LA3.

As best shown in FIGS. 54 and 55, a skew roller reaction surface 4228 and a shift guide roller reaction surface 4230 are provided at opposing edges of each shift lever guide flange 4202. The skew roller reaction surface 4228 is substantially flat and the shift guide roller reaction surface 4230 is contoured. Examples of such contour include, but are not limited to, semi-circular, parabolic, elliptical and angularly tapered. In one embodiment, the contour is circular and the center of its radius of curvature is coincident with the center of tilt of the planet 2102. Adjacent skew roller reaction surfaces 4228 of adjacent shift lever guide flanges 4202 extend substantially parallel to each other and adjacent shift guide roller reaction surfaces 4230 of adjacent shift lever guide flanges 4202 are substantially aligned.

As shown in FIGS. 54-57, in one embodiment, a control fluid communicating bolt hole 4232 can be provided in one of the stator extensions 4204. In addition to serving as a bolt hole for receiving a bolt that secures the stator 4200 to the center manifold 4000 (that is, a stator securing bolt), the control fluid communicating bolt hole 4232 can be configured to serve as a channel for fluid communication with the control piston receiving chamber 4220. In some embodiments, a lubricant communicating bolt hole 4234 can be provided in a number of other stator extensions 4204. In addition to serving as a bolt hole for receiving a bolt that secures the stator 4200 to the center manifold 4000, the lubricant communicating bolt hole 4234 can be configured to serve as a channel for providing lubricant to a planet/shift lever lubricant jet 4236 in the stator extension 4204, to an oil galley feeding port 4238 in the receiver neck 4214, and/or an output load cam assembly bearing lubricant jet 4240 in the receiver end face 4216.

As best shown in FIG. 56, in one embodiment, the control fluid communicating bolt hole 4232 has a stepped profile such that a first portion of the control fluid communicating bolt hole 4232, which is exposed at the second side face 4212 of the respective shift lever guide flange 4202, has a relatively close clearance fit with the stator securing bolt and a second portion of the control fluid communicating bolt hole 4232, which is exposed at the center manifold engagement face 4213 of the stator extension 4204, has an oversize clearance fit with the stator securing bolt. In this manner, the flow of control fluid past the stator securing bolt in the second portion of the control fluid communicating bolt hole 4232 is essentially unrestricted. Drill holes 4242 that extend between the second portion of the control fluid communicating bolt hole 4232 and the control piston receiving chamber 4220 in an intersecting manner form a control fluid channel between the control fluid communicating bolt hole 4232 and the control piston receiving chamber 4220. The openings of the drill holes 4242 exposed at the extension 4204, exterior surface of the receiver neck 4214, and at the exterior surface of the receiver end face 4216 are plugged to prevent control fluid discharge therefrom.

In some embodiments, a lubricant communicating bolt hole 4234 has a stepped profile such that a first portion of the lubricant communicating bolt hole 4234, which is exposed at the second side face 4212 of the respective shift lever guide flange 4202, has a relatively close clearance fit with the stator securing bolt and a second portion of the lubricant communicating bolt hole 4234, which is exposed at the center manifold engagement face 4213 of the stator extension 4204, has an oversize clearance fit with the stator securing bolt. In this manner, the lubricant flow past the stator securing bolt in the second portion of the lubricant communicating bolt hole 4234 is essentially unrestricted. Drill holes 4244 that extend in an intersecting manner between the second portion of the lubricant communicating bolt hole 4234 and the oil galley feeding port 4238, and/or the bearing lubricant jet 4240, form a lubricant channel between the lubricant communicating bolt hole 4234 and such ports and/or jets. The opening of the drill holes 4244 exposed at an exterior surface of the stator extensions 4204 can be plugged to prevent unintentional and/or undesirable lubricant discharge therefrom. For example, if the stator 4200 does not provide the output load cam bearing assembly 2022B (FIG. 20) with a dedicated supply of lubricant, the drill hole forming the output load cam assembly bearing lubricant jet 4240 is plugged.

In one embodiment, a drill hole 4246 (FIGS. 55, 57 and 59) extending through one of the shift lever guide flanges 4202 and the receiver neck 4214 forms a passage that can be used for routing wires and/or housing a sensor (not shown) such as, for example, a proximity sensor which cooperates with a contoured recess 2242 of the control piston 2208 for allowing a determination of the axial position of the control piston 2208. The drill hole 4246 can be drilled from the outer diameter of the shift lever guide flange 4202 through the receiver neck 4214 into the control piston receiving chamber 4220. Similarly, a set screw hole 4248 can be formed in the receiver neck 4214 (for example, through one of the shift lever guide flanges 4202) for receiving an anti-rotation member (not shown) such as, for example, a set screw. The anti-rotation member cooperates with the groove 2246 (FIG. 38) of a respective control piston 2208 for precluding rotation of the respective control piston 2208 within the control piston receiving chamber 4220.

As shown in FIG. 55, the stator 4200 can include dowel pin holes 4250 for facilitating proper positioning of the stator 4200 with the center manifold 4000. In one embodiment, the dowel pin holes 4250 are located radially in line with the respective lubricant communicating bolt hole 4234 of the stator 4200. The radial position of each dowel pin hole 4250 is substantially the same as the radial position of each dowel pin hole 4305 of the center manifold 4000. Accordingly, dowel pins (not shown) of suitable length engaged with the dowel pin holes 4035 are coupled with corresponding dowel pin holes 4250, thereby facilitating proper alignment of the stator 4200 with the center manifold 4000. Furthermore, such a dowel pin hole arrangement enables positioning of the stator 4200 for aligning the control fluid communicating bolt hole 4232 of the stator 4200 with either one of the control fluid ports 4091, 4092 of the base plate 4015 or with either one of the control fluid ports 4093, 4094 of the cover plate 4020, depending on which one of the plates 4015, 4020 the stator 4200 is engaged with. In this manner, for example, the first stator 4200A aligns with the first control fluid port 4091 of the base plate 4015, and the second stator 4200B aligns with the second control fluid port 4093 of the cover plate 4020, thereby allowing for communication of control fluid with the stators 4200A, 4200B.

Referring back to FIGS. 45-47 and 51-54, in one embodiment, the first stator 4200A engages the first side face 4005 of the center manifold 4000 (FIGS. 45 and 46), and the second stator 4200B engages the second side face 4010 of the center manifold 4000. More specifically, the center manifold engagement face 4213 (FIG. 55) of each stator extension 4204 of the first stator 4200A engages the first side face 4016A (FIGS. 46 and 49) of the base plate 4015, and the center manifold engagement face 4213 of each stator extension 4204 of the second stator 4200B engages the second side face 4021B (FIGS. 48 and 53) of the cover plate 4020. The first stator 4200A is placed such that the control fluid communicating bolt hole 4232 (FIGS. 54 and 55) of the first stator 4200A aligns with the first control fluid passage 4091 (FIG. 47) of the base plate 4015 and the lubricant distribution channel 4085 of the cover plate 4020 aligns with the lubricant port 4087 of the base plate 4015. In some embodiments, the second stator 4200B can be placed such that control fluid communicating bolt hole 4232 (FIGS. 53 and 54) of the second stator 4200B aligns with the second control fluid port 4094 (FIG. 47) of the cover plate 4020 and the lubricant communicating ports 4234 of the second stator 4200B align with the lubricant ports 4087 of the cover plate 4020. In this manner, control fluid can be communicated to and from the control piston receiving chamber 4220 of the first stator 4200A independently of control fluid communicated to and from the control piston receiving chamber 4220 of the second stator 4200B, and lubricant can be delivered to various ports and jets of the stators 4200A, 4200B and oil galleys 4400A, 4400B independently of the control fluid.

As shown in FIGS. 44-46, the oil galleys 4400A, 4400B are preferably, but not necessarily, essentially identical in construction and will both sometimes be referred to herein generically as the oil galley 4400. Referring now to FIGS. 60-62, in one embodiment, the oil galley 4400 is generally circular and includes a central bore 4402, an annular lubricant channel 4404, a number of lubricant jet channels 4406, and lubricant flow passages 4408 (for example, a drill hole). The lubricant jet ports 4406 can be arranged in groupings (for example, linear, cluster, etc.) that are preferably, but not necessarily, spaced (example, uniformly) around the central bore 4402. Each group of lubricant jet ports 4406 can be in fluid communication with the annular lubricant channel 4404 by the respective lubricant flow passage 4408. The oil galley 4400 includes stator bolt clearance cutouts 4410 configured to allow access to bolts engaged within the bolt holes 4232, 4234 of the stators 4200 (FIGS. 45 and 46) that secure the stators 4200 to the center manifold 2300.

In some embodiments, the central bore 4402 can be configured to engage the exterior surface of the receiver neck 4214 (FIGS. 45 and 46) of a respective stator 4200 by, for example, a press fit interface. The oil galley 4400 can be positioned on the receiver neck 4214 such that the annular lubricant channel 4404 aligns with the oil galley feeding port 4238 (FIG. 56) of the stator 4200, thereby facilitating supplying lubricant from the stator 4200 to the oil galley 4400. In one embodiment, the oil galley 4400 is angularly oriented such that each one of the groupings of the lubrication jet channels 4406 is aligned with a respective planet axle passage 4208 (FIGS. 45 and 54) of the respective stator 4200. Accordingly, when lubricant is supplied to the oil galley 4400 from the respective stator 4200A, 4200B a supply of lubricant is sprayed into the respective planet axle passage 4208 for lubricating components of an associated planet-and-shift-lever subassembly 2100.

Referring back to FIGS. 45 and 46, in one embodiment, the stators 4200A, 4200B and the center manifold 4000 are securely coupled in aligned orientation using a fastening structure such as, for example, a bolt and nut (not shown). For example, an elongated portion of a threaded fastening structure (such as the shank of the bolt) extends through the bolt holes 4232, 4234 of the stators 4200A, 4200B and the lubricant ports 4087, 4089 of the center manifold plates 4015, 4020. The threaded fastening structure is tightened such that end portions of the threaded fastening structure (for example, the head of the bolt) apply a compressive force on the stators 4200 and the center manifold 4000 to form a substantially rigid support structure for components and subassemblies to be mounted thereon. In some embodiments, sealing washers are used under the bolt head and nut to seal the lubrication and control fluid passages.

Figure 63:
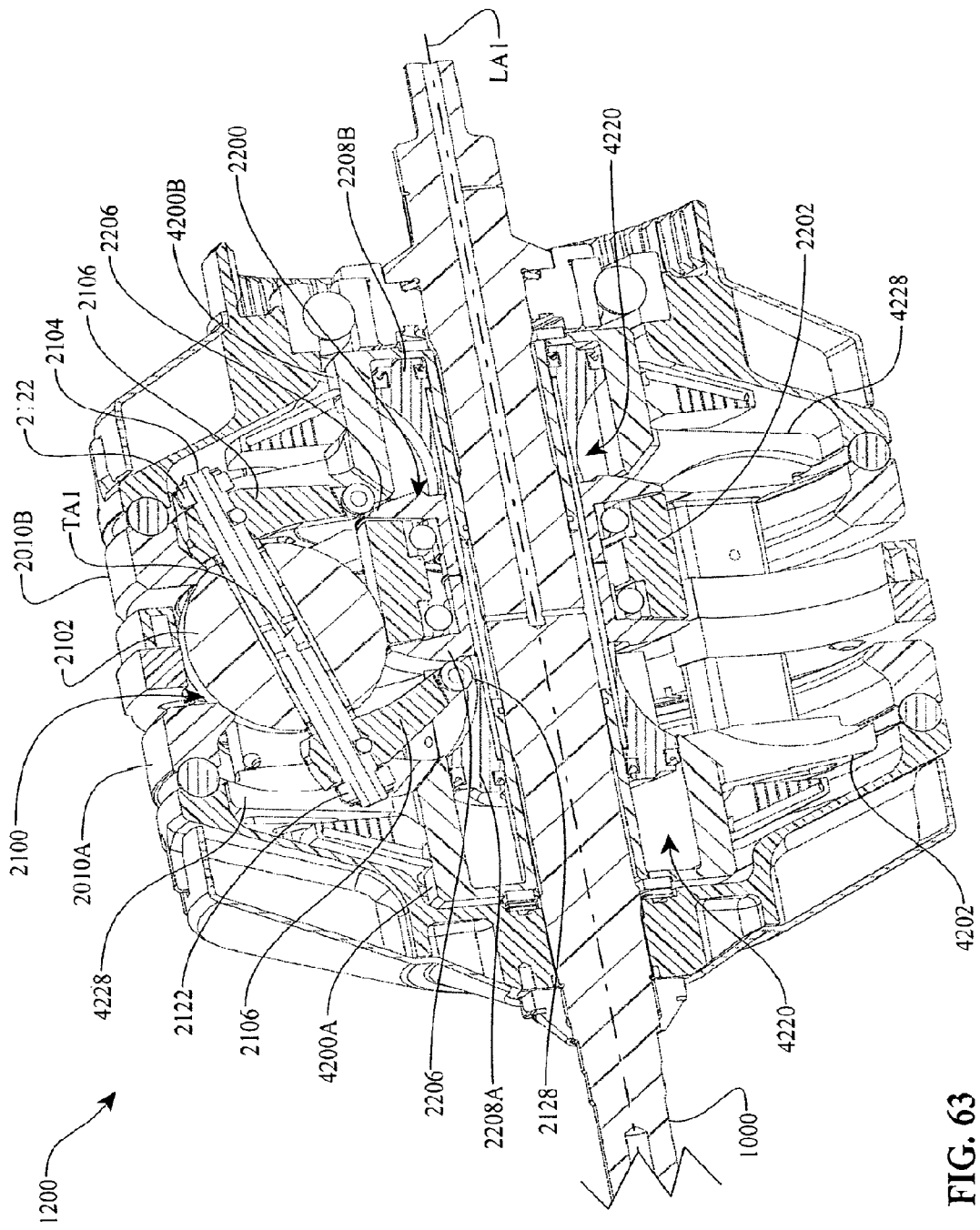
FIG. 63 is a partial, cross-sectional view of certain components of the CVU of FIG. 4.
Figure 64:
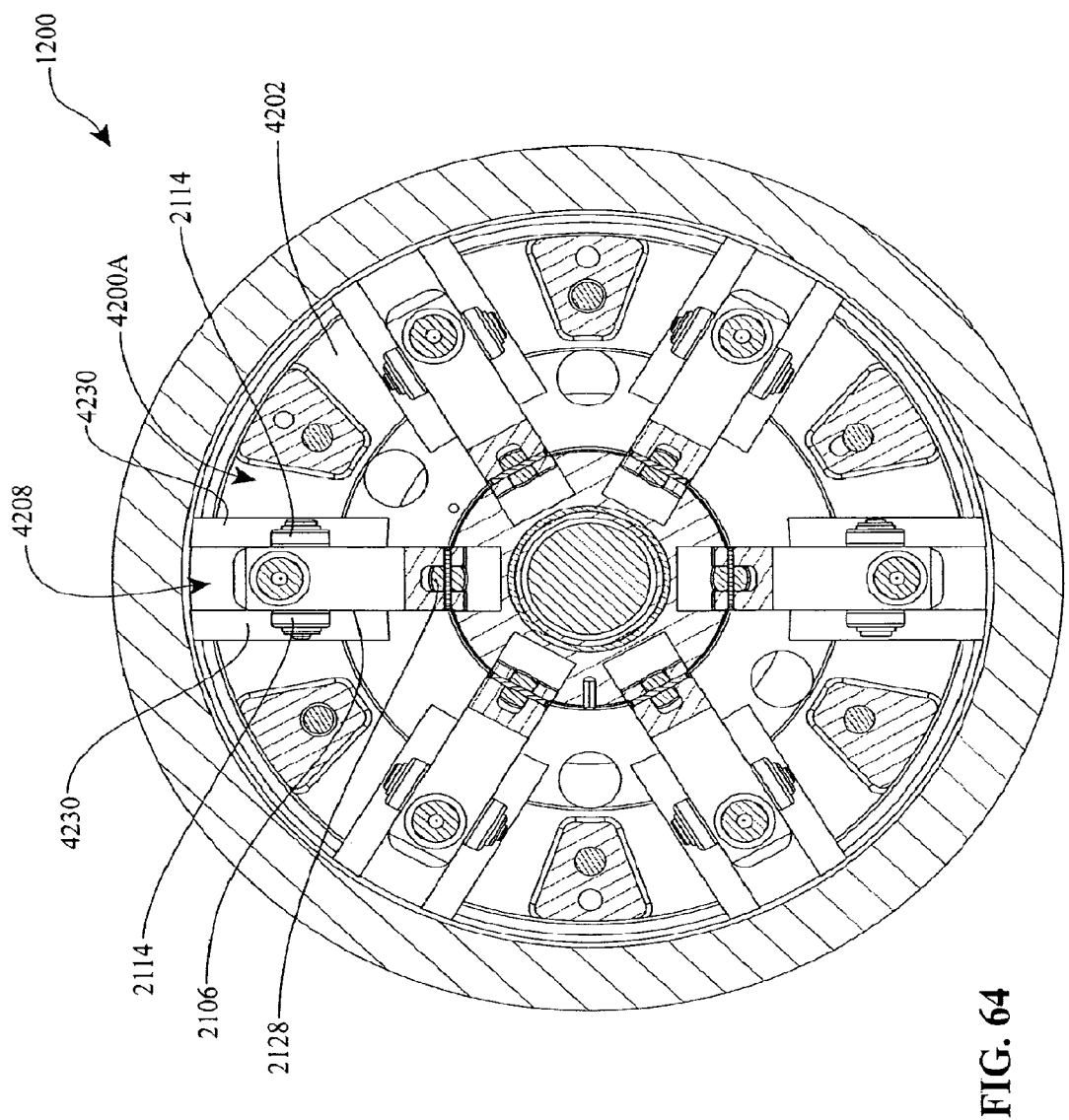
FIG. 64 is a yet another cross-sectional view of certain components of the CVU of FIG. 4.

Passing to FIGS. 63 and 64 now, certain structure and functionality of the variator 1200 will be discussed. In some embodiments, a first control piston 2208A (FIG. 63) of the shift-cam-and-sun subassembly 2200 is slidably mounted within the control piston receiving chamber 4220 (see FIGS. 56 and 57) of the first stator 4200A, and a second control piston 2208B (FIG. 63) of the shift-cam-and-sun subassembly 2200 is slidably mounted within the control piston receiving chamber 4220 the second stator 4200B. Through the selective control of control fluid volume within the control piston receiving chambers 4220, the shift-cam-and-sun subassembly 2200 can be selectively and controllably displaced along the longitudinal axis LA1 of the main shaft 1000. As discussed above, in one embodiment, the control pistons 2208A, 2208B are constrained from rotation about the longitudinal axis LA1.

Simultaneous engagement of each planet 2102 (one shown in FIG. 63) with the input traction ring 2010A, the output traction ring 2010B, and the sun 2202 constrains axially and radially the planet 2102 of each planet-and-shift-lever subassembly 2100. The planet 2102 is rotatably mounted on the respective planet axle 2104. The skew roller 2122 (FIG. 63) of a planet-and-shift-lever subassembly 2100 engages skew roller reaction surfaces 4228 of adjacent shift lever guide flanges 4202 positioned within a respective planet axle passage 4208, thereby substantially precluding rotation of the respective planet-and-shift-lever subassembly 2100 about any radial axis extending perpendicular to the longitudinal axis LA1. The two shift guide rollers 2114 of each shift lever 2106 engage respective shift guide roller reaction surfaces 4230. Accordingly, a first one of the shift guide rollers 2114 engages a shift guide roller reaction surface 4230 on a first side of the respective planet axle passage 4208, and a second one of the shift guide rollers 2114 engages a shift guide roller reaction surface 4230 on a second side of the respective planet axle passage 4208. The semi-circular shape of the shift guide roller reaction surfaces 4230 and the corresponding engagement by the shift guide rollers 2114 serves to, among other things, substantially preclude axial displacement of the respective planet-and-shift-lever subassemblies 2100 with respect to relative to the longitudinal axis LA1, as well as to reduce the force needed to effect a tilting of the planet axles 2104. It should be noted that the shift guide roller reaction surfaces 4230 cooperate with the shift guide rollers 2114 to react the shift forces that arise by the actuation of the planet-and-shift-lever subassemblies 2100 by the shift-cam-and-sun subassembly 2200.

Hence, in some embodiments, each planet-and-shift-lever subassembly 2100 is substantially axially and radially constrained relative to the longitudinal axis LA1, and constrained with respect to rotation about any radial axis extending perpendicular to the longitudinal axis LA1. Conversely, each planet-and-shift-lever subassembly 2100 is pivotable about the respective tangential reference axis TA1, which extends through a center point of the respective planet 2102 substantially perpendicular to a radial reference axis extending from the longitudinal axis LA1 through the center point of the respective planet 2102. In some embodiments, the planet 2102 is configured to freely move axially along the axis LA2 to allow for dimensional tolerances stack up between the traction components and the shift reaction surfaces. Additionally, the center of rotation of the planet axle 2104 is not necessarily coincident with the center of rotation of the planet 2102; such configuration prevents, in some cases, efficiency losses, increased shift forces, or outright binding of the variator 1200.

In some embodiments, the shift cam roller 2128 of each shift lever 2106 couples to a cam surface of a respective shift cam 2206. A differential control fluid pressure between the control piston receiving chambers 4220 causes an axial translation of the shift-cam-and-sun subassembly 2200 along the axis LA1. Such axial translation results in force being exerted on the shift cam rollers 2128 coupled to the shift cam 2206 facing the direction of movement, thereby causing the planet-and-shift-lever subassemblies 2100 to synchronously pivot about the respective tangential reference axis TA1. The application of the same control fluid pressure within the control piston receiving chambers 4220 serves to hold the shift-cam-and-sun subassembly 2200 in a given position due to equal and opposing reactive forces being applied by the shift cams 2206 on the respective shift cam roller 2128. Thus, adjustment of the speed ratio of the variator 1200 is facilitated through axial translation of the shift-cam-and-sun subassembly 2200 along the longitudinal axis LA1.

Figure 66:
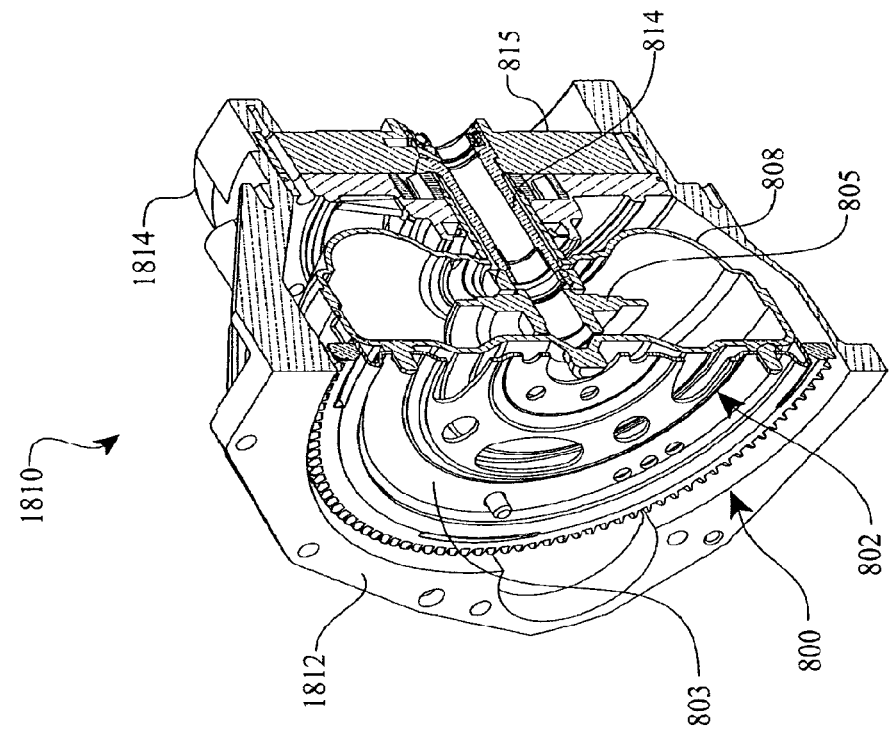
FIG. 66 is a cross-sectional, partial perspective view of the bell housing of FIG. 65.
Figure 65:
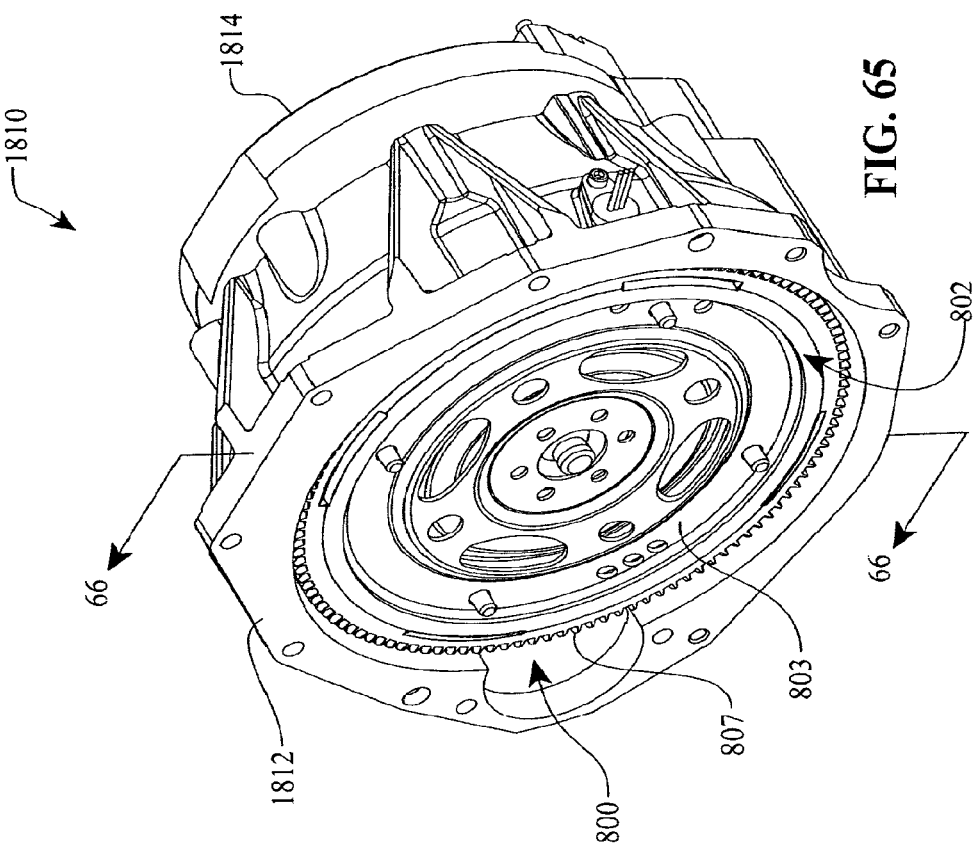
FIG. 65 is a perspective view of a bell housing and certain components of an input interface that can be used with transmissions of FIGS. 1, 2, and 3A.
Figure 67:
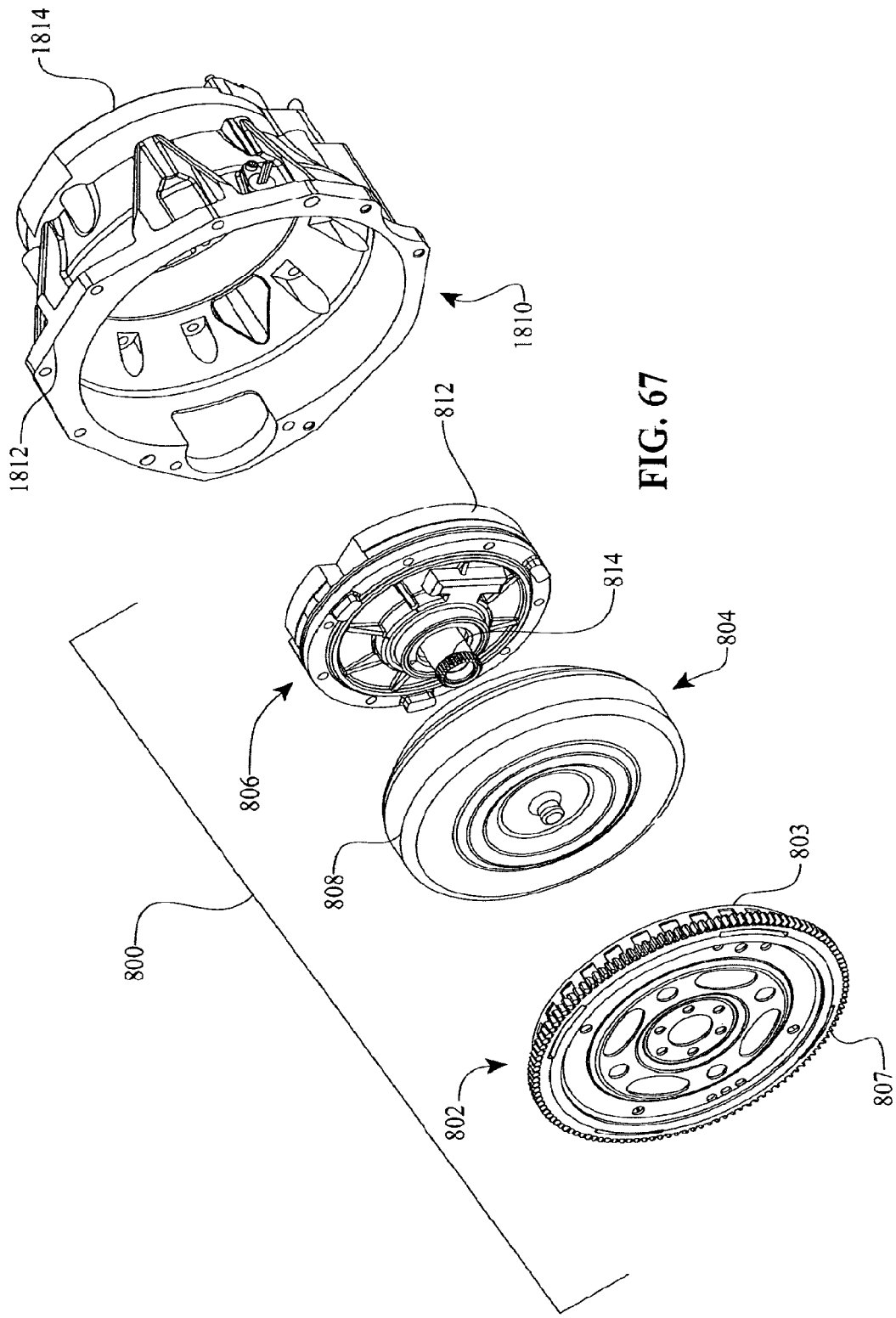
FIG. 67 is a partially explode view of certain components of the bell housing and input interface of FIG. 65.

Various detailed aspects of the torque converter subassembly 800 and the bell housing 1810 discussed above in reference to FIGS. 3A and 3B are shown in FIGS. 65-67. In one embodiment, the bell housing 1810 includes a prime mover mounting portion 1812 and a rear housing mounting portion 1814. The prime mover mounting portion 1812 can be configured for attachment to a structural portion of the prime mover (for example, a engine block, motor casing, etc.), and the rear housing mounting portion 1814 can be configured for attachment to the rear housing 1820 of the transmission housing 1800 (FIG. 3A). As previously discussed, the torque converter subassembly 800 is an embodiment of an input interface, which is suitably configured for implementation between a prime mover (not shown) and the variator 1200.

In some embodiments, the torque converter subassembly 800 can include a flex plate assembly 802, a torque converter 804 (FIGS. 66 and 67), and a transmission fluid pump 806 (FIGS. 66 and 67). The flex plate assembly 802 includes a flex plate 803 and starter gear ring 807 for enabling a rotary apparatus (for example, a starter motor) to turn moving components of the prime mover such as for starting the prime mover. The flex plate 803 is configured for attachment to a power output portion (for example, a crankshaft or motor shaft) of the prime mover in a manner that precludes relative rotation of the flex plate 803 with respect to the power output portion of the prime mover, thereby enabling torque transfer from the prime mover to the flex plate 803. For example, the flex plate 803 typically connects to the prime mover with threaded fasteners (such as bolts).

In one embodiment, the torque converter 804 includes a converter torque output portion 805 (FIG. 66), a torque converter housing 808, and various torque converting components (not shown) within the torque converter housing 808 that enable torque converter fluid within the torque converter housing 808 to be conveyed within the housing 808 in a manner that transfers torque applied to the torque converter housing 808 to the torque converter output portion 805. In some embodiments, the torque converter output portion 805 includes a turbine and a splined hub that fixedly attach to the turbine. The splined hub mates with the splines of the first end portion 1005 (FIGS. 3A, 4 and 5) of the main shaft 1000. The torque converter housing 808 is configured for attachment to the flex plate 803 in a manner that substantially precludes relative rotation of the torque converter housing 808 with respect to the flex plate 803, thereby facilitating torque transfer from the flex plate 803 to the torque converter housing 808. Examples of such ways for attaching the torque converter housing 808 to the flex plate 803 include, but are not limited to, threaded fastener structures, pins, and the like.

The transmission fluid pump 806 includes a pump housing 812, a torque input shaft 814, and various fluid pumping components within the pump housing that facilitate application of torque to the torque input shaft 814 to cause transmission fluid to be drawn into the pump housing 812 via a fluid supply input (not shown) and supplied from within the pump housing 812 under pressure via a fluid outlet (not shown). The pump housing 812 fixedly attaches to a pump mounting structure 815 of the bell housing 1820. The torque input shaft 814 attaches to the torque converter housing 808 in a manner that substantially precludes relative rotation of the torque input shaft 814 with respect to the torque converter housing 808, thereby facilitating torque transfer from the torque converter housing 808 to the torque input shaft 814.

Various aspects of one embodiment of the combining device 1400 discussed above in reference to FIGS. 3A and 3B are shown in FIGS. 68-71. The combining device 1400 can be an output interface, which is suitably configured for implementation between the main shaft 1000, the variator 1200, and the rangebox 1600. More specifically, the main shaft 1000 and the variator 1200 supply power to the first power input portion 1405 and the second power input portion 1410, respectively, of the combining device 1400, and the power output portion 1422 of the combining device 1400 supplies power to the rangebox 1600.

Figure 70:
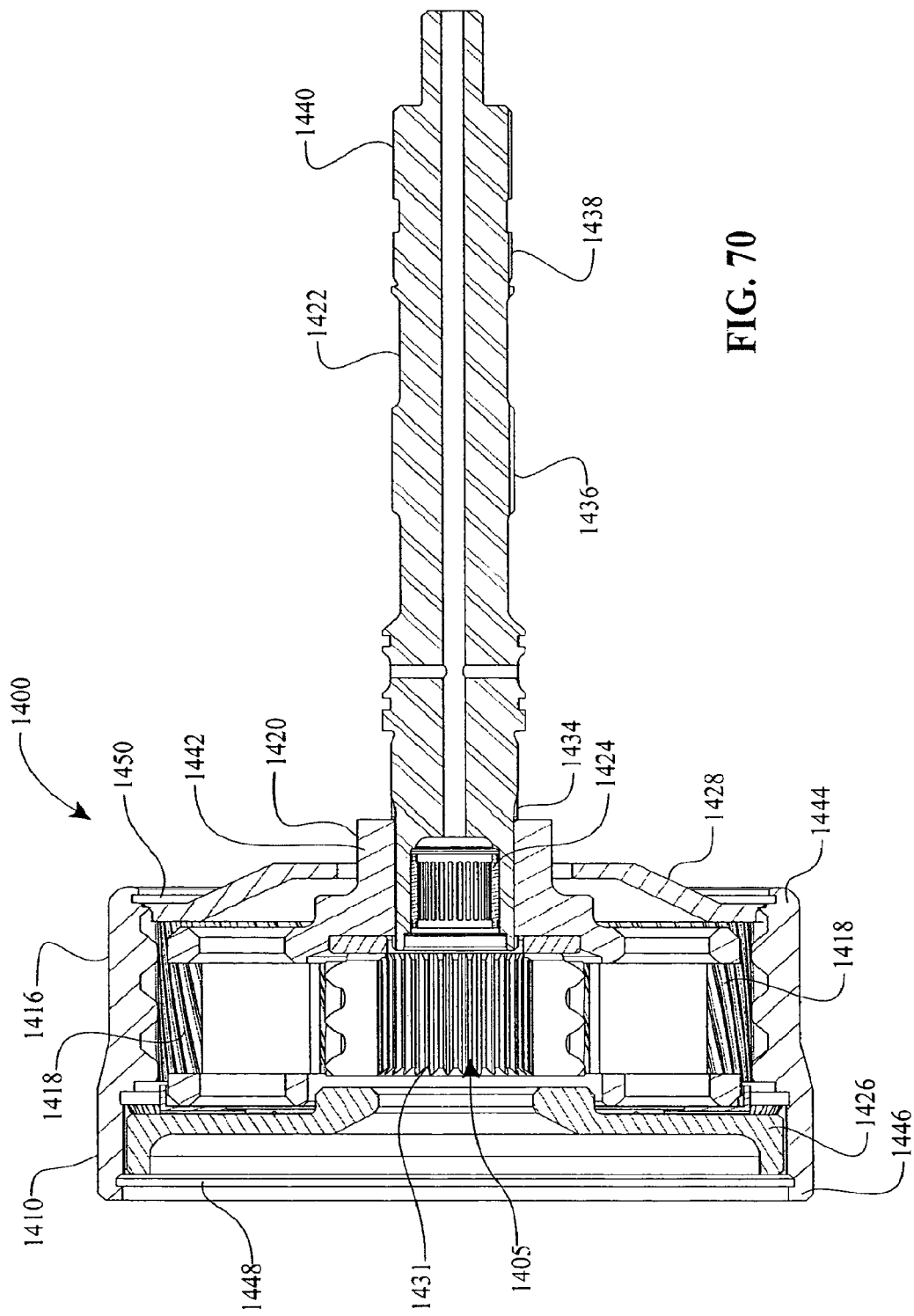
FIG. 70 is a cross-sectional view of the combining device of FIG. 68.
Figure 71:
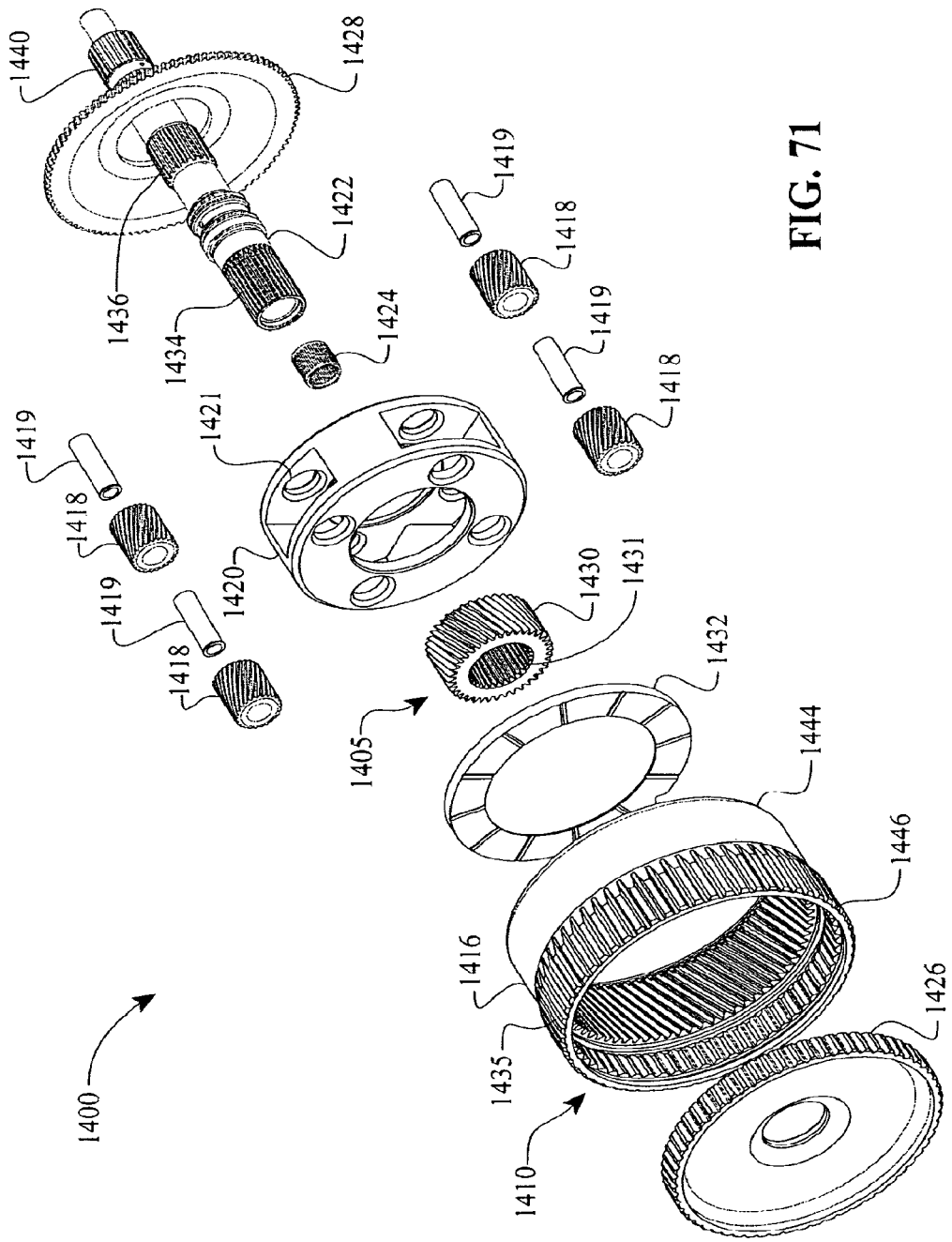
FIG. 71 is a partially exploded view of certain components of the combining device of FIG. 67.

Referring to FIGS. 68-71, in some embodiments, the combining device 1400 can include a hub 1416, a plurality of planet gears 1418, a plurality of planet gear axles 1419, a planet gear carrier 1420, a power output portion (or a transfer shaft) 1422, a needle bearing 1424, a forward disk 1426, a rear disk 1428, a sun gear 1430, and a thrust ring 1432. The planet gears 1418 are each rotatably mounted on the planet gear carrier 1420 via one of the planet gear axles 1419 (FIG. 71). Each planet gear 1418 is positioned within a pocket region of the planet gear carrier 1420 and the respective planet gear axle 1419 is engaged within respective planet gear axle bores 1421 of the planet gear carrier 1420. The sun gear 1430 is positioned within the pocket region of the planet gear carrier 1420, and the teeth of the sun gear 1430 are configured to engage the teeth of the planet gears 1418. In one embodiment, the sun gear 1430 includes a central bore having internal splines 1431, which are configured to engage splines at the second end portion 1015 of the main shaft 1000.

In one embodiment, the transfer shaft 1422 includes splines 1434, 1436, 1438, and 1440. The splines 1434 engage mating splines of an extension portion 1442 of the planet gear carrier 1420. In one embodiment, the needle bearing 1424 is mounted within a pocket of the transfer shaft 1422. As shown in FIG. 3A, a tip of the main shaft 1000 engages the needle bearing 1424, thereby providing an aligned and supported interface therebetween. As is discussed below with reference to FIGS. 73 and 74, the splines 1436, 1438, and 1440 are engaged with mating components of the rangebox 1600.

As best shown in FIGS. 70 and 71, the rear disk 1428 can be configured to engage teeth adjacent a rear edge 1444 of the hub 1416, thereby precluding relative rotation of the rear disk 1428 with respect to the hub 1416. The planet gear carrier 1420 is positioned within the hub 1416 with a rear face of the planet gear carrier 1420 abutting the rear disk 1428. The teeth of the planet gears 1418 engage mating interior teeth of the hub 1416. In this manner, the second power input portion 1410 of the combining device 1400 includes the hub 1416. The thrust ring 1432 is positioned within the hub 1416, abutting a front face of the planet gear carrier 1420. The forward disk 1426 engages internal splines formed on a front edge 1446 of the hub 1416, thereby precluding relative rotation of the forward disk 1426 with respect to the hub 1416. Thus, the forward disk 1426 and the rear disk 1428 axially constrain the planet gear carrier 1420, reacting axial thrust in either direction from the sun gear 1430. A first circumferential groove 1448 and a second circumferential groove 1450 are provided adjacent the front edge 1446 and the rear edge 1444, respectively, and are each configured for respectively receiving a retention device such as, for example, a respective snap ring engaged therein for axially constraining the disks 1426, 1428. Still referring to FIGS. 69-71, exterior splines 1435 can be provided at the front edge 1446 of the hub 1416. The exterior splines 1435 are configured for coupling to splines of the output load cam 2005B, for example. In this manner, the combining device 1400 is configured for facilitating power transfer from the variator 1200 to the coupling device 1400.

Figure 72:
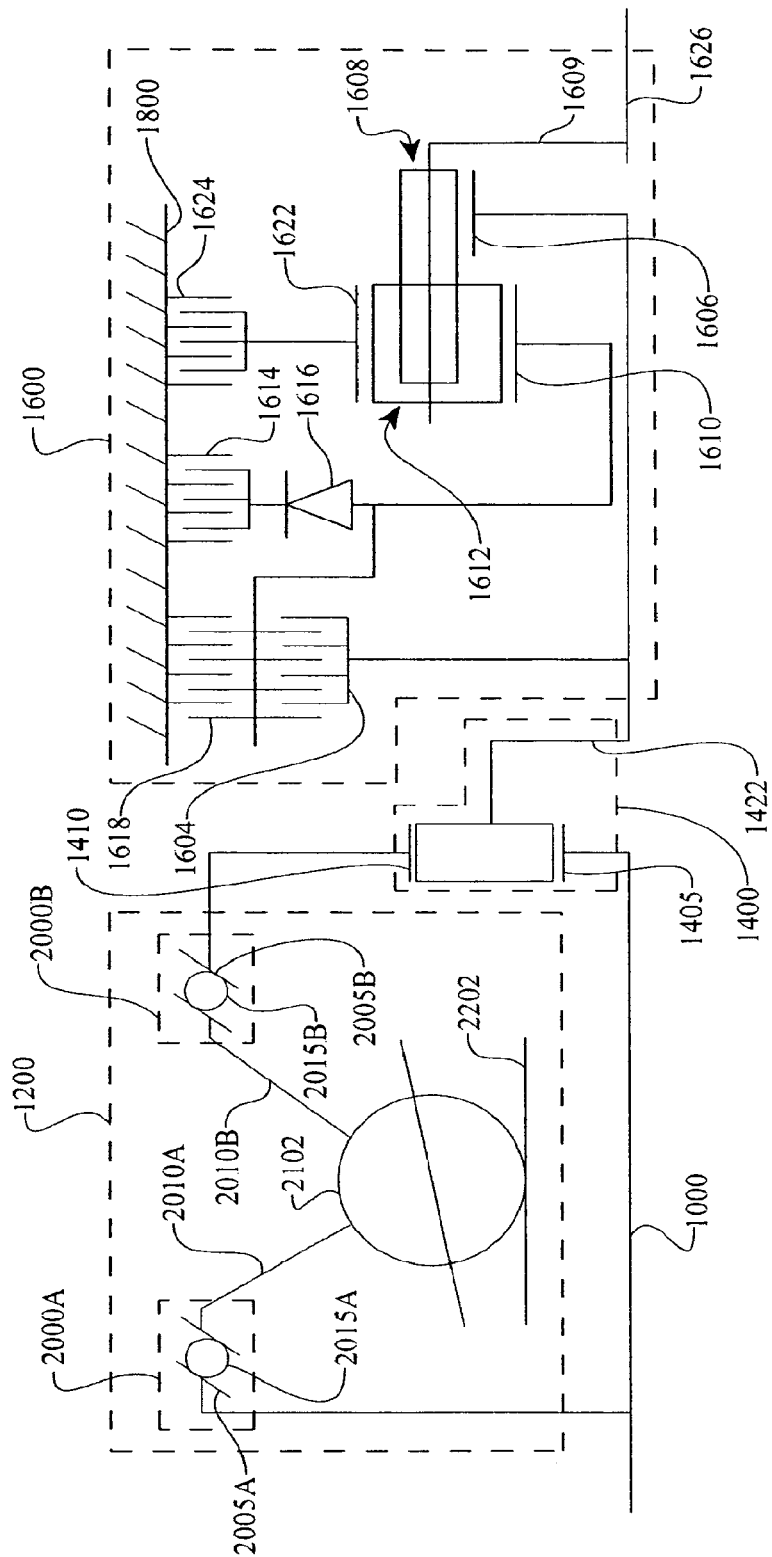
FIG. 72 is a schematic diagram of a continuously variable unit adapted to cooperate with a rangebox.

Various aspects of the interoperability of the variator 1200 and the rangebox 1600 discussed above in reference to FIGS. 3-4 are shown in FIG. 72. In some embodiments, the main shaft 1000 can be coupled directly to the input load-cam-and-traction-ring subassembly 2000A and to a first power input portion 1405 of the combining device 1400. Each of the planets 2102 (one shown) is engaged between the input load-cam-and-traction-ring subassembly 2000A, the output load-cam-and-traction-ring subassembly 2000B, and the sun 2202. With respect to the input load-cam-and-traction-ring subassembly 2000A, the input load cam 2005A couples to the input traction ring 2010A through the input load cam rollers 2015A. With respect to the output load-cam-and-traction-ring subassembly 2000B, the output load cam 2005B couples to the output traction ring 2010B through the output load cam rollers 2015B. The output load cam 2005B couples to the second power input portion 1410 of the combining device 1400.

In one embodiment, the transfer shaft 1422 of the combining device 1400 couples to a direct clutch 1604 and to a sun gear 1606 of a first planetary gearset 1608 of the rangebox 1600. The first planetary gearset 1608 is supported on a carrier 1609. A sun gear 1610 of a second planetary gearset 1612 is configured for being selectively coupled to the transfer shaft 1422 through the direct clutch 1604 or to the transmission housing 1800. The sun gear 1610 couples to the transmission housing 1800 through either a forward clutch 1614, via an overrun clutch 1616 (for example, a one-way mechanical diode), or a low clutch 1618. The sun gear 1610 couples to the first planetary gearset 1608. A ring gear 1622 couples to the first and second planetary gearsets 1608, 1612 and to a reverse clutch 1624 of the rangebox 1600. An output shaft 1626 couples to the carrier 1609. Preferably, but not necessarily, the output shaft 1626 and the carrier 1609 are one integral part.

In accordance with one embodiment, the rangebox 1600 is provided in a vehicle having an engine supplying power to the transmission 600. The rangebox 1600 is controlled in conjunction with the variator 1200 for providing the transmission 600 with multiple modes of operation, in which the shifting control of the variator 1200 is based on engine speed, vehicle speed, and/or user commands. A first power train operating mode (for example, Mode 1) refers to the rangebox 1600 being engaged in a low gear range. A second power train operating mode (for example, Mode 2) refers to the rangebox 1600 being engaged in a high gear range with the variator 1200 in overdrive (that is, speed output from the range box is greater than speed input to the range box).

Operationally, for a vehicle acceleration event from a standing start (meaning, operating in Mode 1), as the engine initially increases speed, the variator 1200 is maintained in an underdrive condition until the engine reaches a predetermined engine speed set point such as, for example, 1800 revolutions-per-minute (rpm). Once the predetermined engine speed set point is achieved, the engine speed is held constant while the variator 1200 shifts its torque ratio in a manner that causes the vehicle speed to increase. Vehicle speed continues to increase until the variator 1200 reaches a torque ratio corresponding to maximum overdrive, at which point, the engine speed increases up to a predetermined maximum engine speed (for example, maximum recommended engine rpm, peak horsepower, etc.). Once the engine speed reaches the maximum set point engine speed, the rangebox 1600 is shifted from Mode 1 to Mode 2, with the variator 1200 in overdrive. Following the rangebox 1600 being shifted to Mode 2, the engine speed is initially decreased to cause synchronization between vehicle speed and engine speed. The engine can then be controlled to increase speed further by increasing engine speed with the variator in overdrive.

In one embodiment, one or more data processing units are programmed for facilitating the operating modes discussed above. A power train controller, an engine controller, and/or a transmission controller are examples of data processing units, which can be programmed for providing the operating modes discussed above. Various sensors and control devices are connected to the engine and/or transmission 600 for facilitating the implementation of such modes of operation. In some embodiments, a hydraulic control structure having valving, among other things, can be used to convert electronic control algorithms to hydraulic and mechanical actuation of the variator 1200 and/or rangebox 1600.

Figure 73:
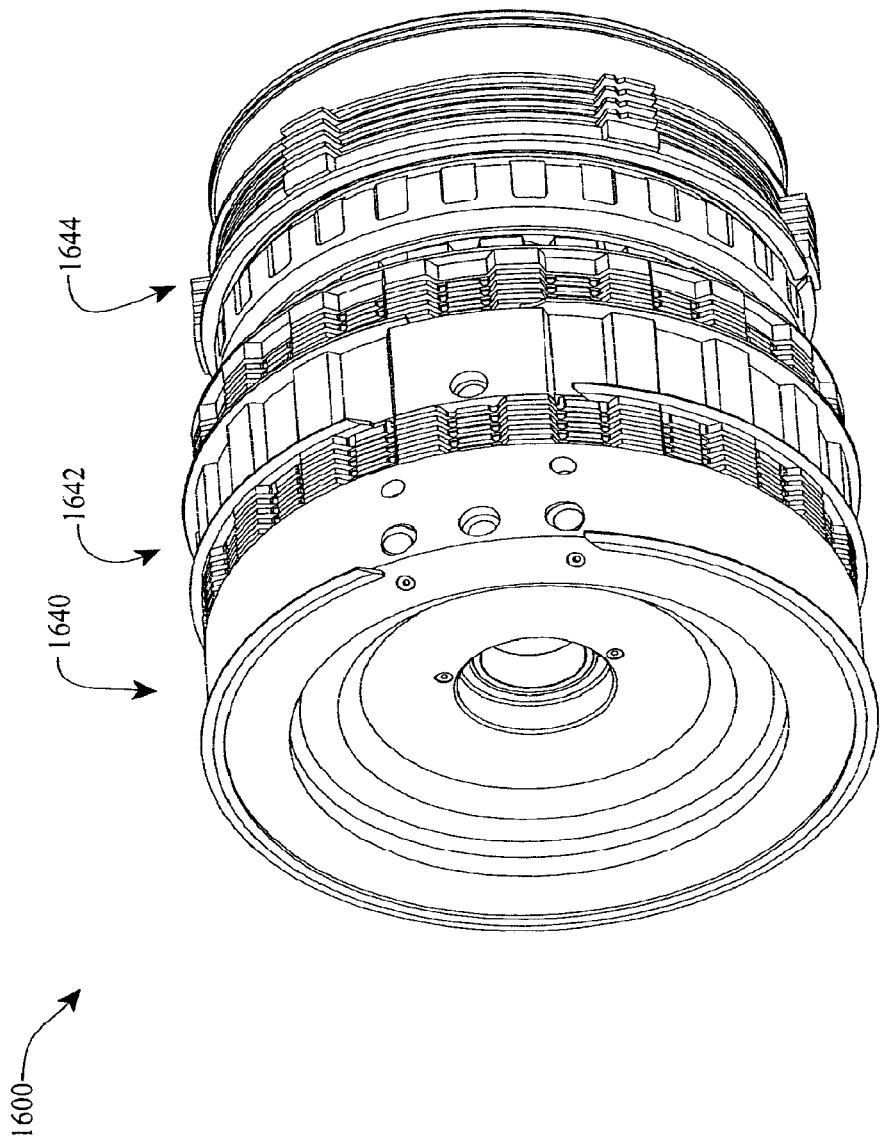
FIG. 73 is a perspective view of one embodiment of a range box that can be used with the CVU of FIG. 4 and/or the transmission of FIG. 3A.
Figure 74:
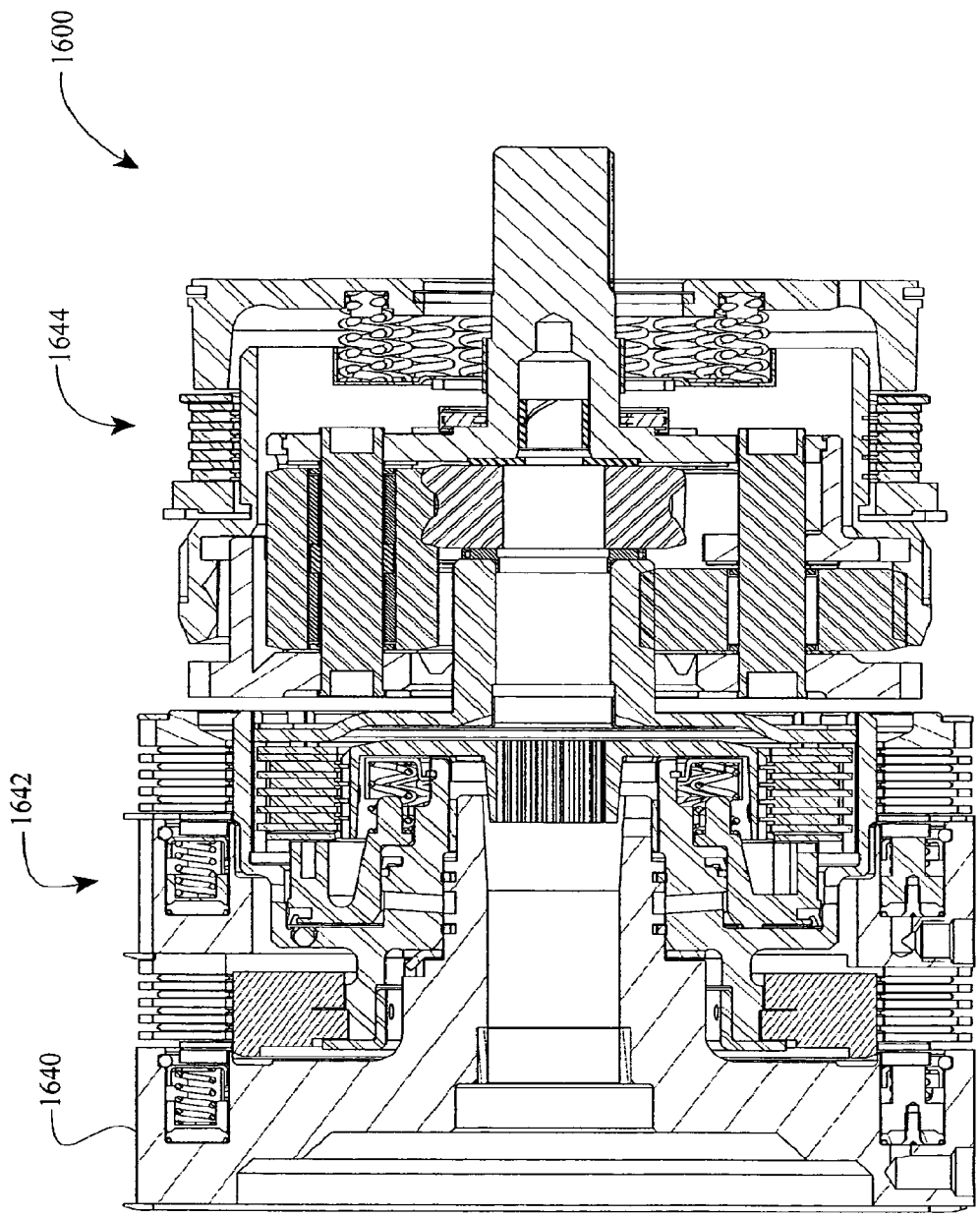
FIG. 74 is a cross-sectional view of the rangebox of FIG. 73.

Referring now to FIGS. 73 and 74, on embodiment of the rangebox 1600 discussed above in reference to FIGS. 3A, 3B and 72 is provided. The rangebox 1600 can include an intermediate support 1640, a high and low mode subassembly 1642, and a reverse mode subassembly 1644.

Figure 77:
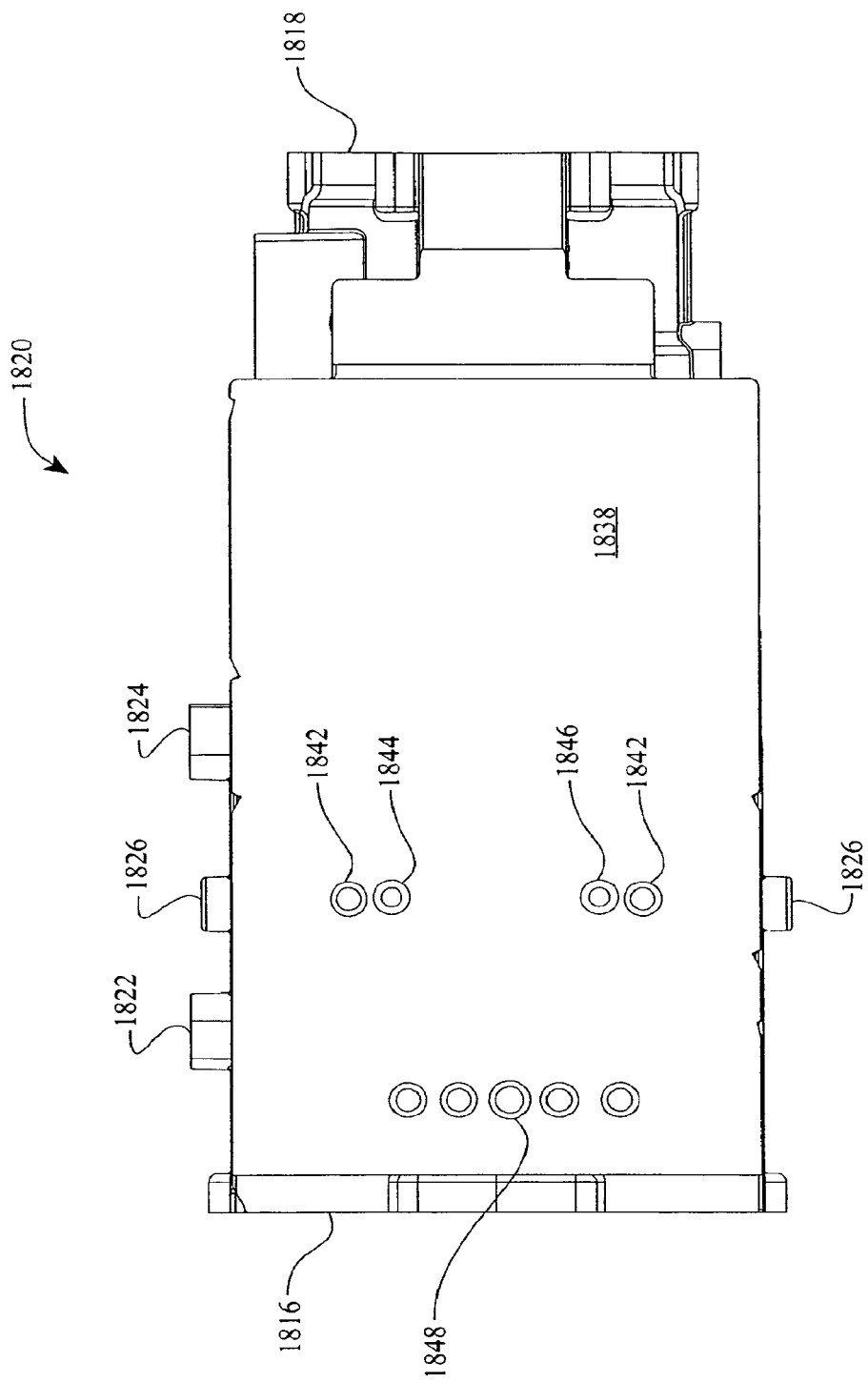
FIG. 77 is a plan view of the bottom side of the rear housing of FIG. 75.

Various aspects of the rear housing 1820 of the transmission housing 1800 discussed above in reference to FIGS. 3A and 3B are shown in FIGS. 75-77. In one embodiment, a bell housing attachment portion 1816 of the rear housing 1820 is configured for attachment to the rear housing mounting portion 1814 of the bell housing 1810. A tail housing attachment portion 1818 of the rear housing 1820 is configured for attachment with a tail housing (not shown) of the transmission 600 or to a housing of a related drivetrain subassembly.

In some embodiments, the rear housing 1820 includes an access port 1822 configured for receiving and supporting a sensor (not shown) for monitoring speed of the input load cam 2005A. An access port 1824 is configured for receiving and supporting a sensor for monitoring speed of the output load cam 2005B. Passages 1826 are configured for receiving and supporting the cam dowels 4055 discussed above in reference to FIGS. 45-51. In one embodiment, each passage 1826 is at least partially threaded for receiving a threaded fastener (for example, a setscrew) used for exerting a retention force on the respective cam dowel 4055. A support flange 1828 is provided within an interior space of the rear housing 1820 for locating and axially supporting the center manifold 4000 through engagement with the locating pads 4045 discussed above in reference to FIGS. 45-51. A center manifold footing engagement shoulder 1830 is provided for engaging the footing 4040 of the center manifold 4000. Threaded holes 1831 (one shown) are provided in the center manifold footing engagement shoulder 1830 for attaching the footing 4040 to the center manifold footing engagement shoulder 1830. In one embodiment, to facilitate accurate positioning of the center manifold 2305, while at the same time avoiding the need for a close tolerance along the body of the rear housing 1820, a locating diameter 1832 is provided within the interior space of the rear housing 1820. A series of clutch splines 1834 and grooves 1836 are formed in interior wall surfaces of the rear housing 1800 and are configured for receiving and supporting various components and/or assemblies of the rangebox 1600 (for example, clutches, gears, gearsets, snap rings, etc.).

In some embodiments, various ports are provided in a bottom wall 1838 of the rear housing 1820. Lubricant ports 1842 can be configured for communicating lubricant to the lubricant inlet ports 4076 of the base plate 4015 of the center manifold 4000 (FIG. 50). First and second control fluid ports 1844, 1846 are provided for facilitating selective and independent communication of control fluid with, respectively, the first and second control fluid inlet ports 4078, 4080 of the base plate 4015 (FIG. 50). A group of ancillary ports 1848 can be provided for facilitating selective and independent communication of other desired fluids with transmission components such as, for example, an external fluid cooler, an external fluid pump, etc., and/or for facilitating the mounting of one or more sensors (for example, a lubricant temperature sensor, a lubricant level sensor, etc.).

What is claimed is:

1. A transmission comprising:
   a plurality of traction rollers;
   a carrier assembly operably coupled to the traction rollers;
   an input element configured to transfer torque to the traction rollers, the input element comprising:
   a load cam having bidirectional load cam ramps, and
   a traction ring having bidirectional load cam ramps;
   an output element configured to transfer torque from the traction rollers;
   a shifter assembly configured to adjust an axis of rotation of the traction rollers;
   a hydraulic system operably coupled to the shifter assembly; and
   a lubrication system configured to provide lubricant to at least the traction rollers.

2. The transmission of claim 1, wherein the hydraulic system comprises at least one hydraulic piston.

3. The transmission of claim 2, wherein the shifter assembly comprises at least one shift cam, and wherein the at least one hydraulic piston is operationally coupled to the at least one shift cam.

4. The transmission of claim 1, wherein the shifter assembly comprises at least one shift cam.

5. The transmission of claim 1, wherein the output element comprises a load cam.

6. The transmission of claim 5, wherein the output element load cam comprises bidirectional ramps.

7. A drive comprising:
- a torque converter;
- a main shaft coupled to the torque converter;
- an input load cam coupled to the main shaft;
- an input traction ring operationally coupled to the input load cam;
- a plurality of traction planets adapted to receive torque from the input traction ring;
- an output traction ring adapted to receive torque from the plurality of traction planets;
- an output load cam operationally coupled to the output traction ring;
- a planetary gearset coupled to the output load cam and to the main shaft; and
- a hydraulic system configured to provide lubricant and control pressure to at least the traction planets.

8. The drive of claim 7, wherein the input load cam comprises bidirectional ramps.

9. The drive of claim 7, further comprising a set of load cam rollers to transfer torque and axial force between the input load cam and the input traction ring.

10. The drive of claim 7, further comprising a set of load cam rollers to transfer torque and axial force between the output load cam and the output traction ring.

11. The drive of claim 7, further comprising planet axles adapted to facilitate the tilting of an axis of rotation of the plurality of traction planets.

12. The drive of claim 11, further comprising shift levers coupled to the planet axles.

13. The drive of claim 12, further comprising shift cams coupled to the shift levers.

14. The drive of claim 13, further comprising control pistons operationally coupled to the shift cams.

15. The drive of claim 14, further comprising at least one stator to support axially and radially the traction planets, planet axles, and shift levers.

16. The drive of claim 15, further comprising a traction sun in contact with the traction planets, and wherein the traction sun is axially translatable under actuation of the shift cams and control pistons.

17. The drive of claim 7, further comprising a transfer shaft coupled to the planetary gearset.

18. The drive of claim 17, wherein the output load cam is coupled to a ring gear of the planetary gearset, the main shaft is coupled to a sun gear of the planetary gearset, and the transfer shaft is coupled to a carrier of the planetary gearset.

19. The drive of claim 15, further comprising a center manifold adapted to be coupled to the at least one stator.

20. The drive of claim 19, wherein the center manifold is adapted to provide control fluid and lubricant to the drive.

21. The drive of claim 20, wherein the at least one stator comprises control fluid chambers configured to receive control fluid and the control pistons.

22. The drive of claim 20, further comprising at least one oil galley for directing lubricant at specific components of the transmission.

23. The drive of claim 22, wherein the oil galley is configured to deliver lubricant to the planet axles.

24. The drive of claim 7, further comprising an axial lock nut configured to couple to the main shaft and to facilitate axial constraint of the input load cam.

* * * * *